(12) United States Patent
Tanaka

(10) Patent No.: US 7,979,872 B2
(45) Date of Patent: Jul. 12, 2011

(54) LENS ACTUATOR, OPTICAL PICKUP DEVICE, AND OPTICAL RECORDING AND REPRODUCING APPARATUS

(75) Inventor: Akihiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 765 days.

(21) Appl. No.: 12/022,847

(22) Filed: Jan. 30, 2008

(65) Prior Publication Data

US 2008/0189727 A1    Aug. 7, 2008

(30) Foreign Application Priority Data

Feb. 1, 2007 (JP) ................................ 2007-022752
Feb. 5, 2007 (JP) ................................ 2007-025208
Mar. 1, 2007 (JP) ................................ 2007-051143

(51) Int. Cl.
*G11B 7/09* (2006.01)
(52) U.S. Cl. ........................................ 720/681
(58) Field of Classification Search .................. 720/681, 720/683, 689, 600, 675, 660, 672
See application file for complete search history.

(56) References Cited

U.S. PATENT DOCUMENTS

| | | | |
|---|---|---|---|
| 6,157,501 A | 12/2000 | Sato et al. | |
| 6,339,511 B1 | 1/2002 | Tanaka et al. | |
| 6,594,204 B1 | 7/2003 | Yamamoto et al. | |
| 6,704,255 B2 | 3/2004 | Tanaka et al. | |
| 6,834,036 B1 | 12/2004 | Shiono et al. | |
| 7,102,966 B2 | 9/2006 | Tanaka et al. | |
| 7,558,161 B2 * | 7/2009 | Sohn et al. | 369/44.12 |
| 2005/0185533 A1 | 8/2005 | Tanaka | |
| 2005/0263683 A1 * | 12/2005 | Sohn et al. | 250/216 |
| 2006/0056074 A1 | 3/2006 | Yamamoto et al. | |
| 2007/0002716 A1 | 1/2007 | Shindo | |
| 2007/0067788 A1 | 3/2007 | Yamamoto et al. | |
| 2007/0147217 A1 | 6/2007 | Haruguchi et al. | |
| 2009/0147659 A1 * | 6/2009 | Komma et al. | 369/112.23 |
| 2009/0252023 A1 * | 10/2009 | Sohn et al. | 369/112.23 |

FOREIGN PATENT DOCUMENTS

| | | |
|---|---|---|
| EP | 1 630 800 A2 | 3/2006 |
| JP | 8-315393 | 11/1996 |
| JP | 2001 006203 A | 1/2001 |
| JP | 2001 076376 A | 3/2001 |
| JP | 2006-139874 | 6/2006 |

OTHER PUBLICATIONS

Extended European Search Report, Jun. 5, 2009.
Extended European Search Report, Oct. 6, 2009.

* cited by examiner

*Primary Examiner* — Allen T Cao
(74) *Attorney, Agent, or Firm* — Dickstein Shapiro LLP

(57) ABSTRACT

A disclosed lens actuator includes: an objective lens condensing a light beam on an optical storage medium; a diffractive element providing compatibility with plural types of optical storage media relative to light sources of plural different wavelengths; and a lens holder including the objective lens and diffractive element in an opposing manner. The objective lens is driven with the lens holder in at least a focusing direction and tracking direction relative to the optical storage medium. At least three protrusions are set on the lens holder in directions orthogonal to an optical axis of the objective lens. Another disclosed lens actuator includes: an objective lens and a drive coil disposed on a lens holder, wherein a diffractive element is disposed on the lens holder via an inertia weight including a metallic material and disposed so as to face the objective lens.

16 Claims, 33 Drawing Sheets

1:LENS HOLDER
2:OBJECTIVE LENS
3:DIFFRACTIVE ELEMENT
4,5:DRIVE COIL
8:MAGNET
9:INERTIA WEIGHT

LENS ACTUATOR, OPTICAL PICKUP DEVICE, AND OPTICAL RECORDING AND REPRODUCING APPARATUS

CROSS-REFERENCE TO RELATED APPLICATIONS

The present application is based on Japanese priority application No. 2007-022752 filed Feb. 1, 2007, Japanese priority application No. 2007-025208 filed Feb. 5, 2007, Japanese priority application No. 2007-051143 filed Mar. 1, 2007, the entire contents of which are hereby incorporated herein by reference.

BACKGROUND OF THE INVENTION

1. Field of the Invention

The present invention relates to a lens actuator including an objective lens for condensing a light beam on an optical storage medium and driving the objective lens in at least a focusing direction and either a tracking direction or a radial direction relative to the optical storage medium, an optical pickup devise in which the lens actuator is installed, and an optical recording and reproducing apparatus.

2. Description of the Related Art

Some lens actuators of optical pickup devices include a diffractive element for providing compatibility with optical storage media of plural types of standards relative to light sources of plural different wavelengths.

FIG. 1A is a cross-sectional view showing an example of a conventional lens actuator and FIG. 1B is a perspective view showing the conventional lens actuator in FIG. 1A. In FIGS. 1A and 1B, an objective lens 52 and a diffractive element 53 are directly installed on a lens holder 51. Specifically, a passage hole 54 having an effective diameter of a light beam in an optical system is formed at a center portion of the lens holder 51 used as a box casing on which a coil for generating driving power and an elastic support structure not shown in the drawings are installed. The objective lens 52 and the diffractive element 53 are fixed on upper and lower ends of the passage hole 54 so as to have the same optical axis.

FIG. 2A is a cross-sectional view showing an example of a lens actuator on which the diffractive element is disposed so as to have a tilted optical axis relative to the optical axis of the objective lens. FIG. 2B is a perspective view showing the lens actuator in FIG. 2A. In a lens unit in which the objective lens 52 and the diffractive element 53 are integrated, the diffractive element 53 is disposed on the lens holder 51 in a tilted manner relative to the optical axis of the objective lens 52 so as to prevent generation of flare from the diffractive element 53 (refer to Patent Document 1)

Concerning lens holders having the above-mentioned structure, there have been techniques for installing and fixing the objective lens or the diffractive element used as optical elements. For example, as shown in Patent Document 2, a shape of an installed portion of the objective lens is configured so as to prevent influx of adhesive.

Patent Document 1: Japanese Laid-Open Patent Application, No. 2006-139874
Patent Document 2: Japanese Laid-Open Patent Application No. 8-315393

The invention disclosed in Patent Document 2 is capable of preventing the influx of adhesive. However, a thickness of the holder is increased in an entire circumference of the lens holder as long as a height for fitting into a cylindrical surface of an outside diameter of a lens. Lightning and maintaining when plural optical elements are installed are not considered.

Patent Document 1 discloses a structure of a lens unit in which the objective lens and the diffractive element are adjusted and fixed on the lens holder (support member) and the diffractive element is fixed in a tilted manner. However, Patent Document 1 does not particularly disclose a method for installing the diffractive element in a tilted manner with high accuracy.

In general, an outer shape of the optical element used as a rotator rotating on the optical axis is formed into a cylindrical shape or columnar shape so as to facilitate manufacturing and improve installation accuracy. Further, a round hole or a stepped round hole is formed in a member on which the optical element is installed and positioning is performed through fitting between the hole and a shaft.

Upon installing such an optical element on a movable casing such as the lens holder, there has been a problem of having both readiness of manufacturing the casing and positional accuracy of the optical element in that the optical element and the casing per se used as a positioning subject form a movable unit. In the movable unit requiring high-speed and high-accuracy following capability such as the lens holder, a center of gravity must correspond to a driving center or a center of an elastic support member movably supporting the casing so as to have a small and light movable unit and prevent undesired accompanied movement.

In terms of movable functions, preferably, a shape or a structure for positioning and fixing the optical element is minimized. Further, in a case of a positioning support structure by contact among parts, namely, a three-point supporting structure, for example, it is desirable to minimize an amount of contact and have a large relative position and distance among three points taking into consideration unevenness, margin or error, or surface roughness of the parts.

Although the optical element per se is configured to be light and small, the optical element is required to be enlarged in accordance with a shape structure necessary for positioning relative to the effective diameter in the optical element. The shape structure necessary for positioning is also required in the casing used as the movable unit and is required to have no additional size relative to a driving power generating structure and an elastic support structure disposed on an outer shape portion.

Further, in a case of the general axis of the columnar shape or the stepped shape for positioning using a hole, problems of a rounded portion formed at an edge of a corner on the axis side or a small curved surface portion formed at an edge of a corner on the hole side are likely to hinder having a minimized and simple structure.

In accordance with the above-mentioned facts, in the lens actuator, it is difficult to propose an effective relative positioning structure for the optical element due to optical functions, mechanical functions, or required functions and limitations in terms of manufacturing thereof.

In addition to the above-mentioned description, some optical pickup devices include a diffractive element for providing compatibility with optical storage media of plural types of standards relative to light sources of plural different wavelengths. For example, Patent Document 1 discloses a lens unit in which an objective lens and the diffractive element are integrated. In the disclosed structure, the diffractive element is disposed on a support member in a tilted manner relative to the optical axis of the objective lens so as to prevent generation of flare from the diffractive element.

Patent Document 1: Japanese Laid-Open Patent Application No. 2006-139874

Patent Document 1 discloses a structure of a lens unit in which the objective lens and the diffractive element are adjusted and fixed on the support member and the diffractive element is fixed in a tilted manner. However, Patent Document 1 does not particularly disclose a method for installing the diffractive element in a tilted manner with high accuracy.

In general, an outer shape of the optical element used as a rotator rotating on the optical axis is formed into a cylindrical shape or columnar shape so as to facilitate manufacturing and improve installation accuracy. Further, a round hole or a stepped round hole is formed in a member on which the optical element is installed and positioning is performed through fitting between the hole and a shaft.

Further, when the diffractive element having a concentric structure is used as en element compatible with plural laser wavelengths, the following conditions (1) and (2) are required so as to sufficiently provide functions thereof:

(1) the optical axis of the objective lens and an optical axis of the diffractive element are positioned with high accuracy, and (2) both surfaces of the compatible diffractive element have a stepped shape and an end surface of each stepped shape has a plane surface, so that an integrated amount of plane surfaces is equivalent to a plane surface of an entire effective diameter and the diffractive element is disposed in a tilted manner relative to the optical axis of the objective lens so as to prevent flare from regular reflection.

In this case, a center of the diffractive element to be positioned with high accuracy relative to the optical axis of the objective lens corresponds to a center of one of both surfaces of the diffractive element facing the objective lens.

In order to position the center of the tilted surface with high accuracy as in the above-mentioned diffractive element, it is necessary to dispose a holding hole tilted relative to an objective lens holding hole in a casing. However, when such a shape is manufactured using a resin forming mold, it is impossible to manufacture the shape using a normal metal mold structure. A movable mold having a partial tilt is hardly capable of forming a shape with high accuracy for parts requiring reduction in size and weight as in this lens unit. In other words, such parts cannot be manufactured or even if the parts are manufactured, it is impossible to obtain accuracy required for installation.

When members having such a shape are used, there is an increased possibility of occurrence of problems in basic functions and reliability.

Patent Document 1 discloses a structure in which the objective lens and the diffractive element are installed on the support member. However, by using such a dedicated support member, a size of the lens unit as a movable casing may be enlarged and mass of a balancing weight for the lens unit may be increased. In accordance with this, sensitivity or a high resonance frequency is likely to be reduced due to the enlarged size and the increased balancing weight.

A lens actuator must control an objective lens at high speed for it to have a desired position by electrical direct modulation. In order to achieve this, it is required that a movable unit including a lens holder, for example, holding the objective lens be light, a structure of the movable unit be highly rigid so as not to experience internal deformation, and the structure and components be resistant to heat generated from electrical power consumption by a drive coil for driving the movable unit in a predetermined direction.

Further, it is necessary to satisfy the Abbe principle as a principle required for a structure of a precision drive mechanism. An idea of the Abbe principle is that driving force needs to act on a center of a support spring relative to low-frequency driving characteristics and the driving force needs to act on a center of inertia relative to high-frequency driving characteristics so as not to cause tilt when translation is desired or so as not to cause a reverse result. In other words, in a case of the lens actuator, it is required that a thrust center of the drive coil for driving the movable unit in a predetermined direction, an elastic center of the support spring supporting the movable unit, and the center of inertia of mass distribution correspond to one another.

An objective lens having a high aperture ratio for high density mass storage used in a pickup actuator for plural types of laser wavelengths has larger mass compared with a conventional objective lens. In accordance with this, weight for having the corresponding center of inertia is increased so as to satisfy the Abbe principle. Further, addition of a diffractive element compatible with the plural types of laser wavelengths results in an increase of the mass. Such an increase of the mass in the movable unit reduces sensitivity in an inertial field (high-frequency field), so that electrical power consumption is likely to be increased.

The increase of electrical power consumption is likely to cause a heat-related problem for parts due to an increase of an amount of heat generation. Further, if a part having relatively large mass is installed on an outer portion, a ratio of rigidity/mass distribution of a movable unit structure is reduced and resonance characteristics are reduced due to internal deformation. Accordingly, control characteristics are likely to be reduced.

Further, Patent Document 1 discloses a lens unit in which the objective lens and the diffractive element are integrated. In the disclosed structure, the diffractive element is disposed on a support member in a tilted manner relative to an optical axis of the objective lens so as to prevent generation of flare from the diffractive element.

While the lens unit disclosed in Patent Document 1 has merits in that the lens unit may be handled in the same manner as a conventional objective lens unit, a portion of the movable unit is a size larger due to an increase of an outside diameter by the support member relative to the outer portion of the objective lens. This would cause at least one of mass increase and reduced rigidity. Further, in accordance with the relationship with the aperture ratio of the objective lens for an optical disk, the objective lens must be disposed at an upper end of the movable unit. Accordingly, all of the objective lens, the diffractive element, and the support member are positioned on an upper side of the movable unit and the mass increase of an inertia weight for this structure becomes greater. Further, because a positional relationship is established such that the diffractive element is embedded in the support member, a distance to the drive coil as a heat source is reduced. In accordance with this, reliability of optical characteristics is likely to be reduced unless a structure for preventing heat transfer from the drive coil or means for accelerating heat radiation is employed.

Patent Document 1: Japanese Laid-Open Patent Application No. 2006-139874

In general, an outer shape of an optical element used as a rotator rotating on an optical axis is formed into a cylindrical shape or columnar shape so as to facilitate manufacturing and improve installation accuracy. Further, a round hole or a stepped round hole is formed in a member on which the optical element is installed and positioning is performed through fitting between the hole and a shaft.

Further, when the diffractive element having a concentric structure is used as en element compatible with plural laser wavelengths, the following conditions (1) and (2) are required so as to sufficiently provide functions thereof:

the optical axis of the objective lens and an optical axis of the diffractive element are positioned with high accuracy, and both surfaces of the compatible diffractive element have a stepped shape and an end surface of each stepped shape has a plane surface, so that an integrated amount of plane surfaces is equivalent to a plane surface of an entire effective diameter and the diffractive element is disposed in a tilted manner from perpendicularity relative to the optical axis of the objective lens so as to prevent flare from regular reflection.

In this case, a center of the diffractive element to be positioned with high accuracy relative to the optical axis of the objective lens corresponds to a center of one of the surfaces of the diffractive element facing the objective lens.

In order to position the center of the tilted surface with high accuracy as in the above-mentioned diffractive element, it is necessary to dispose a holding hole tilted relative to an objective lens holding hole in a casing. However, when such a shape is manufactured using a resin forming mold, it is impossible to manufacture the shape using a normal metal mold structure. A movable mold having a partial tilt is hardly capable of forming a shape with high accuracy for parts requiring reduction in size and weight as in this lens unit. In other words, such parts cannot be manufactured or even if the parts are manufactured, it is impossible to obtain the accuracy required for installation.

When members having such a complicated shape are used, there is an increased likelihood of occurrence of problems in basic functions and reliability.

Patent Document 1 discloses a structure in which the objective lens and the diffractive element are installed on the support member. However, by using such a dedicated support member, a size of the lens unit as a movable casing may be enlarged and the mass of a balancing weight for the lens unit may be increased. In accordance with this, sensitivity or a high resonance frequency is likely to be reduced due to the enlarged size and the increased mass.

It is an object of the present invention to solve the problems of the related art, and to provide a lens actuator, an optical pickup device, and an optical recording and reproducing apparatus that can be readily manufactured, perform positioning with high accuracy using an inertia weight, prevent heat transfer to a diffractive element, and improve reliability.

SUMMARY OF THE INVENTION

It is a general object of the present invention to provide an improved and useful lens actuator, optical pickup device, and optical recording and reproducing apparatus in which the above-mentioned problems are eliminated.

A more specific object of the present invention is to provide a lens actuator, optical pickup device, and optical recording and reproducing apparatus that can position and fix an objective lens and a diffractive element on a lens holder with high accuracy using a relatively simple structure.

According to one aspect of the present invention, there is provided a lens actuator comprising: an objective lens condensing a light beam on an optical storage medium; a diffractive element providing compatibility with optical storage media of plural types of standards relative to light sources of plural different wavelengths; and a lens holder including the objective lens and the diffractive element in an opposing manner, the objective lens being driven together with the lens holder in at least a focusing direction and a tracking direction relative to the optical storage medium, wherein at least three protrusions are set on the lens holder in directions orthogonal to an optical axis of the objective lens, the protrusions being in contact with at least one of circumferential surfaces of the objective lens and the diffractive element and positioning the objective lens or the diffractive element, and an end surface of the protrusion in contact with at least one of the circumferential surfaces of the objective lens and the diffractive element has a plane surface. In accordance with this structure, the circumferential surfaces of the objective lens and the diffractive element are brought into contact with the plane surfaces of the protrusions formed on at least three positions of the lens holder, so that positioning is performed with high accuracy and is less subject to unevenness of parts accuracy.

In the lens actuator according to the above-mentioned invention, a length of the end surface of the protrusion in contact with the objective lens or the diffractive element in a circumferential direction thereof may be set to be shorter than a length of a portion of the protrusion extending in the direction orthogonal to the optical axis of the objective lens. In accordance with this structure, it is possible to form the protrusion into a rib shape radial relative to the optical axis of the objective lens, so that it is possible to provide a high rigid structure to the lens holder relative to volume for the positioning structure and a mass increase.

In the lens actuator according to the above-mentioned invention, the protrusion may be formed into a columnar shape and may be disposed on four positions such that two protrusions are disposed in a radial direction and the remaining two protrusions are disposed in a tangential direction relative to the optical storage medium while forming an angle of 90 degrees between the protrusions. In accordance with this structure, each of the columnar-shaped protrusions has a rib shape radial relative to the optical axis of the objective lens and the protrusions are disposed in the radial direction and the tangential direction with the same angle, so that it is possible to realize a high-performance actuator unit in which size control and characteristic control are readily made.

In the lens actuator according to the above-mentioned invention, a portion positioning the objective lens or the diffractive element in an optical axis direction of the objective lens may be removed from the lens holder, the portion being adjacent to the end surface of the protrusion in the optical axis direction of the objective lens. In accordance with this structure, the surface in direct contact with the objective lens or the diffractive element adjacent to the protrusion is not used for positioning the objective lens or the diffractive element in the optical axis direction. Thus, it is possible to eliminate interference resulting from unevenness of an outer shape at the positioning portion of the objective lens, diffractive element, or the lens holder and unevenness of a curved surface shape generated at a corner, and the like, so that it is possible to perform positioning with high accuracy.

In the lens actuator according to the above-mentioned invention, a protrusion positioning at least one of the objective lens and the diffractive element in an optical axis direction of the objective lens may be disposed on a position of the lens holder where the protrusions are not disposed. In accordance with this structure, it is possible to eliminate interference resulting from unevenness of an outer shape at the positioning portion of the objective lens, diffractive element, or the lens holder and unevenness of a curved surface shape generated at a corner, and the like, so that it is possible to perform positioning with high accuracy.

In the lens actuator according to the above-mentioned invention, when the diffractive element is rotated on a radial axis or a tangential axis as a rotation axis in the optical storage medium and installed on the lens holder with a tilt relative to the optical axis of the objective lens, in the four columnar-shaped protrusions in contact with an outer cylindrical surface of the diffractive element, plane surfaces of the two protrusions present in a direction orthogonal to the tilted rotation axis among the four protrusions and in contact with the cylindrical surface of the diffractive element may be shifted from the cylindrical surface of the diffractive element without tilt such that the cylindrical surface of the tilted diffractive element is inscribed and a center of a diffracting plane facing the objective lens corresponds to the optical axis of the objective lens. In accordance with this structure, it is possible to perform high-accuracy positioning using a simple structure even when the diffractive element is tilted and flare prevention is performed.

In the lens actuator according to the above-mentioned invention, a portion positioning the diffractive element in a tilted manner relative to a surface perpendicular to the optical axis of the objective lens may be removed from the lens holder, the portion being adjacent to the end surfaces of the four columnar-shaped protrusions in a direction of the optical axis of the objective lens where the cylindrical surface of the tilted diffractive element is inscribed. In accordance with this structure, it is possible to perform high-accuracy positioning using a simple structure even when flare prevention is performed. Further, it is possible to stably perform high-accuracy positioning without interference resulting from unevenness of an outer shape at the positioning portion and unevenness of a curved surface shape generated at a corner, and the like.

In the lens actuator according to the above-mentioned invention, a portion positioning the diffractive element in a tilted manner relative to a surface perpendicular to the optical axis of the objective lens may be disposed on a position of the lens holder where the four columnar-shaped protrusions are not disposed and the cylindrical surface of the tilted diffractive element is inscribed. In accordance with this structure, it is possible to perform high-accuracy positioning using a simple structure even when flare prevention is performed. Further, it is possible to more stably perform high-accuracy positioning without interference resulting from unevenness of an outer shape at the positioning portion and unevenness of a curved surface shape generated at a corner, and the like.

According to another aspect of the present invention, there is provided an optical pickup device comprising: an objective lens condensing a light beam on an optical storage medium; a lens actuator driving the objective lens in at least a focusing direction and a tracking direction relative to the optical storage medium; and a unit obtaining optical information from a light beam reflected from the optical storage medium, wherein the lens actuator employs one of the above-mentioned lens actuator. In accordance with this structure, high-accuracy positioning is performed in which the employed lens actuator is less subject to unevenness of parts accuracy, so that it is possible to improve performance of a player or a drive on which the optical pickup device is installed.

According to another aspect of the present invention, there is provided an optical recording and reproducing apparatus optically recording and reproducing information on an optical storage medium, comprising: an optical pickup device, wherein the optical pickup device employs the above-mentioned optical pickup device. In accordance with this structure, high-accuracy positioning is performed in which the employed optical pickup device is less subject to unevenness of parts accuracy, so that it is possible to improve performance of a player or a drive on which the optical recording and reproducing apparatus is installed.

According to the lens actuator of the present invention, it is possible to perform high-accuracy positioning less subject to unevenness of parts accuracy using a simple structure by bringing at least one of the circumferential surfaces of the objective lens and the diffractive element into contact with the plane surfaces of the protrusions formed on at least three positions of the lens holder.

Further, according to the optical pickup device or the optical recording and reproducing apparatus of the present invention, it is possible to improve pickup characteristics, recording characteristics, and reproduction characteristics, and the like by employing the lens actuator according to the present invention.

In addition to the above-mentioned description, it is a general object of the present invention to provide an improved and useful lens actuator, optical pickup device, and optical recording and reproducing apparatus in which the above-mentioned problems are eliminated.

A more specific object of the present invention is to provide a lens actuator, optical pickup device, and optical recording and reproducing apparatus that can be readily manufactured, prevent generation of flare, and position a diffractive element with high accuracy.

According to another aspect of the present invention, there is provided a lens actuator comprising: an objective lens condensing a light beam on an optical storage medium; a diffractive element providing compatibility with optical storage media of plural types of standards relative to light sources of plural different wavelengths; and a lens holder including the objective lens and the diffractive element in an opposing manner, the objective lens being driven together with the lens holder in at least a focusing direction and a tracking direction relative to the optical storage medium, wherein the diffractive element is disposed on the lens holder such that a diffracting plane of the diffractive element is tilted relative to an optical axis of the objective lens and a diffraction pattern center of the diffracting plane in the diffractive element facing the objective lens corresponds to the optical axis of the objective lens. In accordance with this structure, the diffracting plane of the diffractive element is installed in a tilted manner relative to the optical axis of the objective lens rather than in a perpendicular manner, so that it is possible to prevent flare resulting from surface reflection. And the diffraction pattern center in the diffractive element facing the objective lens corresponds to the optical axis of the objective lens. Thus, is possible to obtain preferable optical characteristics with reduced aberration.

In the lens actuator according to the above-mentioned invention, the diffractive element may have a discoid shape including a circumferential surface used as a fitting shaft and a plane surface on a top surface thereof, in the lens holder, an internal surface may be extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element may be formed, a maximum width of a shape of the diffractive element projected on the virtual surface perpendicular to the optical axis of the objective lens at the fitting shaft of the diffractive element may be set to be equal to a diameter of the cylindrical hole of the lens holder, and the fitting shaft of the diffractive element may be fitted into the cylindrical hole of the lens holder. In accordance with this structure, the maximum width of the shape of the diffractive element projected on the virtual surface perpendicular to the optical axis of the objective lens at the fitting shaft of the diffractive element is set to be equal to the diameter of the cylindrical hole of the lens holder. Thus, molding of the lens holder and obtaining of accuracy thereof are readily made and it is possible to readily position the diffractive element with high accuracy upon installation.

In the lens actuator according to the above-mentioned invention, a center of the cylindrical hole of the lens holder may be shifted relative to the optical axis of the objective lens such that the diffraction pattern center of the diffracting plane in the diffractive element facing the objective lens corresponds to the optical axis of the objective lens, the diffractive element being installed on the lens holder in a tilted manner. In accordance with this structure, the center of the cylindrical hole is disposed on the lens holder such that the center of the cylindrical hole is shifted in parallel with the optical axis of the objective lens and eccentrically with the optical axis. Thus, molding of the lens holder and obtaining of accuracy thereof are readily made and it is possible to readily position the diffractive element with high accuracy upon installation.

In the lens actuator according to the above-mentioned invention, the diffractive element may have a discoid shape including a circumferential surface used as a fitting shaft and a plane surface on a top surface thereof, in the lens holder, an internal surface may be extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element may be formed, the cylindrical hole may be set to have a long hole shape defined by elongating a maximum circle projected on the virtual surface perpendicular to the optical axis of the objective lens at the fitting shaft of the diffractive element and to have a central axis coaxial with the optical axis of the objective lens, and the fitting shaft of the diffractive element may be fitted into the cylindrical hole of the lens holder. In accordance with this structure, the cylindrical hole of the lens holder is formed to have the long hole shape defined by elongating the maximum circle projected on the virtual surface perpendicular to the optical axis of the objective lens at the fitting shaft of the diffractive element. Thus, molding of the lens holder and obtaining of accuracy thereof are readily made and it is possible to readily position the diffractive element with high accuracy upon installation.

In the lens actuator according to the above-mentioned invention, a center of the cylindrical hole having the long hole shape in the lens holder may be shifted relative to the optical axis of the objective lens such that the diffraction pattern center of the diffracting plane in the diffractive element facing the objective lens corresponds to the optical axis of the objective lens, the diffractive element being installed on the lens holder in a tilted manner. In accordance with this structure, the center of the cylindrical hole having the long hole shape is disposed on the lens holder such that the center of the cylindrical hole is shifted in parallel with the optical axis of the objective lens and eccentrically with the optical axis. Thus, molding of the lens holder and obtaining of accuracy thereof are readily made and it is possible to readily position the diffractive element with high accuracy upon installation.

In the lens actuator according to the above-mentioned invention, the diffractive element may have a discoid shape including a circumferential surface used as a fitting shaft and a plane surface on a top surface thereof, in the lens holder, an internal surface may be extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element may be formed, the cylindrical hole may be set to have an elliptical hole shape defined by a major axis obtained from a maximum size projected on the virtual surface perpendicular to the optical axis of the objective lens at the fitting shaft of the diffractive element and by a minor axis obtained from an outside diameter of the diffractive element and to have a central axis coaxial with the optical axis of the objective lens, and the fitting shaft of the diffractive element may be fitted into the cylindrical hole of the lens holder. In accordance with this structure, the cylindrical hole of the lens holder is formed to have the elliptical hole shape defined by the major axis obtained from the maximum size projected on the virtual surface perpendicular to the optical axis of the objective lens in the fitting shaft of the tilted diffractive element and by the minor axis obtained from the outside diameter of the diffractive element. Thus, molding of the lens holder and obtaining of accuracy thereof are readily made and it is possible to readily position the diffractive element with high accuracy upon installation.

In the lens actuator according to the above-mentioned invention, a center of the cylindrical hole having the elliptical hole shape in the lens holder may be shifted relative to the optical axis of the objective lens such that the diffraction pattern center of the diffracting plane in the diffractive element facing the objective lens corresponds to the optical axis of the objective lens, the diffractive element being installed on the lens holder in a tilted manner. In accordance with this structure, the center of the cylindrical hole having the elliptical hole shape is disposed on the lens holder such that the center of the cylindrical hole is shifted in parallel with the optical axis of the objective lens and eccentrically with the optical axis. Thus, molding of the lens holder and obtaining of accuracy thereof are readily made and it is possible to readily position the diffractive element with high accuracy upon installation.

In the lens actuator according to the above-mentioned invention, a position of the diffracting plane in the diffractive element facing the objective lens is set to be substantially a center of the cylindrical hole of the lens holder such that the diffraction pattern center of the diffracting plane in the diffractive element facing the objective lens corresponds to the optical axis of the objective lens, the diffractive element being installed on the lens holder in a tilted manner. In accordance with this structure, a middle point of two points in the maximum side of the projected diffractive element is set as the diffraction pattern center facing the objective lens. Thus, molding of the lens holder and obtaining of accuracy thereof are readily made and it is possible to readily position the diffractive element with high accuracy upon installation.

According to another aspect of the present invention, there is provided an optical pickup device comprising: an objective lens condensing a light beam on an optical storage medium; a lens actuator driving the objective lens in at least a focusing direction and a tracking direction relative to the optical storage medium; and a unit obtaining optical information from a light beam reflected from the optical storage medium, wherein the lens actuator employs one of the above-mentioned lens actuator. In accordance with this structure, the lens actuator to be disposed is readily and securely installed while preventing flare resulting from regular reflection in the diffracting plane of the diffractive element. Thus, it is possible to improve performance of a player or a drive on which the optical pickup device is installed.

According to another aspect of the present invention, there is provided an optical recording and reproducing apparatus optically recording and reproducing information on an optical storage medium, comprising: an optical pickup device, wherein the optical pickup device employs the above-mentioned optical pickup device. In accordance with this structure, the optical pickup to be disposed is readily and securely installed while preventing flare resulting from regular reflection in the diffracting plane of the diffractive element. Thus, it is possible to improve performance of a player or a drive on which the optical recording and reproducing apparatus is installed.

According to the lens actuator of the present invention, the diffracting plane of the diffractive element providing compatibility with optical storage media of plural types of standards relative to light sources of plural different wavelengths is installed in a tilted manner relative to the optical axis of the objective lens rather than in a perpendicular manner, so that it is possible to prevent flare resulting from surface reflection. And the diffraction pattern center in the diffractive element facing the objective lens corresponds to the optical axis of the objective lens. Thus, is possible to obtain preferable optical characteristics with reduced aberration.

According to another aspect of the present invention, there is provided a lens actuator comprising: an objective lens disposed on a lens holder, the objective lens condensing a light beam on an optical storage medium; and a drive coil disposed on the lens holder, the drive coil driving the objective lens together with the lens holder in a focusing direction and a radial direction relative to the optical storage medium, wherein a diffractive element is disposed on the lens holder via an inertia weight including a metallic material and disposed so as to face the objective lens, the diffractive element providing compatibility with the optical storage media of plural types of standards relative to light sources of plural wavelengths. In accordance with this structure, it is possible to protect the diffractive element from heat generation of the drive coil of the lens holder by disposing the diffractive element on the lens holder via the metallic inertia weight adapted to function as a balance adjuster and a radiator plate.

In the lens actuator according to the above-mentioned invention, a hole is formed on the inertia weight so as to have an inner cylindrical surface thereof, a shaft is formed on the diffractive element so as to have an outer cylindrical surface thereof, and the inertia weight and the diffractive element are positioned by fitting between the hole and the shaft. In accordance with this structure, it is possible to readily and securely perform positioning and installation by fitting between the inertia weight and the diffractive element.

In the lens actuator according to the above-mentioned invention, a hole is formed on the lens holder so as to have an inner cylindrical surface thereof, a shaft is formed on the inertia weight so as to have an outer cylindrical surface thereof, and the lens holder and the inertia weight are positioned by fitting between the hole and the shaft. In accordance with this structure, it is possible to readily and securely perform positioning and installation by fitting between the lens holder and the inertia weight.

In the lens actuator according to the above-mentioned invention, the inertia weight is installed in a tilted manner relative to the lens holder, and an optical axis of the objective lens and a diffracting plane of the diffractive element are tilted relative to perpendicularity therebetween. In accordance with this structure, the diffracting plane of the diffractive element is disposed to be tilted relative to the optical axis of the objective lens, so that it is possible to have a countermeasure for heat as mentioned above and prevent flare resulting from regular reflection of the diffracting plane.

In the lens actuator according to the above-mentioned invention, the diffractive element is installed in a tilted manner relative to the inertia weight, and an optical axis of the objective lens and a diffracting plane of the diffractive element are tilted relative to perpendicularity therebetween. In accordance with this structure, the diffracting plane of the diffractive element is disposed to be tilted relative to the optical axis of the objective lens, so that it is possible to have a countermeasure for heat as mentioned above and prevent flare resulting from regular reflection of the diffracting plane.

According to another aspect of the present invention, there is provided an optical pickup device comprising: an objective lens condensing a light beam on an optical storage medium; a lens actuator driving the objective lens in a focusing direction and a tracking direction relative to the optical storage medium; and means for obtaining optical information from a light beam reflected from the optical storage medium, wherein the lens actuator employs the above-mentioned lens actuator. In accordance with this structure, the lens actuator to be disposed has a countermeasure for heat and is readily and securely installed while preventing flare resulting from regular reflection of the diffracting plane of the diffractive element. Thus, it is possible to improve performance of a player or a drive on which the optical pickup device is installed.

According to another aspect of the present invention, there is provided an optical recording and reproducing apparatus optically recording and reproducing information on an optical storage medium, comprising: an optical pickup, wherein the above-mentioned optical pickup device is installed as the optical pickup. In accordance with this structure, the optical pickup device to be disposed has a countermeasure for heat and is readily and securely installed while preventing flare resulting from regular reflection of the diffracting plane of the diffractive element. Thus, it is possible to improve performance of a player or a drive on which the optical recording and reproducing apparatus is installed.

According to the lens actuator of the present invention, the diffractive element providing compatibility with optical storage media of plural types of standards relative to light sources of plural wavelengths is disposed on the lens holder via the inertia weight including a metallic material and disposed so as to face the objective lens. Thus, it is possible to protect the diffractive element from heat generation of the drive coil of the lens holder by the inertia weight adapted to function as an adjuster of inertia balance and a radiator plate.

Further, according to the optical pickup device or the optical recording and reproducing apparatus of the present invention, it is possible to improve pickup characteristics, recording characteristics, and reproduction characteristics, and the like by employing the lens actuator according to the present invention.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 3A:
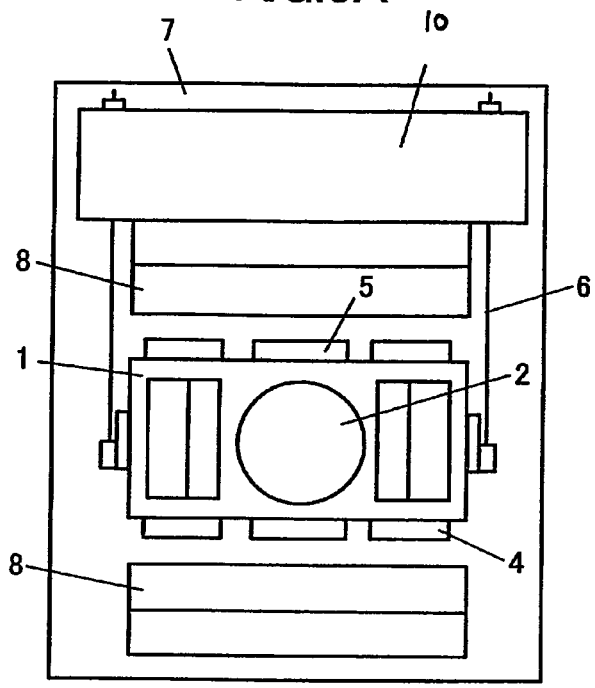
FIG. 3A is a front view showing an embodiment of an optical pickup device on which an objective lens actuator according to the present invention is installed.
Figure 3B:
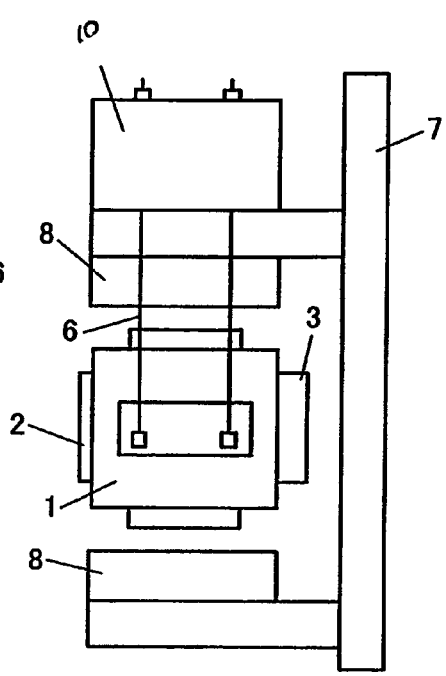
FIG. 3B is a side elevational view showing an embodiment of an optical pickup device on which an objective lens actuator according to the present invention is installed.

FIG. 3A is a front view showing an embodiment of an optical pickup device on which an objective lens actuator according to the present invention is installed. FIG. 3B is a side elevational view showing the embodiment of the optical pickup device on which the objective lens actuator according to the present invention is installed. And, FIG. 3C is a bottom view showing the embodiment of the optical pickup device on which the objective lens actuator according to the present invention is installed.

Figure 3C:
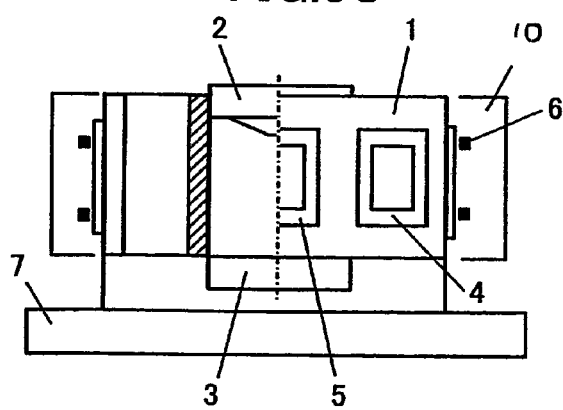
FIG. 3C is a bottom view showing an embodiment of an optical pickup device on which an objective lens actuator according to the present invention is installed.

In FIGS. 3A, 3B, and 3C, a lens holder 1 as a movable unit is a casing holding an objective lens 2 on an upper portion thereof, the objective lens 2 condensing a light beam on an optical disc not shown in the drawings so as to form a beam spot, and also holding a diffractive element 3 as will be described later on a lower portion thereof. A drive coil 4 for focusing and a drive coil 5 for tracking are installed on the lens holder 1 and the lens holder 1 is installed on a support block 10 via a support spring 6 functioning as a suspension and a coil feeder line, the support block 10 being disposed on a fixing base 7. A magnet 8 functioning as a back yoke in a magnetic circuit is installed on the fixing base 7. In this magnetic field, the drive coils 4 and 5 of the lens holder 1 are disposed and the lens holder 1 is driven in a focusing direction and a tracking direction in accordance with an electromagnetic action of the drive coils 4 and 5 to be energized and the magnet 8.

FIGS. 4A to 8B are drawings for illustrating first to fifth embodiments of the lens actuator according to the present invention. The drawings of cross-sectional views and perspective views illustrate a relationship among main elements in the lens actuator, namely, a relationship among the objective lens, diffractive element, and lens holder.

Figure 4A:
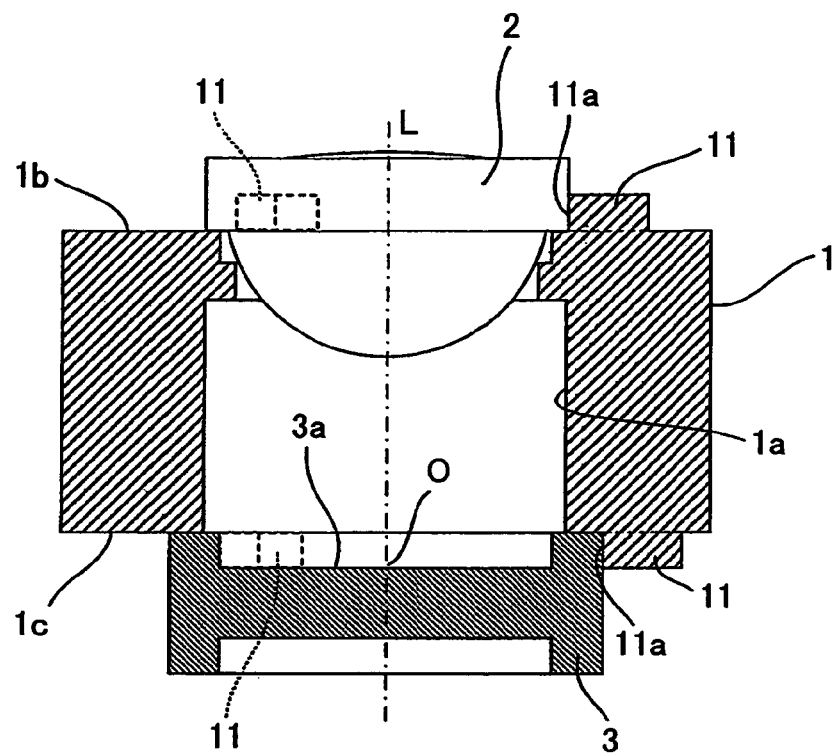
FIG. 4A is a cross-sectional view illustrating a relationship among main elements in a first embodiment of a lens actuator according to the present invention.
Figure 4B:
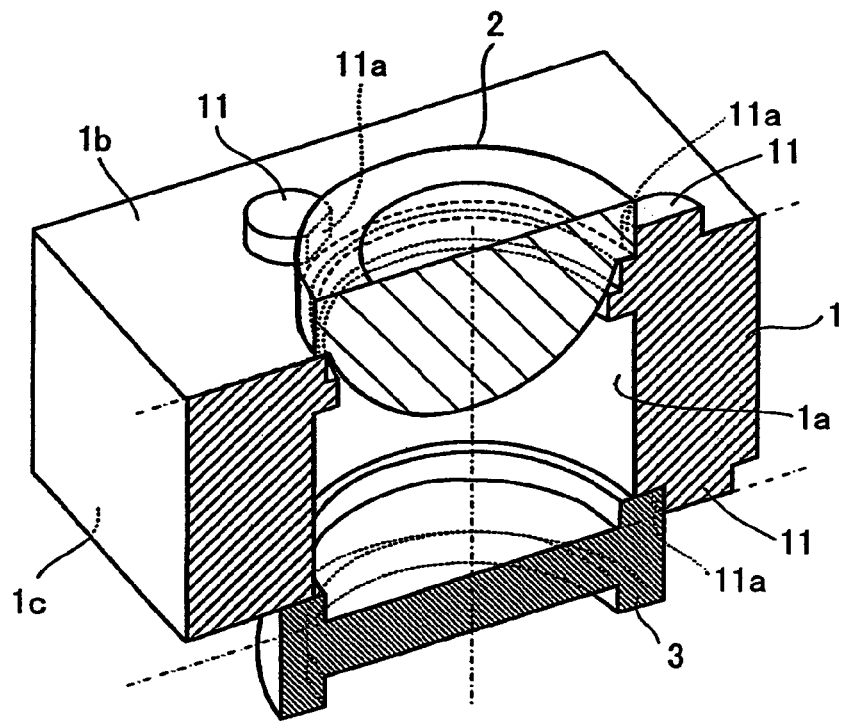
FIG. 4B is a perspective view illustrating a relationship among main elements in a first embodiment of a lens actuator according to the present invention.

In the first embodiment shown in FIGS. 4A and 4B, a cylindrical hole 1a having an effective diameter of a light beam in an optical system is formed at a center of the lens holder 1. The objective lens 2 is fixed above the cylindrical hole 1a and the diffractive element 3 is fixed below the cylindrical hole 1a. The fixation of the objective lens 2 and the diffractive element 3 may be performed using a material such as ultraviolet curable resin.

Further, the diffractive element 3 is fitted into the cylindrical hole 1a of the lens holder 1 such that a diffraction pattern center O of a diffracting plane 3a facing the objective lens 2 in the diffractive element 3 substantially corresponds to an optical axis L of the objective lens 2.

Plural (three in this example) protrusions 11 are disposed on each of an upper end surface 1b and a lower end surface 1c of the lens holder 1 so as to be in contact with portions of circumferential surfaces of the objective lens 2 and the diffractive element 3 and to perform positioning. These protrusions 11 are disposed on the lens holder 1 with substantially the same degrees (120 degrees in this example) relative to the optical axis L of the objective lens 2 and in directions orthogonal to the optical axis L. Further, an end surface 11a in contact with the circumferential surfaces of the objective lens 2 and the diffractive element 3 is formed into a plane surface.

In this manner, in the first embodiment, a thickness of the fitting portions in the lens holder 1 is not large, the fitting portions being used for positioning the objective lens 2 and the diffractive element 3 which are a pair of optical elements facing each other. Cylindrical surfaces of an outside diameter of the objective lens 2 and the diffractive element 3 are brought into contact with the end surfaces 11a formed to have a plane shape on an inside of the protrusions 11 forming a columnar shape at the three positions, thereby forming a what is called a three-point supporting structure. When positioning is performed, positions of the plane surface of the end surface 11a of the protrusion 11 and the circumferences of the objective lens 2 and the diffractive element 3 are determined in accordance with the three points, so that it is possible to perform positioning with better accuracy when a distance among relative positions of the three points is increased and each contact area becomes smaller taking into consideration unevenness of parts and the like.

In this example, both objective lens 2 and the diffractive element 3 are positioned using the protrusions 11. However, the above-mentioned positioning may be performed on at least one of the objective lens and the diffractive element.

Figure 5A:
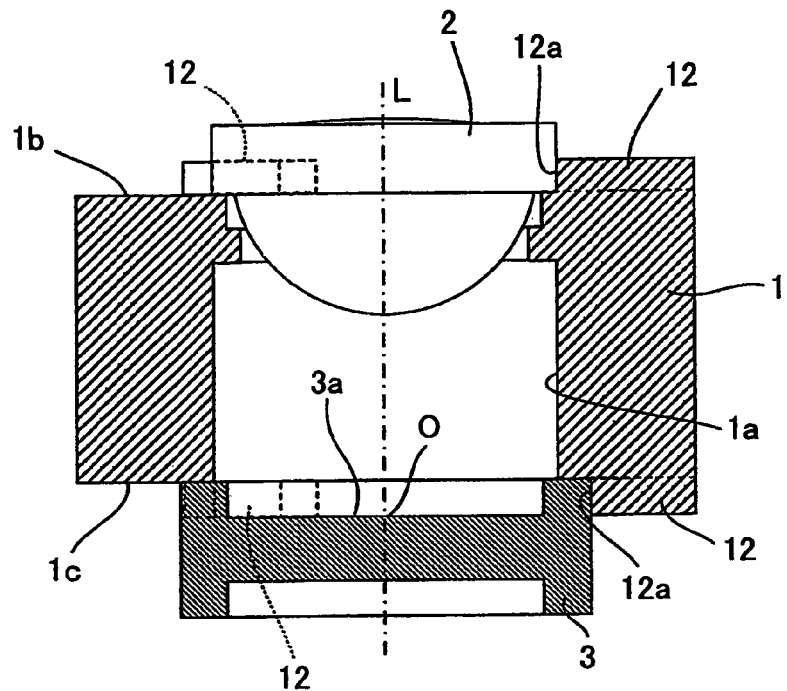
FIG. 5A is a cross-sectional view illustrating a relationship among main elements in a second embodiment of a lens actuator according to the present invention.
Figure 5B:
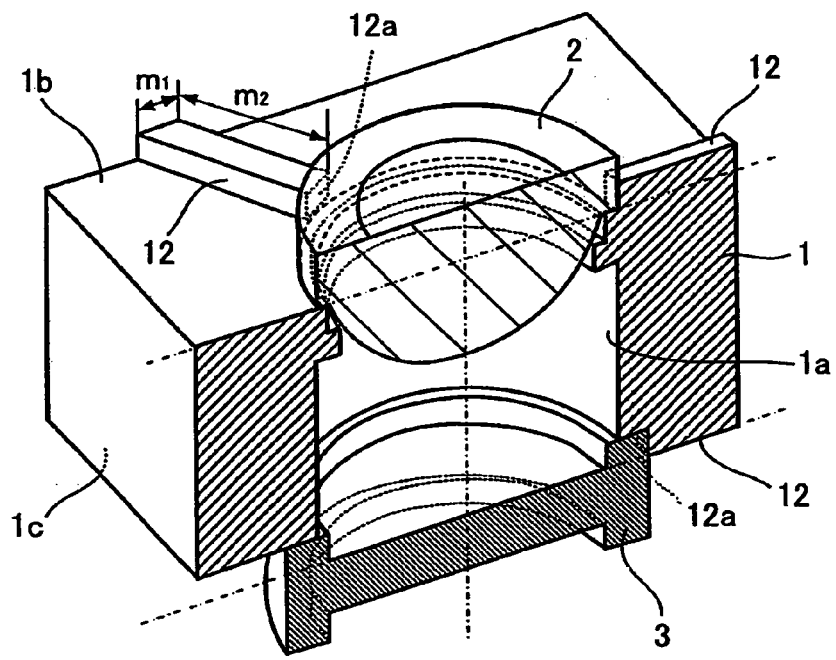
FIG. 5B is a perspective view illustrating a relationship among main elements in a second embodiment of a lens actuator according to the present invention.
Figure 6A:
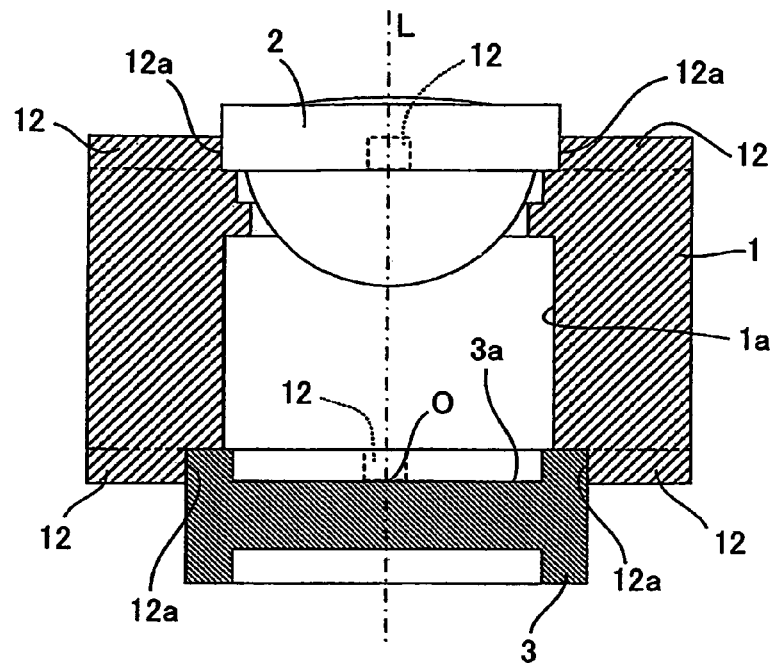
FIG. 6A is a cross-sectional view illustrating a relationship among main elements in a third embodiment of a lens actuator according to the present invention.
Figure 6B:
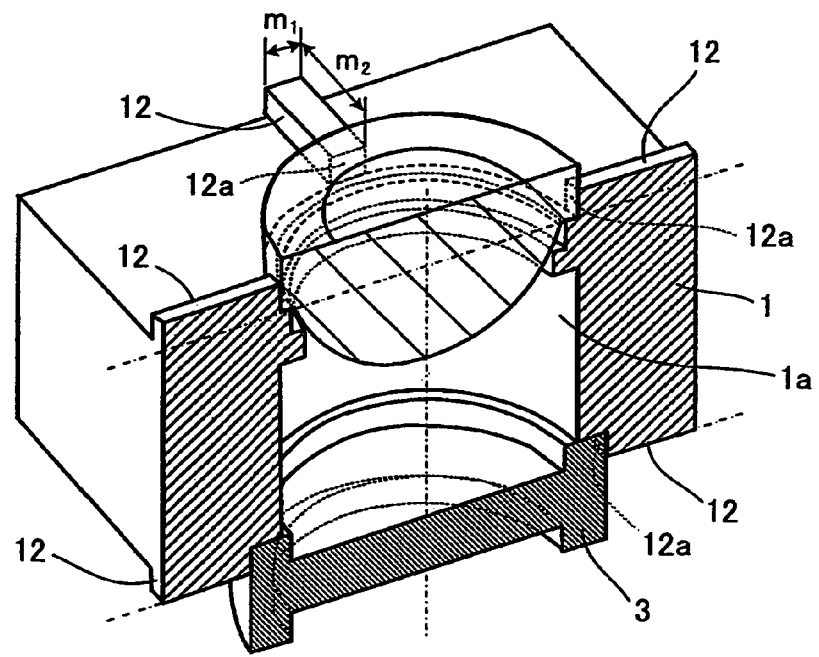
FIG. 6B is a perspective view illustrating a relationship among main elements in a third embodiment of a lens actuator according to the present invention.

In a second embodiment shown in FIGS. 5A and 5B and a third embodiment shown in FIGS. 6A and 6B, a rib-shaped protrusion 12 is formed on the lens holder 1. In the following, the same reference numerals are given to members corresponding to the members described with reference to FIGS. 4A and 4B and detailed description thereof is omitted.

As shown in FIGS. 5A and 5B and FIGS. 6A and 6B, in the protrusion 12, a length $m_1$ of an end surface 12a in a circumferential direction of the objective lens 2 and the diffractive element 3 brought into contact with the objective lens 2 and the diffractive element 3 is set to be shorter than a length $m_2$ of a portion extending in a direction orthogonal to the optical axis L of the objective lens 2 in the protrusion 12.

Effects of positioning are the same as those in the first embodiment. However, in principle, if the lens holder 1 is configured to have a uniform thickness and a beam from a center to an end thereof as in the lens holder 51 shown in FIG. 12, such a lens holder 1 is not desirable for higher resonance in terms of structural strength. When the beam is required to be disposed, preferably, a shape of the beam is determined such that the thickness of the beam is minimized and an entire structure is reinforced.

In accordance with this, as in the second and third embodiments, by forming the protrusion 12 having a plane surface for positioning into a rib shape radially extending in a direction orthogonal to the optical axis L of the objective lens 2, it is possible to provide a high rigid structure to the lens holder relative to volume for the positioning structure and a mass increase.

In the second embodiment shown in FIGS. 5A and 5B, three rib-shaped protrusions 12 are disposed with substantially the same degrees (120 degrees in this example) relative to the optical axis L of the objective lens 2 and in directions orthogonal to the optical axis L. In the third embodiment shown in FIGS. 6A and 6B, four rib-shaped protrusions 12 are disposed with the same degrees (90 degrees in this case) relative to the optical axis L of the objective lens 2 and in directions orthogonal to the optical axis L.

Further, in the third embodiment, two of the four protrusions 12 are disposed in a radial direction and two of the four protrusions 12 are disposed in a tangential direction relative to an optical disc to be followed by the lens holder 1. This positioning using direction cosine is suitable for production with stable quality taking into consideration degradation of signal characteristics due to an eccentric error. In other words, it is possible to realize a high-performance lens actuator unit in which size control and characteristic control are readily made.

Figure 7A:
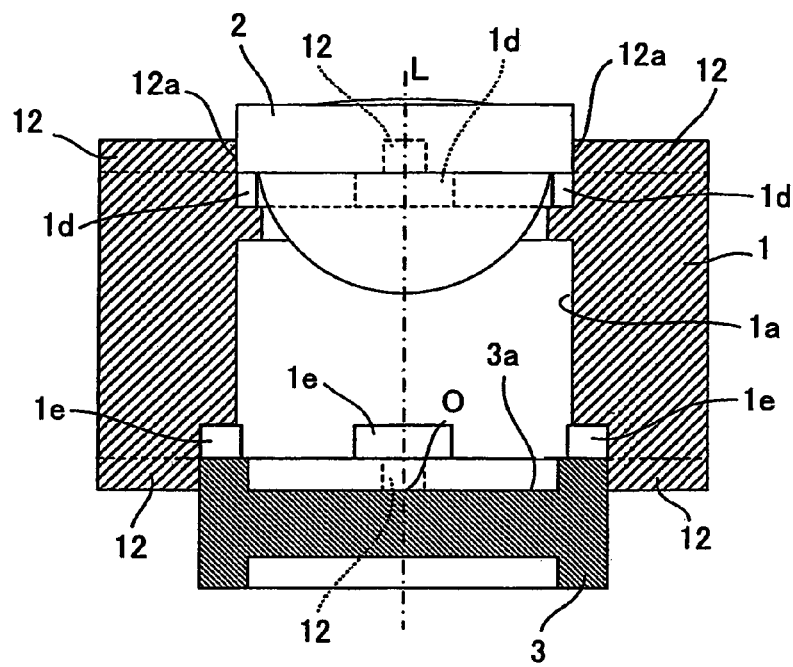
FIG. 7A is a cross-sectional view illustrating a relationship among main elements in a fourth embodiment of a lens actuator according to the present invention.
Figure 7B:
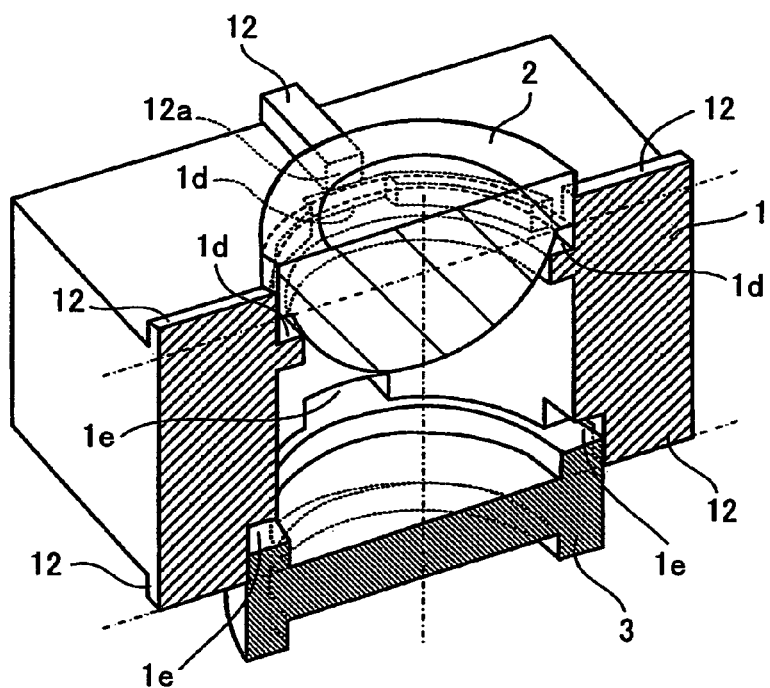
FIG. 7B is a perspective view illustrating a relationship among main elements in a fourth embodiment of a lens actuator according to the present invention.

In a fourth embodiment shown in FIGS. 7A and 7B, based on the third embodiment, void portions 1d and 1e are formed on portions in a direction of the optical axis L of the objective lens 2 (upward and downward directions in the drawing) in the lens holder 1 in which the end surface 12a of the protrusion 12 is in contact with the circumferential surface of the objective lens 2 or the diffractive element 3 such that the void portions 1d and 1e are not in contact with the objective lens 2 or the diffractive element 3 to perform positioning.

In this manner, it is possible to provide a small structure capable of performing stable positioning without being influenced by a size or unevenness of a curved surface shape (round shape) generated at a corner of an axis of the columnar shape or hole in the diffractive element 3.

In other words, as shown in the drawings, in the void portions 1d and 1e, the plane surface for positioning the objective lens 2 and the diffractive element 3 in the optical axis direction L is not disposed in upward and downward directions of the lens holder 1. Accordingly, upon performing three dimensional positioning in total, two dimensional positioning of the outer shape and one dimensional positioning in the height direction are independently performed, so that it is possible to eliminate generation of floating or tilt resulting from interference of curved surfaces generated at the corner of the columnar shape.

Figure 8A:
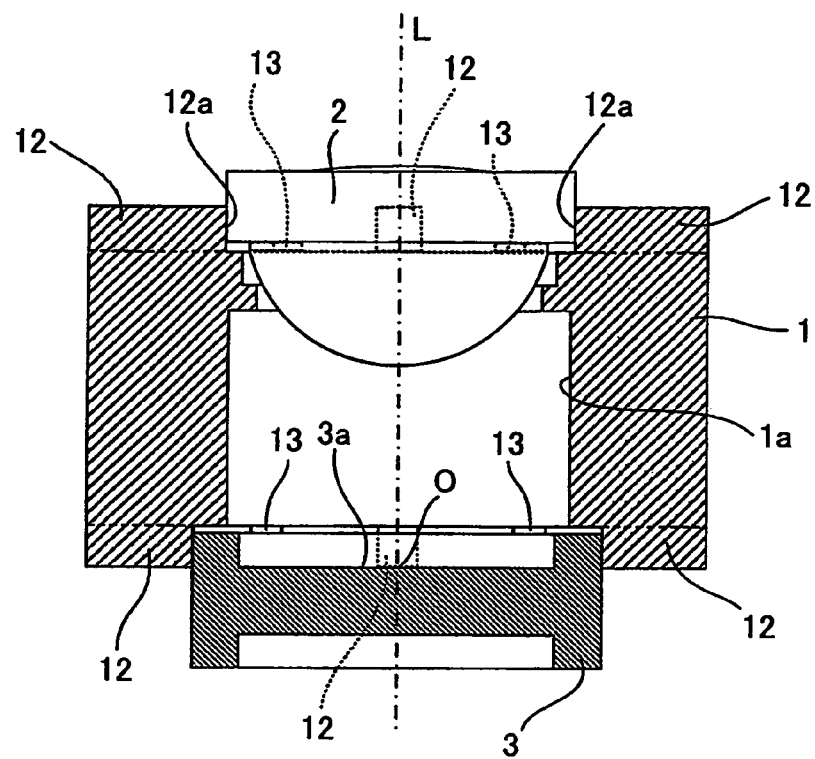
FIG. 8A is a cross-sectional view illustrating a relationship among main elements in a fifth embodiment of a lens actuator according to the present invention.
Figure 8B:
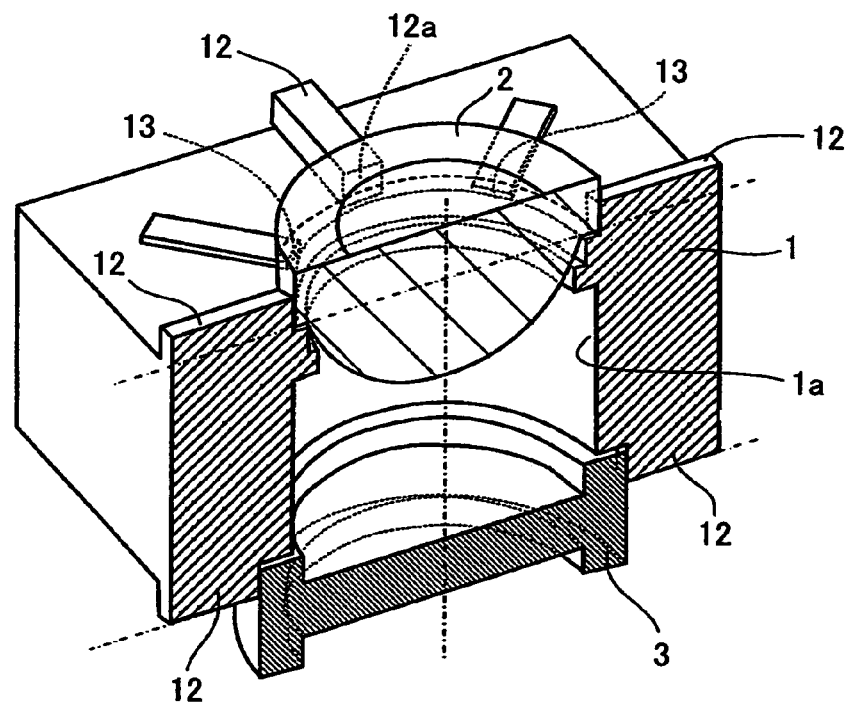
FIG. 8B is a perspective view illustrating a relationship among main elements in a fifth embodiment of a lens actuator according to the present invention.

A fifth embodiment shown in FIGS. 8A and 8B is a variation of the fourth embodiment. In the fifth embodiment, plane surfaces 13 for positioning the objective lens 2 and the diffractive element 3 in the optical axis direction are formed with a small area on at least three positions (although only two positions are shown in the figure, the other side of the cross-sectional view has two positions, thereby having four positions in total). In this structure, positioning is performed with higher accuracy in comparison with the fourth embodiment in which portions for positioning in the optical axis L direction are not provided.

Figure 9A:
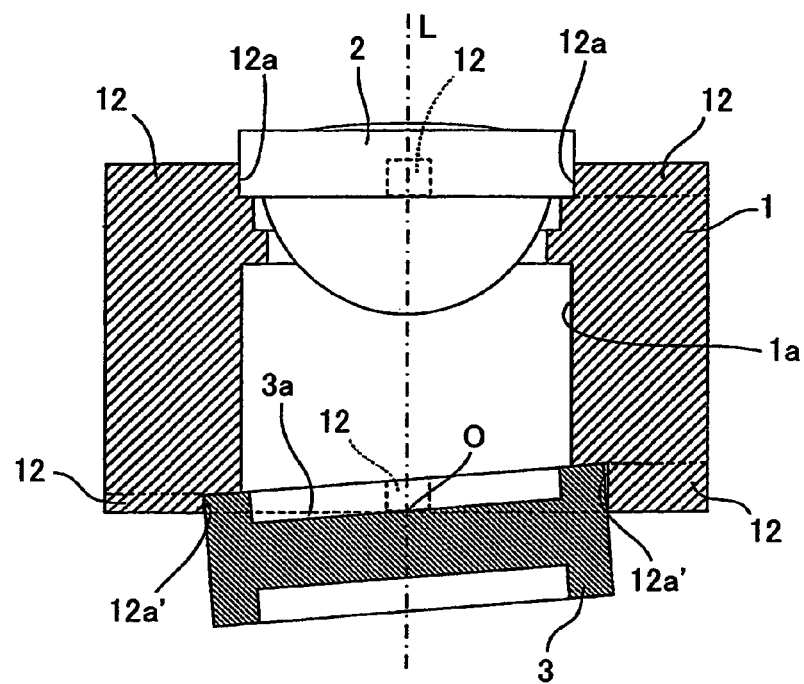
FIG. 9A is a cross-sectional view illustrating a relationship among main elements in a sixth embodiment of a lens actuator according to the present invention.
Figure 11A:
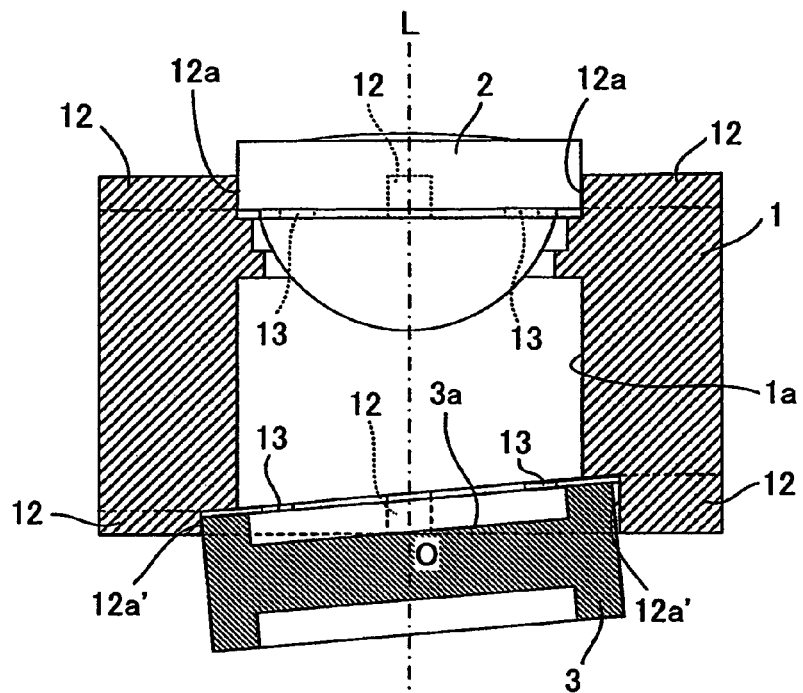
FIG. 11A is a cross-sectional view illustrating a relationship among main elements in an eighth embodiment of a lens actuator according to the present invention.
Figure 11B:
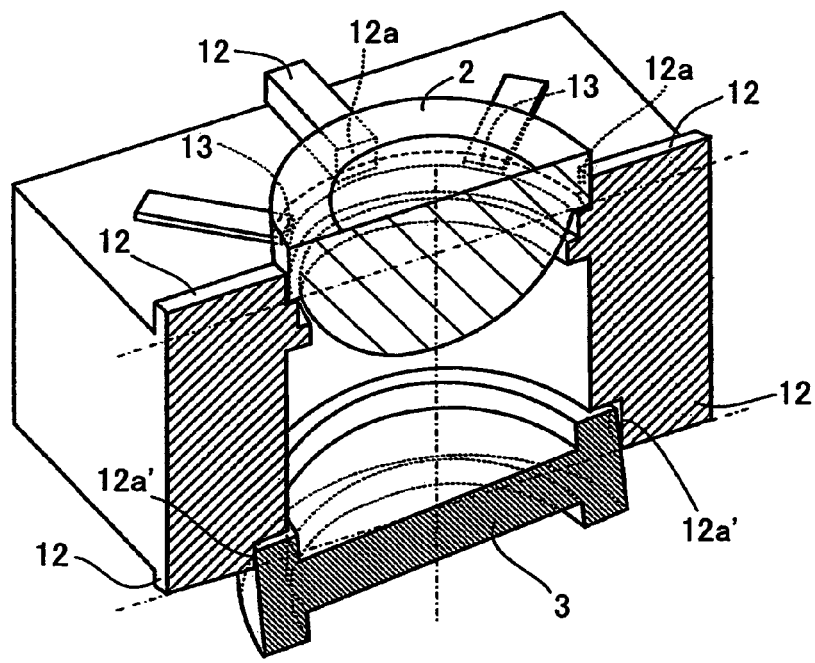
FIG. 11B is a perspective view illustrating a relationship among main elements in an eighth embodiment of a lens actuator according to the present invention.
Figure 11C:
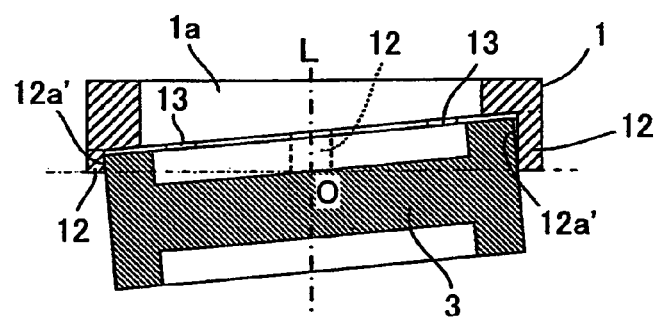
FIG. 11C is an enlarged cross-sectional view showing a diffractive element in an eighth embodiment of a lens actuator according to the present invention.

FIGS. 9A and 11C are diagrams illustrating sixth to eighth embodiments of the lens actuator according to the present invention. The drawings of cross-sectional views, perspective views, and enlarged cross-sectional views illustrate a relationship among main elements in the lens actuator, namely, a relationship among the objective lens, diffractive element, and lens holder.

Figure 9B:
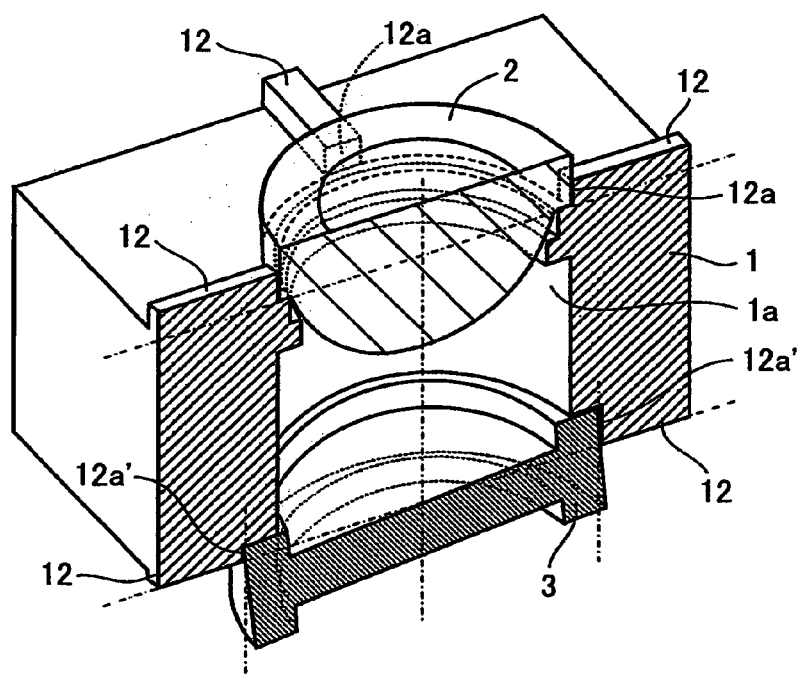
FIG. 9B is a perspective view illustrating a relationship among main elements in a sixth embodiment of a lens actuator according to the present invention.
Figure 9C:
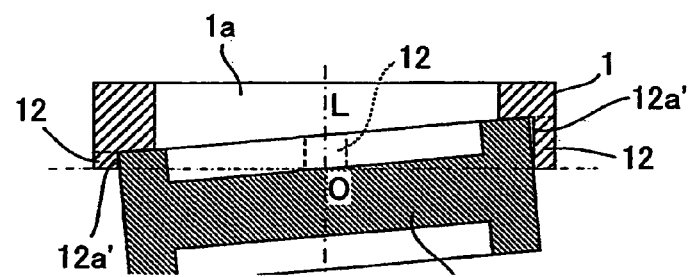
FIG. 9C is an enlarged cross-sectional view showing a diffractive element in a sixth embodiment of a lens actuator according to the present invention.

In the sixth embodiment shown in FIGS. 9A to 9C, based on the third embodiment shown in FIGS. 6A and 6B, the diffractive element 3 is installed in a tilted manner so as to prevent flare. In the four protrusions 12 in contact with the outer cylindrical surface of the diffractive element 3, plane surfaces of end surfaces 12a' in the two protrusions 12 present in a direction orthogonal to a tilted rotation axis (right and left direction in the drawing) among the four protrusion 12 in contact with the outer cylindrical surface of the diffractive element 3, the end surfaces 12a' being in contact with the outer cylindrical surface of the diffractive element 3, are disposed with a shift from the outer cylindrical surface of the diffractive element 3 without tilt such that the outer cylindrical surface of the tilted diffractive element 3 is inscribed and the diffraction pattern center O facing the objective lens 2 corresponds to the optical axis L of the objective lens 2.

Figure 1A:
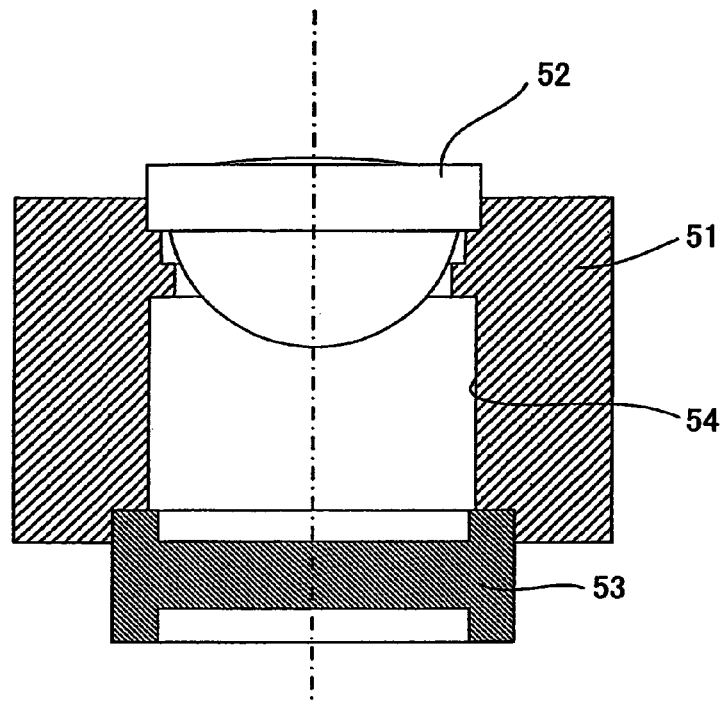
FIG. 1A is cross-sectional view illustrating a relationship among main elements in a conventional lens actuator.
Figure 1B:
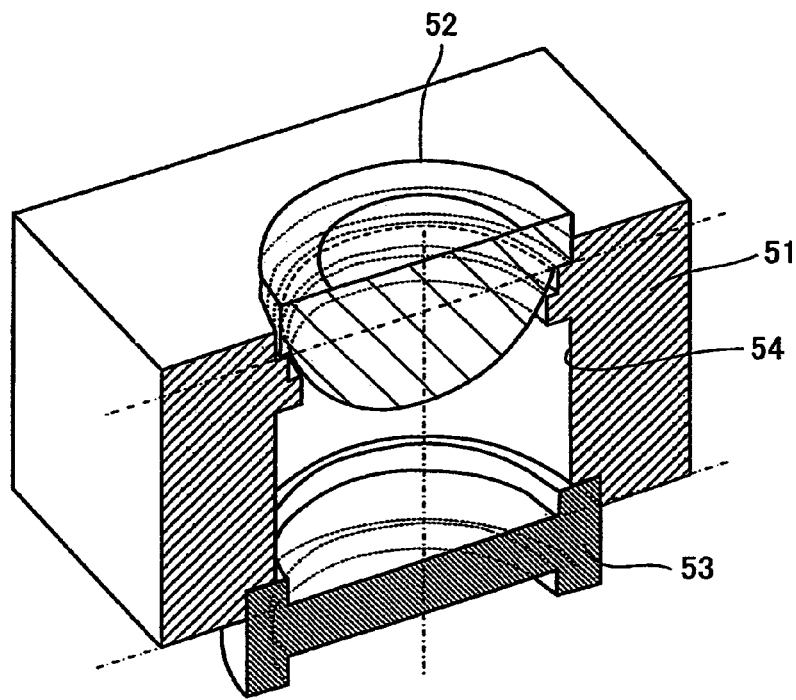
FIG. 1B is a perspective view illustrating a relationship among main elements in a conventional lens actuator.
Figure 2A:
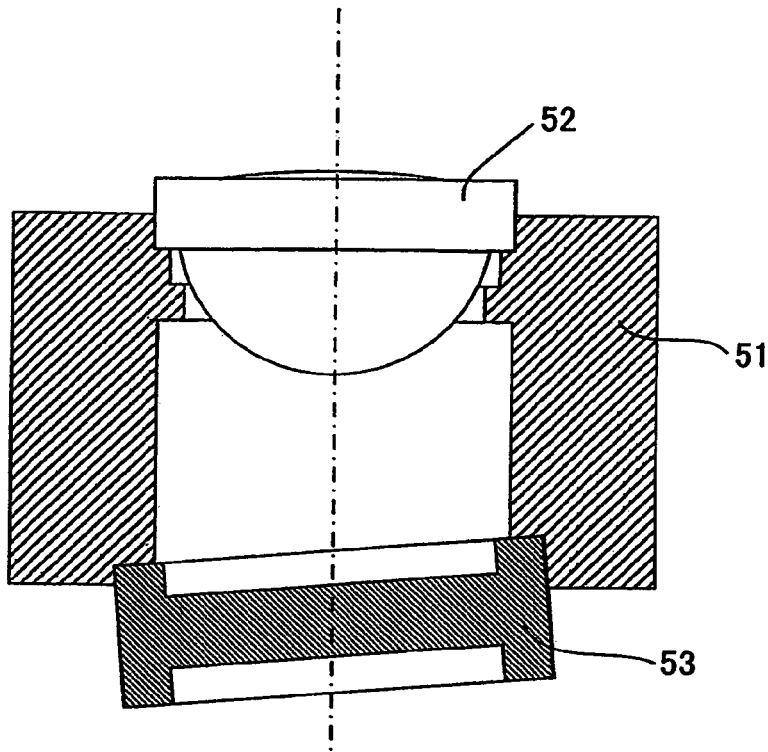
FIG. 2A is cross-sectional view illustrating another relationship among main elements in a conventional lens actuator.
Figure 2B:
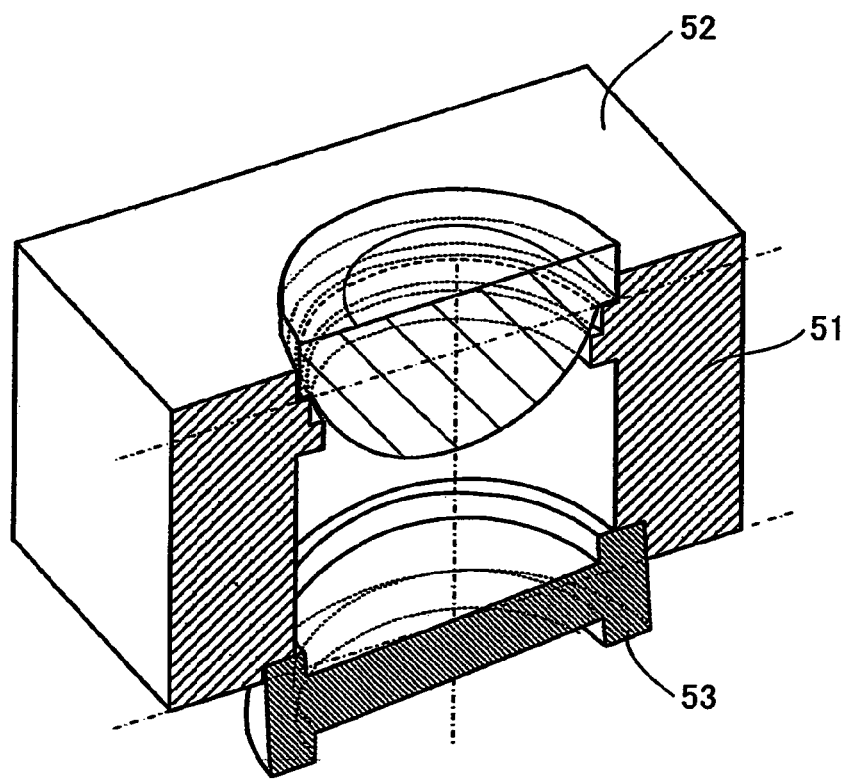
FIG. 2B is a perspective view illustrating another relationship among main elements in a conventional lens actuator.

The conventional structure shown in FIGS. 2A and 2B, a tilted cylindrical hole is formed at an installation position of the diffractive element 3, so that it is substantially difficult to manufacture parts taking into consideration required accuracy. However, in the sixth embodiment, manufacturing is readily made.

In other words, in accordance with rotation of the diffractive element 3 on the diffraction pattern center O facing the objective lens 2, the outer cylindrical surface of the diffractive element 3 is inscribed and the cylindrical hole 1a in the direction orthogonal to the rotation axis in the lens holder 1 is formed as tilted. In accordance with this, it is possible to position the outer cylindrical surface of the diffractive element 3 with high accuracy without having a tilted cylindrical hole or a tilted surface as in the above-mentioned conventional examples. As a result of this, it is possible to manufacture the lens holder 1 using a metal mold separating the lens holder 1 in the optical axis direction L and to improve assembly accuracy.

Figure 10A:
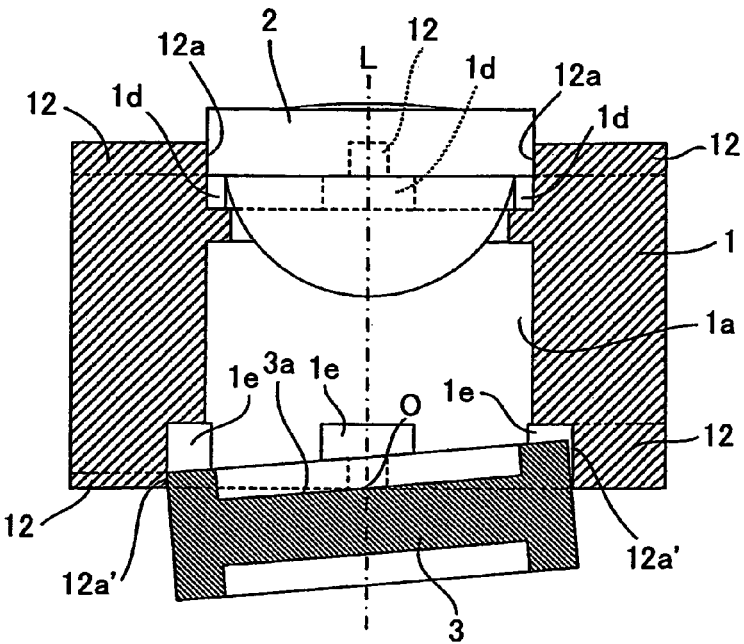
FIG. 10A is a cross-sectional view illustrating a relationship among main elements in a seventh embodiment of a lens actuator according to the present invention.
Figure 10B:
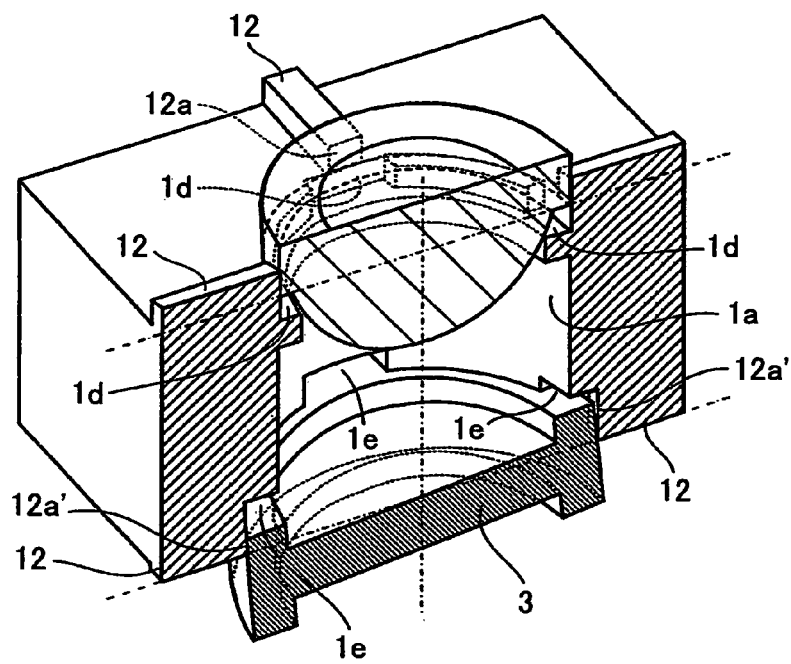
FIG. 10B is a perspective view illustrating a relationship among main elements in a seventh embodiment of a lens actuator according to the present invention.
Figure 10C:
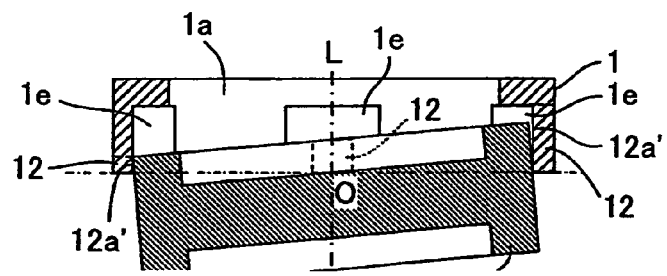
FIG. 10C is an enlarged cross-sectional view showing a diffractive element in a seventh embodiment of a lens actuator according to the present invention.

In the seventh embodiment shown in FIGS. 10A, 10B, and 10C, the same reference numerals are given to members corresponding to the above-mentioned members and detailed description thereof is omitted. Based on the sixth embodiment, the interference prevention structure at corner portions in the fourth embodiment is incorporated. Accordingly, the void portions 1d and 1e are formed on portions in the optical axis L direction of the objective lens 2 in the lens holder 1 in which the end surfaces 12a and the end surfaces 12a' of the protrusions 12 are in contact with the circumferential surfaces of the objective lens 2 and the diffractive element 3 such that the void portion 1d and void portion 1e are not in contact with the objective lens 2 or the diffractive element 3 to perform positioning.

In the eighth embodiment shown in FIGS. 11A, 11B, and 11C, the same reference numerals are given to members corresponding to the above-mentioned members and detailed description thereof is omitted. Based on the sixth embodiment, the plane surface 13 with a small area in the fifth embodiment is incorporated such that the plane surface 13 positions the objective lens 2 and the diffractive element 3 in the optical axis direction.

Figure 12:
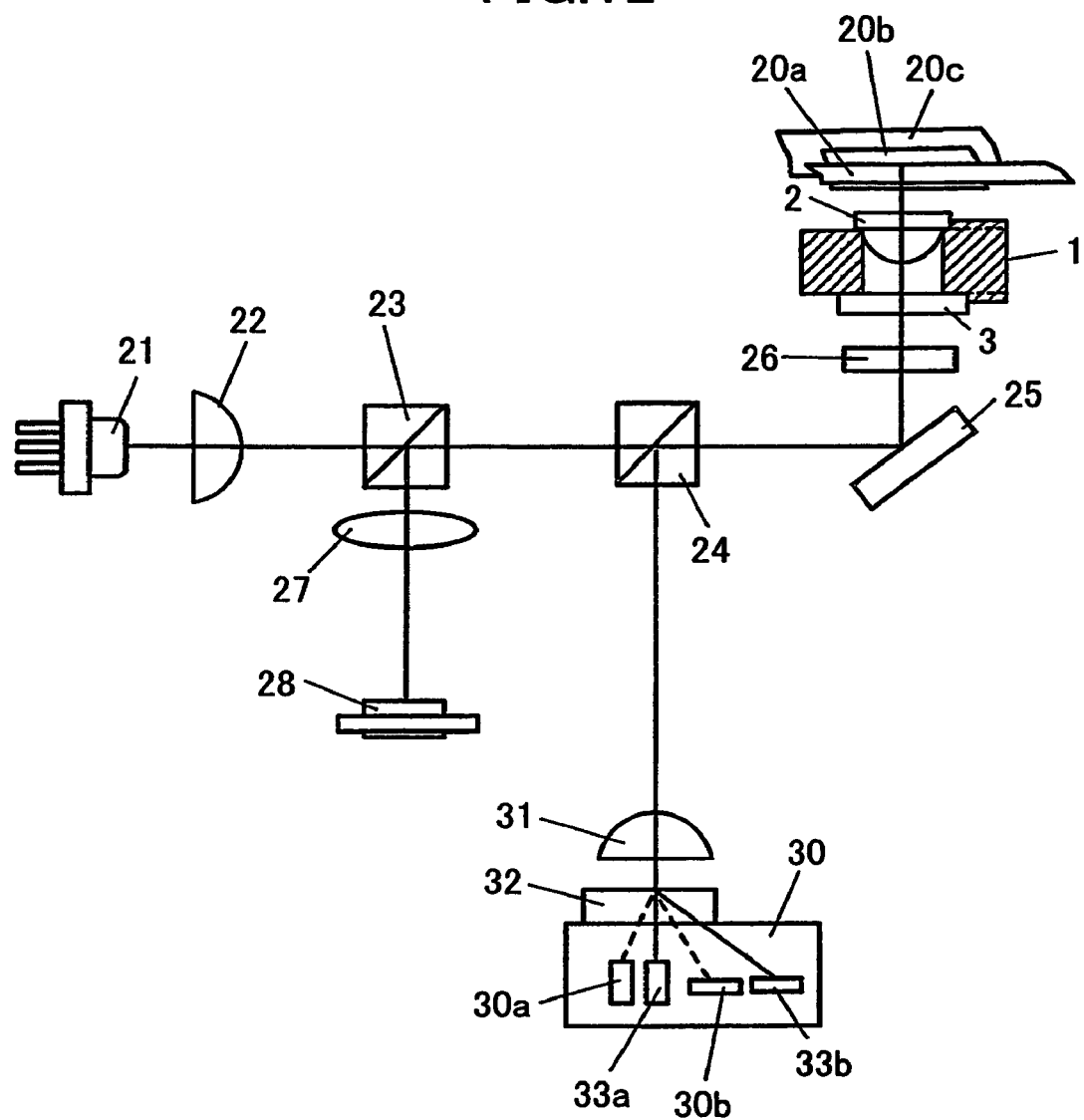
FIG. 12 is a diagram schematically showing an optical pickup device on which an objective lens actuator according to an embodiment of the present invention is installed.

FIG. 12 is a diagram schematically showing an optical pickup device on which the objective lens actuator according to the embodiment of the present invention is installed. The optical pickup device employs a compatible optical pickup in which the single objective lens 2 disposed on the lens holder 1 performs recording or reproducing with different numerical apertures (NA) on three types of optical storage media (BD, DVD, CD) 20a, 20b, and 20c using different wavelengths of light sources.

Substrate thicknesses of the optical storage media 20a, 20b, and 20c of BD, DVD, and CD are 0.1 mm, 0.6 mm, and 1.2 mm, respectively. Further, the numerical apertures (NA)

for the optical storage media 20a; 20b, and 20c of BD, DVD, and CD are: NA=0.85, NA=0.65, and NA=0.50, respectively. Wavelengths λ1, λ2, λ3 of first to third light sources are: λ1=395 to 415 nm, λ2=650 to 670 nm, and λ3=770 to 805 nm, respectively.

The optical pickup shown in FIG. 12 includes, for the BD optical storage medium 20a, a semiconductor laser 21, collimator lens 22, polarization beam splitter 23, wavelength-selective beam splitter 24, deflection prism 25, ¼ wave plate 26, aberration correction element (diffractive element) 3, objective lens 2, detection lens 27, and light receiving element 28. A central wavelength of the semiconductor laser 21 used as the first light source is 405 nm and the numerical aperture (NA) thereof is 0.85. The objective lens 2 and the aberration correction element (diffractive element) 3 constituting the objective lens actuator are disposed on the single lens holder 1 as in each embodiment shown in FIGS. 4A to 11C. Further, the substrate thickness of the BD optical storage medium 20a is 0.1 mm.

A light emitted from the semiconductor laser 21 is made substantially parallel by the collimator lens 22. The light passing through the collimator lens 22 is projected onto the polarization beam splitter 23 and deflected by the deflection prism 25. Then, the deflected light is converted to a circular polarized light by the ¼ wave plate 26 and condensed on the BD optical storage medium 20a via the objective lens 2, thereby performing recording and reproduction of information. A light reflected from the BD optical storage medium 20a passes through the ¼ wave plate 26 and is subsequently converted to a linearly polarized light orthogonal to a polarization direction of the light upon projection on the optical storage medium 20a. The converted light is separated into reflected and incident lights by the polarization beam splitter 23 and is deflected. The deflected light is introduced on the light receiving element 28 by the detection lens 27, where a reproduction signal, focus error signal, and track error signal are detected and the detected signal become a driving control signal for the drive coil 4 or 5.

This optical pickup includes a laser unit 30 of two wavelengths emitting a laser beam for the DVD optical storage medium 20b and a laser beam for the CD optical storage medium 20c, so that it is possible to project laser beams having wavelengths different from each other.

A light emitted to the DVD optical storage medium 20b from a DVD semiconductor laser 30a with a central wavelength of 660 nm passes through a collimator lens 31 and the wavelength-selective beam splitter 24, and the light is deflected by the deflection prism 25. The deflected light is condensed on the DVD optical storage medium 20b via the ¼ wave plate 26, aberration correction element 3, and objective lens 2. The substrate thickness of the DVD optical storage medium 20b is 0.6 mm and the numerical aperture (NA) is 0.65. Switching of NA is limited by the aberration correction element 3. A light reflected from the DVD optical storage medium 20b passes through the objective lens 2 and the ¼ wave plate 26 and is subsequently deflected by the wavelength-selective beam splitter 24. The deflected light is separated from the incident light by a hologram element 32 and is introduced on a DVD light receiving element 30b, where a reproduction signal, focus error signal, and track error signal are detected.

Further, a light emitted to the CD optical storage medium 20c from a CD semiconductor laser 33a with a central wavelength of 785 nm passes through the collimator lens 31 and the wavelength-selective beam splitter 24, and the light is deflected by the deflection prism 25. The deflected light is condensed on the CD optical storage medium 20c via the ¼ wave plate 26, aberration correction element 3, and objective lens 2. The substrate thickness of the CD optical storage medium 20c is 1.2 mm and the numerical aperture (NA) of the objective lens 2 is 0.50. Switching of NA is limited by the aberration correction element 3. A light reflected from the CD optical storage medium 20c passes through the objective lens 2 and the ¼ wave plate 26 and is subsequently deflected by the wavelength-selective beam splitter 24. The deflected light is separated from the incident light by the hologram element 32 and is introduced on a CD light receiving element 33b, where the reproduction signal, focus error signal, and track error signal are detected.

Figure 13:
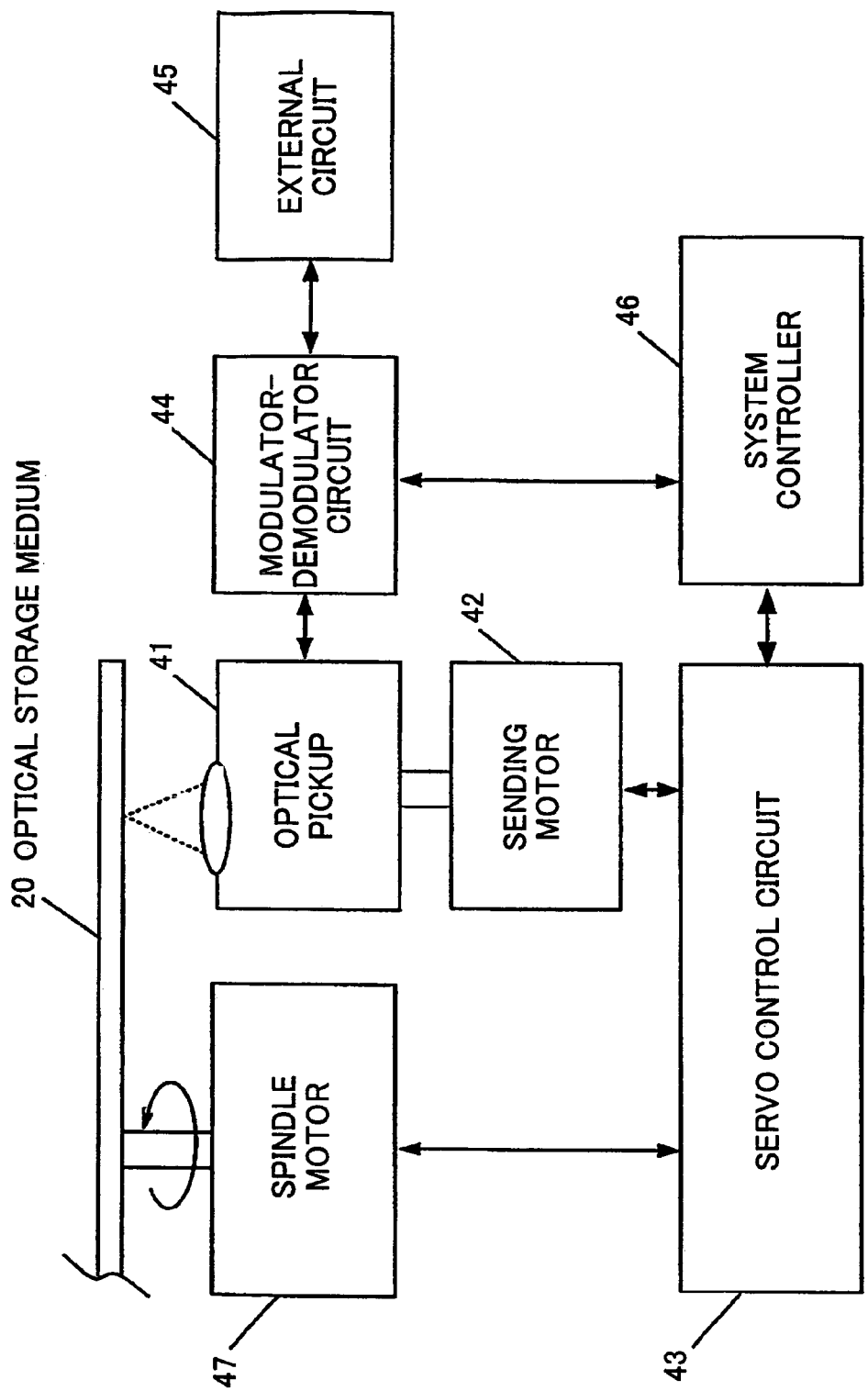
FIG. 13 is a block diagram schematically showing an optical recording and reproducing apparatus on which an optical pickup device according to an embodiment of the present invention is installed.

FIG. 13 is a block diagram schematically showing an optical recording and reproducing apparatus on which the optical pickup device according to the above-mentioned embodiment of the present invention is installed. The apparatus performs at least one of reproduction, recording, and deletion of information on an optical storage medium.

In the present embodiment, an optical pickup 41 corresponding to the optical pickup shown in FIG. 12 is included. Further, the optical recording and reproducing apparatus according to the present embodiment includes a spindle motor 47 rotating the optical storage medium 20, optical pickup 41 used upon recording or reproducing information signals, sending motor 42 moving the optical pickup 41 in an inner circumference and on a circumference of the optical storage medium 20, modulator-demodulator circuit 44 performing predetermined modulation and demodulation processes, servo control circuit 43 performing servo control on the optical pickup 41, and system controller 46 performing control on the entire optical recording and reproducing apparatus.

The spindle motor 47 is driven by the servo control circuit 43 and is rotated at predetermined rotation numbers. In other words, the optical storage medium 20 used as recording and reproducing subject is chucked on a driving shaft of the spindle motor 47 and is driven by the servo control circuit 43. The optical storage medium 20 is rotated by the spindle motor 47 at the predetermined rotation numbers.

When the optical pickup 41 records and reproduces information signals on the optical storage medium 20, the optical pickup 41 projects a laser beam onto the rotating optical storage medium 20 and detects a light reflected therefrom as mentioned above. The optical pickup 41 is connected to the modulator-demodulator circuit 44. When the optical pickup 41 records the information signals, signals input from an external circuit 45 and subjected to a predetermined modulation process by the modulator-demodulator circuit 44 are supplied to the optical pickup 41. The optical pickup 41 projects a laser beam subjected to optical intensity modulation on the optical storage medium 20. When the optical pickup 41 reproduces the information signals, the optical pickup 41 projects a laser beam with a constant output onto the rotating optical storage medium 20 and reproduction signals are generated from a light returning therefrom and the reproduction signals are supplied to the modulator-demodulator circuit 44.

Further, the optical pickup 41 is connected to the servo control circuit 43. Upon recording and reproducing the information singles, the focus servo signal and tracking servo signal are generated from the light reflected by the rotating optical storage medium 20 and returning therefrom as mentioned above. These servo signals are supplied to the servo control circuit 43.

The modulator-demodulator circuit 44 is connected to the system controller 46 and the external circuit 45. Upon recording the information signals in the optical storage medium 20, the modulator-demodulator circuit 44 receives signals to be recorded in the optical storage medium 20 from the external circuit 45 and performs a predetermined modulation process on the signals under control by the system controller 46.

The signals modulated by the modulator-demodulator circuit 44 are supplied to the optical pickup 41. Further, upon reproducing the information signals from the optical storage medium 20, the modulator-demodulator circuit 44 receives reproduction signals from the optical pickup 41, the reproduction signals being reproduced from the optical storage medium 20, and performs a predetermined demodulation process on the reproduction signals under control by the system controller 46. Then, the signals demodulated by the modulator-demodulator circuit 44 are output from the modulator-demodulator circuit 44 to the external circuit 45.

The sending motor 42 moves the optical pickup 41 to a predetermined position in a radial direction of the optical storage medium 20 upon recording and reproducing the information signals. The sending motor 42 is moved on the basis of a control signal from the servo control circuit 43. In other words, the sending motor 42 is connected to the servo control circuit 43 and is controlled by the servo control circuit 43.

The servo control circuit 43 controls the sending motor 42 such that the optical pickup 41 is moved to the predetermined position facing the optical storage medium 20 under control by the system controller 46. The servo control circuit 43 is connected to the spindle motor 47 and controls operation of the spindle motor 47 under control by the system controller 46. In other words, the servo control circuit 43 controls the spindle motor 47 such that the optical storage medium 20 is rotated at predetermined rotation numbers upon recording and reproducing the information signals relative to the optical storage medium 20.

Further, a method for judging types of optical storage media may use a tracking servo signal or a focus servo signal.

By employing the optical pickup device according to the present invention in an optical recording and reproducing apparatus performing recording and reproducing processes on plural types of optical storage media, it is possible to improve quality of information recording and reproducing on optical storage media having different substrate thicknesses.

It is possible to apply the present invention to a lens actuator driving an objective lens condensing a light beam on various types of optical storage media such as CDs, DVDs, and the like, various types of optical pickup devices and optical recording and reproducing apparatuses on which the lens actuator is installed.

In addition to the above-mentioned description, other embodiments of the present invention will be described with reference to the accompanying drawings.

Figure 14A:
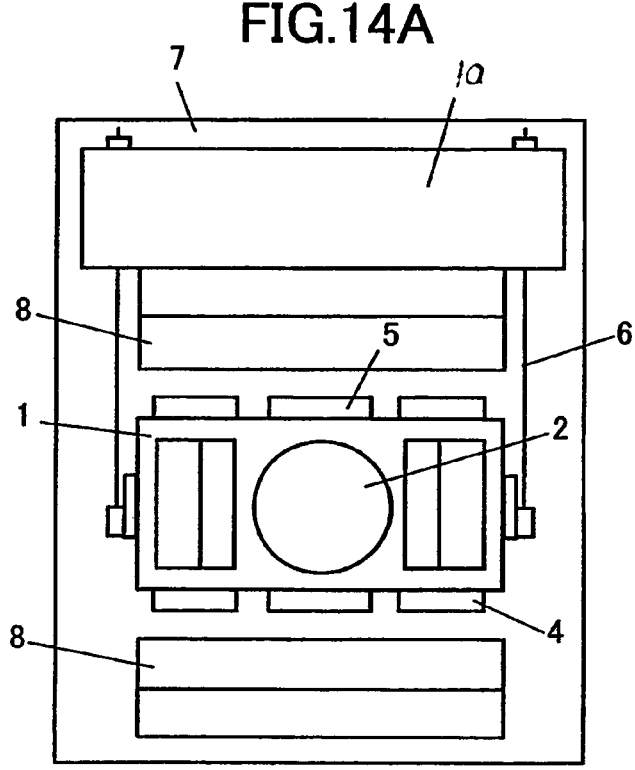
FIG. 14A is a front view showing an embodiment of an optical pickup device on which an objective lens actuator according to the present invention is installed.
Figure 14B:
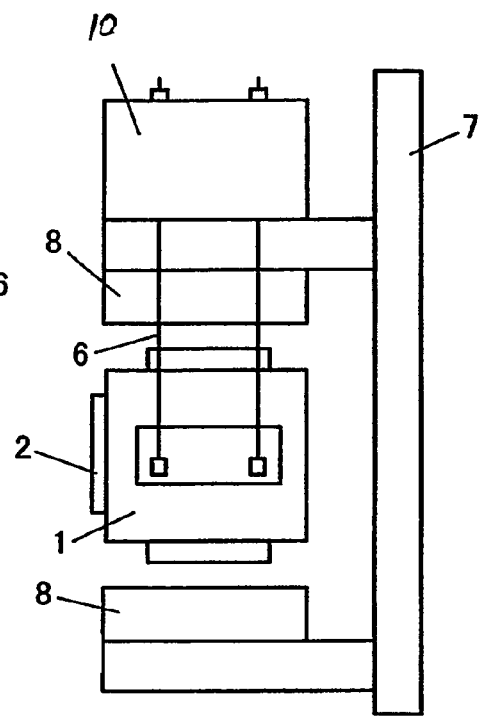
FIG. 14B is a side elevational view showing an embodiment of an optical pickup device on which an objective lens actuator according to the present invention is installed.

FIG. 14A is a front view showing an embodiment of an optical pickup device on which an objective lens actuator according to the present invention is installed. FIG. 14B is a side elevational view showing the embodiment of the optical pickup device on which the objective lens actuator according to the present invention is installed. And, FIG. 14C is a bottom view showing the embodiment of the optical pickup device on which the objective lens actuator according to the present invention is installed.

Figure 14C:
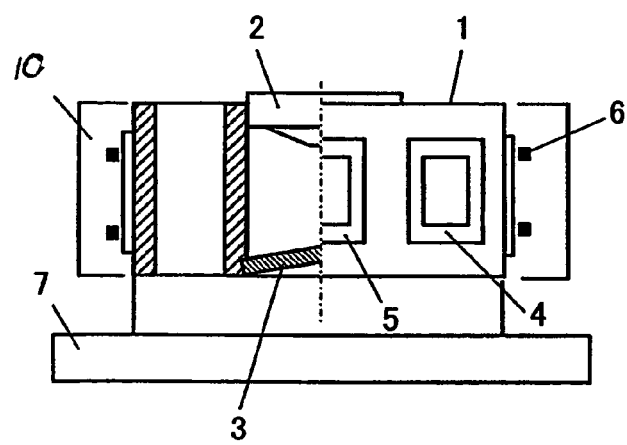
FIG. 14C is a bottom view showing an embodiment of an optical pickup device on which an objective lens actuator according to the present invention is installed.

In FIGS. 14A, 14B, and 14C, the lens holder 1 as a movable unit is a casing holding the objective lens 2 on an upper portion thereof, the objective lens 2 condensing a light beam on an optical disc not shown in the drawings so as to form a beam spot, and also holding the diffractive element 3 as will be described later on a lower portion thereof. The drive coil 4 for focusing and the drive coil 5 for tracking are installed on the lens holder 1 and the lens holder 1 is installed on a support block 10 via the support spring 6 functioning as a suspension and a coil feeder line, the support block 10 being disposed on the fixing base 7. The magnet 8 functioning as a back yoke in a magnetic circuit is installed on the fixing base 7. In this magnetic field, the drive coils 4 and 5 of the lens holder 1 are disposed and the lens holder 1 is driven in a focusing direction and a tracking direction in accordance with an electromagnetic action of the drive coils 4 and 5 to be energized and the magnet 8.

FIGS. 15 to 23 are drawings for illustrating embodiments of the lens actuator according to the present invention. The drawings of cross-sectional views and perspective views illustrate a relationship among main elements in the lens actuator, namely, a relationship among the objective lens, diffractive element, and lens holder.

Figure 15:
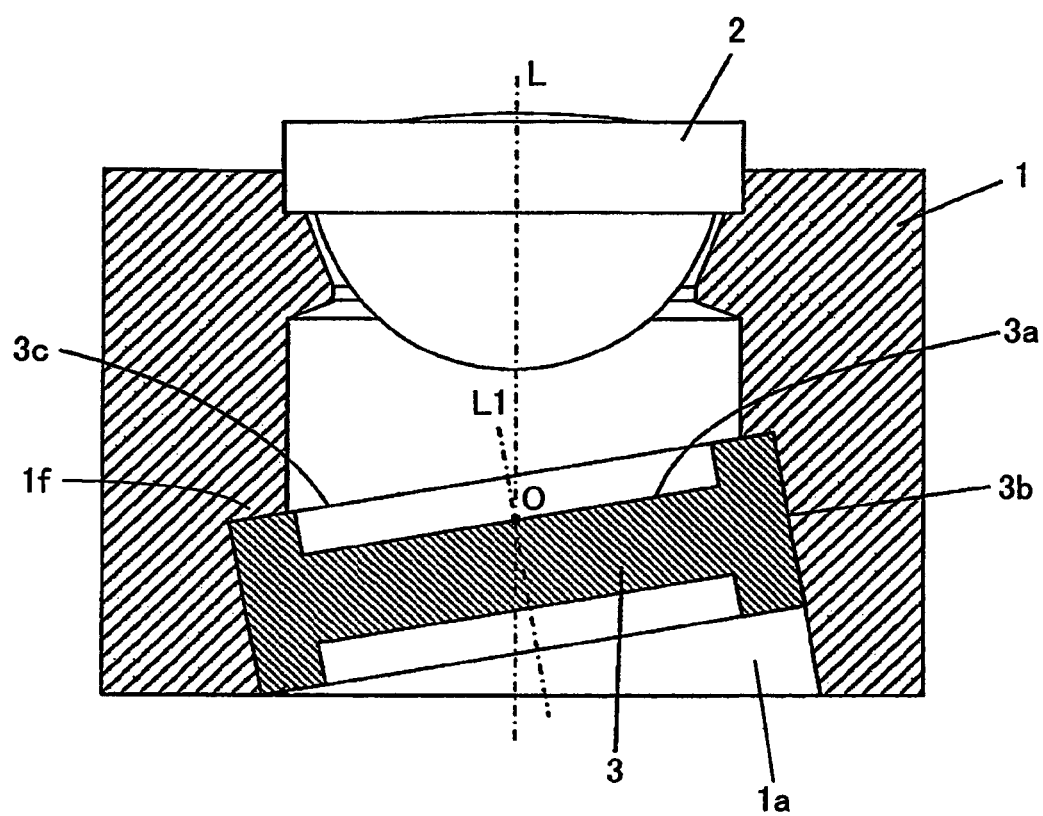
FIG. 15 is a cross-sectional view illustrating a relationship among main elements in a ninth embodiment of a lens actuator according to the present invention.

As shown in FIG. 15, in the cross-sectional view illustrating a ninth embodiment, the objective lens 2 is fitted and fixed at an upper end of the lens holder 1 and the diffractive element 3 is fitted and fixed at a lower end of the lens holder 1. The fixation of the objective lens 2 and the diffractive element 3 may be performed using a material such as ultraviolet curable resin. The diffractive element 3 is installed on the lens holder 1 in a tilted manner so as to prevent degradation of pickup signals due to flare resulting from surface reflection.

Further, in the present embodiment, a fitting shaft 3b of the diffractive element 3 is fitted into the cylindrical hole 1a of the lens holder 1 such that the diffracting plane 3a of the diffractive element 3 is tilted relative to the optical axis L of the objective lens 2 and the diffraction pattern center O of the diffracting plane 3a in the diffractive element 3 facing the objective lens 2 substantially corresponds to the optical axis L of the objective lens 2.

Specifically, the diffractive element 3 has a discoid shape including a circumferential surface used as the fitting shaft 3b and a plane surface 3c on a top surface side thereof. In the lens holder 1, an internal surface is extended in a tilted manner relative to the optical axis L of the objective lens 2. The lens holder 1 further includes the cylindrical hole 1a into which the fitting shaft 3b of the diffractive element 3 is fitted and a tilted plane surface 1f tilted relative to a virtual surface perpendicular to the optical axis L of the objective lens 2 inside the cylindrical hole 1a and in contact with the plane surface 3c of the diffractive element 3.

As in the ninth embodiment, it is possible to prevent flare resulting from surface reflection by installing the diffracting plane 3a of the diffractive element 3 in a tilted manner relative to the objective lens 2 rather than in a perpendicular manner. And it is possible to obtain preferable optical characteristics with reduced aberration by making the diffraction pattern center O in the diffractive element 3 facing the objective lens 2 substantially correspond to the optical axis L of the objective lens 2.

In the ninth embodiment, the cylindrical hole 1a corresponding to the fitting shaft 3b as an outer shape of the diffractive element 3 is formed in the lens holder 1, the cylindrical hole 1a having an axis of tilt L1 which has the same tilt as that of the diffracting plane 3a relative to the optical axis L of the objective lens 2. In order to form the cylindrical hole 1a, it is necessary to employ a method of forming in which a different movable metal mold is used only for the tilted hole, for example. However, it is expected that this method has limitation in terms of a structure size.

Accordingly, in the following embodiment, the lens holder 1 is formed with a cylindrical hole structure having a central axis parallel with the optical axis L of the objective lens 2 without forming the cylindrical hole 1a in the lens holder 1, the cylindrical hole 1a having the axis of tilt L1 as in the ninth embodiment. In the embodiment, it is possible to position with high accuracy the optical axis L of the objective lens 2 and the diffraction pattern center O in the diffractive element 3 facing the objective lens 2.

Figure 16:
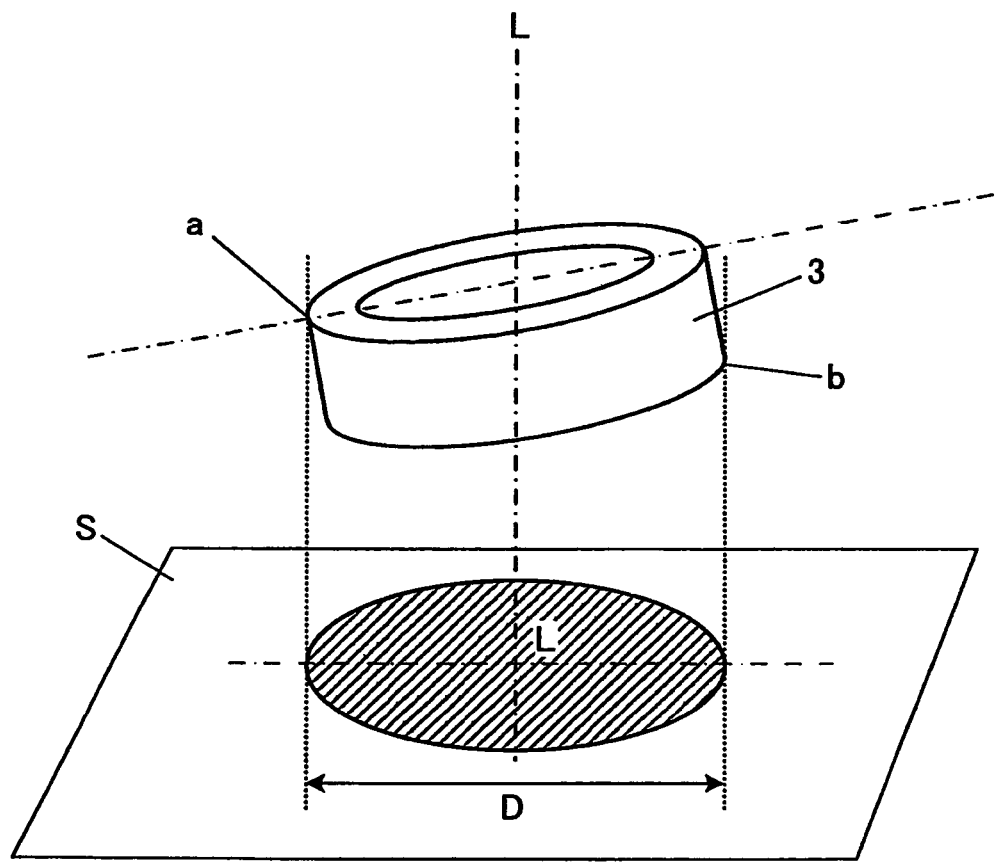
FIG. 16 a diagram illustrating a diffractive element according to an embodiment when projected on a virtual surface.

In this case, in the diffractive element 3 having a general ring-belt diffraction pattern, when an entire shape is formed into a columnar shape in terms of positioning through fitting into the lens holder 1 and readiness of manufacturing of the diffractive element 3 per se, by tilting the diffractive element 3 as mentioned above, in a virtual surface S perpendicular to the optical axis L of the objective lens 2, a projected shape similar to an ellipse is observed shown as shown in FIG. 16.

Figure 17:
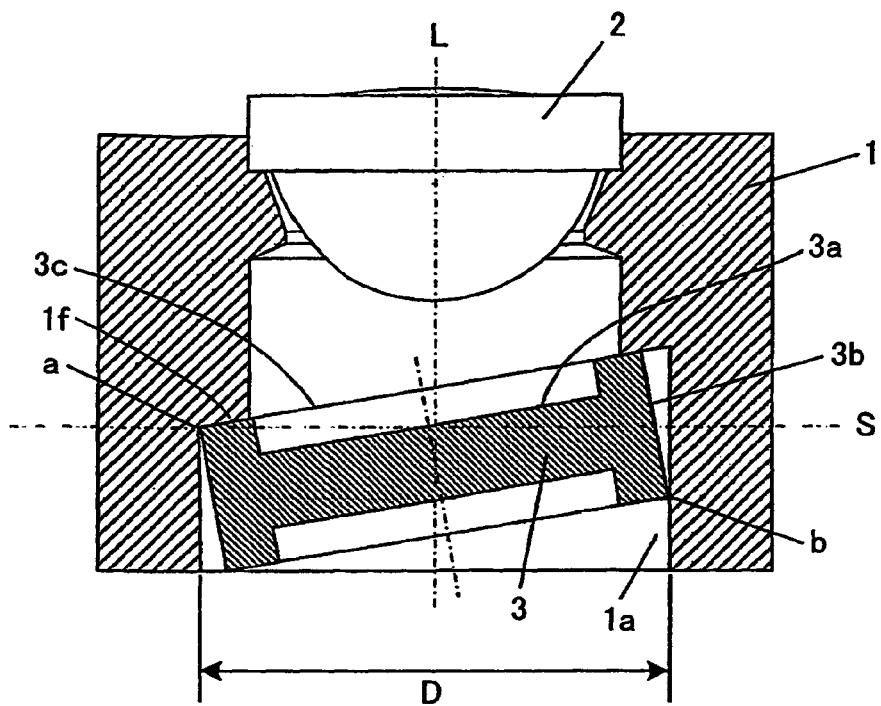
FIG. 17 is a cross-sectional view illustrating a relationship among main elements in a tenth embodiment of a lens actuator according to the present invention.

In view of this, in a tenth embodiment shown in FIG. 17, the cylindrical hole 1a having a cylindrical surface whose diameter is defined by a maximum width D of the projected shape of the diffractive element 3 shown in FIG. 16 is formed such that the central axis thereof is coaxial with the optical axis L of the objective lens 2 in the lens holder 1. Specifically, the diffractive element 3 has a discoid shape including a circumferential surface used as the fitting shaft 3b and the plane surface 3c on a top surface side thereof. In the lens holder 1, an internal surface is extended in parallel with the optical axis L of the objective lens 2. Further, the lens holder 1 includes the cylindrical hole 1a into which the fitting shaft 3b of the diffractive element 3 is fitted in a tilted manner and the tilted plane surface 1f tilted relative to the virtual surface S perpendicular to the optical axis L of the objective lens 2 inside the cylindrical hole 1a and in contact with the plane surface 3c of the diffractive element 3.

According to the tenth embodiment, the cylindrical hole 1a is formed into a circular hole on cross section which is readily processed and has no tilted axis, so that there is no problem in forming the lens holder 1. Further, high-accuracy positioning is expected in a direction of a maximum width on the tilted side of the tilted diffractive element 3 by fitting the diffractive element 3 into an inner diameter of the lens holder 1.

However, the structure of the tenth embodiment has two problems.

As a first problem, when the diffractive element 3 is brought into contact with the tilted plane surface 1f of the lens holder 1, the maximum projection width of the diffractive element 3 in the fitting shaft 3b in the optical axis L of the objective lens 2, the diffractive element 3 being tilted relative to the optical axis L of the objective lens 2, is defined by a distance between two points of an upper left corner a and a lower right corner b shown in FIG. 17. As will be understood from FIG. 17, the diffractive element 3 is rotated on a middle point of the two points of the maximum projection width and the diffractive element 3 is tilted. Accordingly, when the middle point does not correspond to the center of the diffraction pattern center O in the diffractive element 3 facing the objective lens 2, generation of aberration may be increased due to this eccentricity.

As a second problem, the cylindrical hole 1a of the lens holder 1 is a circular hole and a diameter of an entire circumference is the same as the maximum width, so that the diameter is increased in a direction where the maximum projection width is not changed. When the diffractive element 3 is fitted into the lens holder 1, clearance fit is used taking into consideration an influence of optical distortion, so that tolerance allowed for clearance is required. In accordance with this, high-accuracy positioning is difficult in a direction where the maximum projection width is not changed.

Figure 18:
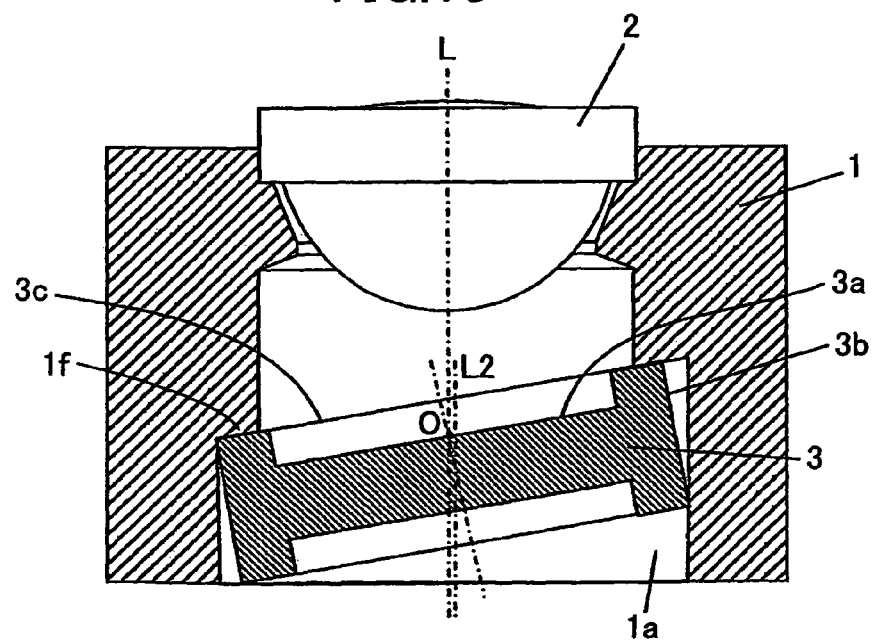
FIG. 18 is a cross-sectional view illustrating a relationship among main elements in an eleventh embodiment of a lens actuator according to the present invention.

An eleventh embodiment shown in FIG. 18 is an example of a structure for dealing with the first problem. A central axis L2 of the cylindrical hole 1a having the cylindrical surface whose diameter is defined by the maximum width D of the projected shape of the diffractive element 3 described in the tenth embodiment is disposed on the lens holder 1 such that the central axis L2 is not coaxial with the optical axis L of the objective lens 2 of the lens holder 1 but is shifted in a parallel manner for eccentricity.

In this manner, when an amount of the eccentricity is set from a positional relationship between the maximum projection width obtained from the fitting shaft 3b and the tilt angle of the diffractive element 3 and the diffraction pattern center O, it is possible to adjust the diffraction pattern center O facing the objective lens 2 to the optical axis L of the objective lens 2 while obtaining the effects of the tenth embodiment.

Figure 19:
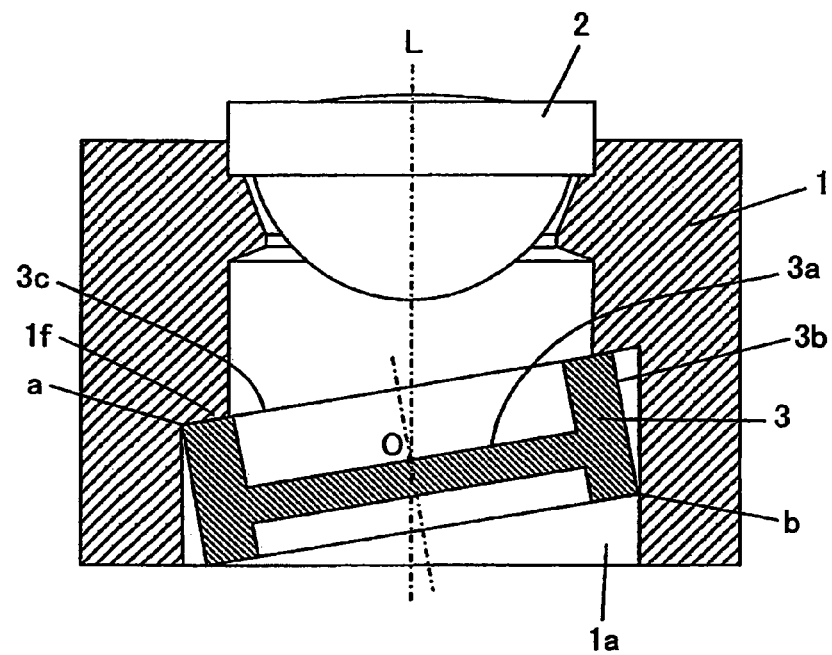
FIG. 19 is a cross-sectional view illustrating a relationship among main elements in a twelfth embodiment of a lens actuator according to the present invention.

A twelfth embodiment shown in FIG. 19 is an example of a structure for dealing with the first problem in the tenth embodiment. The diffracting plane 3a of the diffractive element 3 facing the objective lens 2 is disposed on a plane surface passing through the middle point between the two points (a-b) defining the maximum projection width in the fitting shaft 3b of the diffractive element 3 tilted relative to the optical axis L of the objective lens 2 by bringing the diffractive element 3 into contact with the tilted plane surface 1f of the lens holder 1. In accordance with this, it is possible to adjust the diffraction pattern center O of the diffractive element 3 facing the objective lens 2 to the optical axis L of the objective lens 2 while obtaining the effects of the tenth embodiment.

Figure 20:
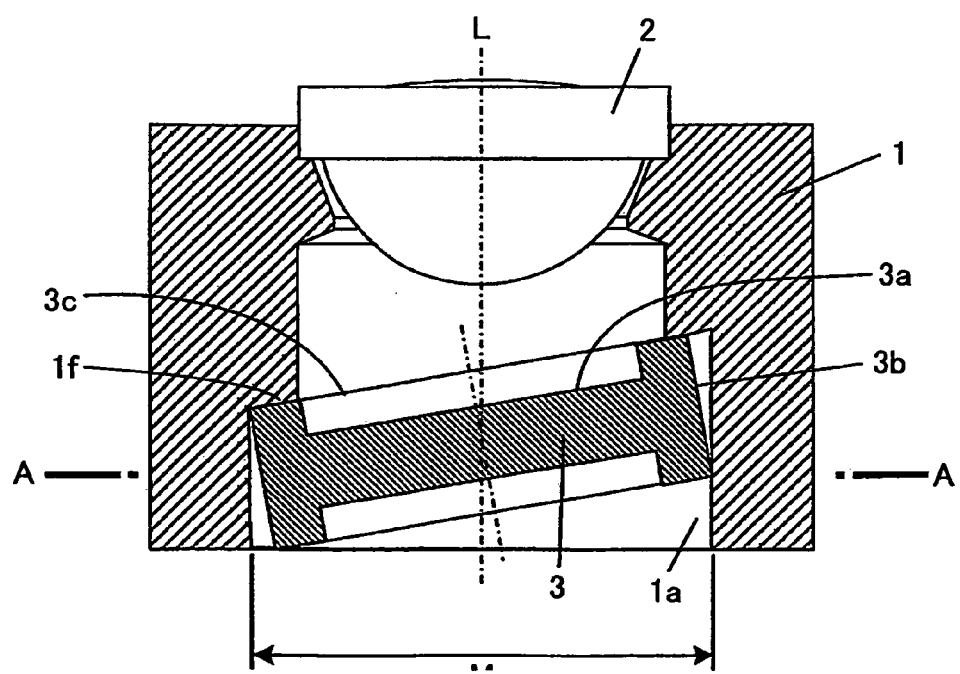
FIG. 20 is a cross-sectional view illustrating a relationship among main elements in a thirteenth embodiment of a lens actuator according to the present invention.
Figure 21:
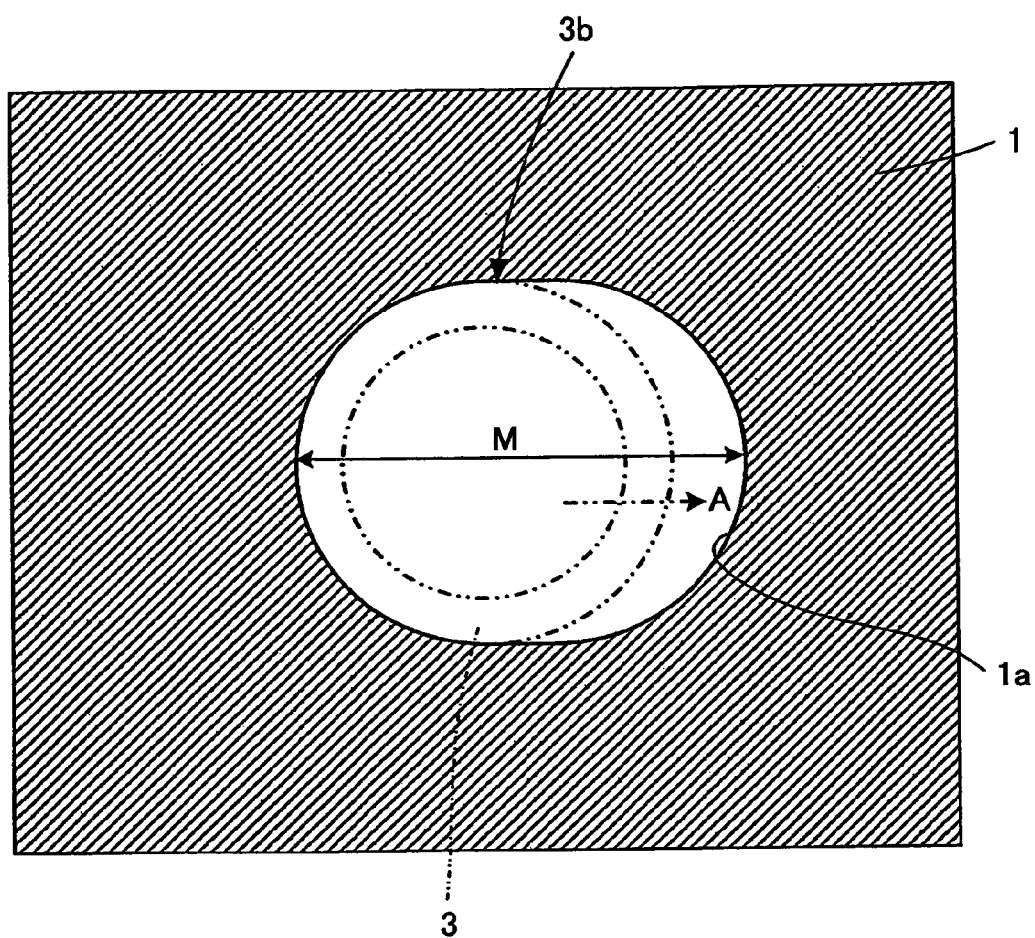
FIG. 21 is a cross-sectional view taken along line A-A in FIG. 20.

A thirteenth embodiment shown in FIG. 20 is an example of a structure for dealing with the second problem in the tenth embodiment. In order to eliminate installation error due to a clearance generated with the fitting shaft 3b of the diffractive element 3 in a direction where the diffractive element 3 is not tilted in the cylindrical hole 1a of the lens holder 1 in the tenth embodiment, as shown in a cross-sectional view of FIG. 21 taken along line A-A in FIG. 20, the outer shape of the diffractive element 3 when tilted relative to the virtual surface perpendicular to the optical axis L of the objective lens 2 is formed such that a long hole shape elongated in accordance with a circular shape having the maximum projection width on the virtual surface (in A direction in FIG. 21) has a hole shape of the cylindrical hole 1a of the lens holder 1 (M size in a longitudinal direction). By forming the outer shape of the diffractive element 3 in this manner, in the direction where the diffractive element 3 is not tilted (direction orthogonal to the A direction), no clearance is generated between the cylindrical hole 1a and the fitting shaft 3b while obtaining a width of the cylindrical hole 1a in the direction where the diffractive element 3 is tilted in the same manner as in the tenth embodiment.

Figure 22:
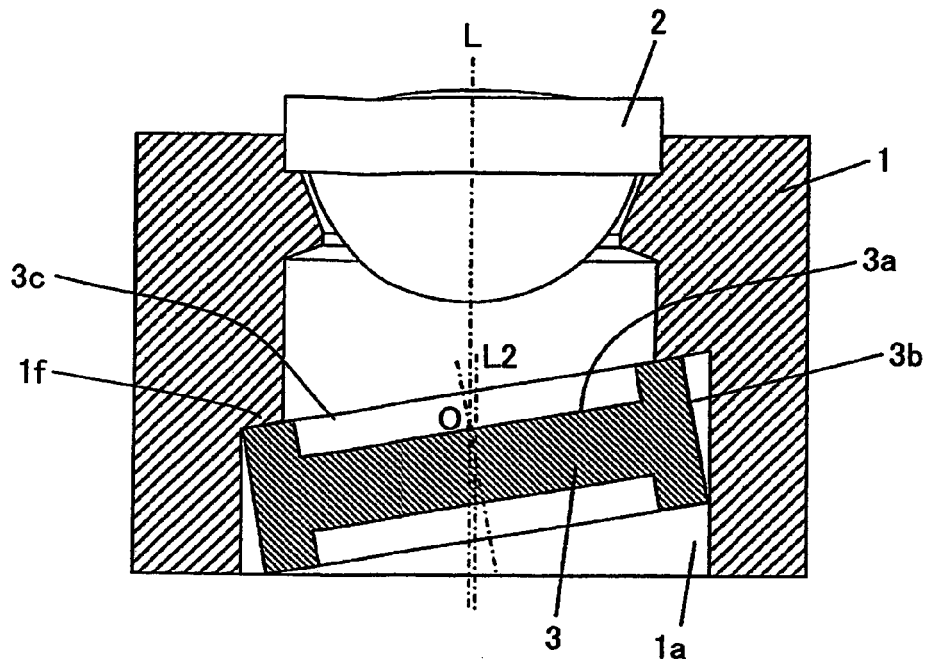
FIG. 22 is a cross-sectional view illustrating a relationship among main elements in a fourteenth embodiment of a lens actuator according to the present invention.

In a fourteenth embodiment shown in FIG. 22, the example of a structure for dealing with the first problem in the tenth embodiment is applied to the thirteenth embodiment. The central axis L2 of the cylindrical hole 1a having a long hole shape is disposed on the lens holder 1 such that the central axis L2 is not coaxial with the optical axis L of the objective lens 2 of the lens holder 1 but is shifted in a parallel manner for eccentricity. In accordance with this, it is possible to readily adjust the diffraction pattern center O facing the objective lens 2 to the optical axis L of the objective lens 2.

Figure 23:
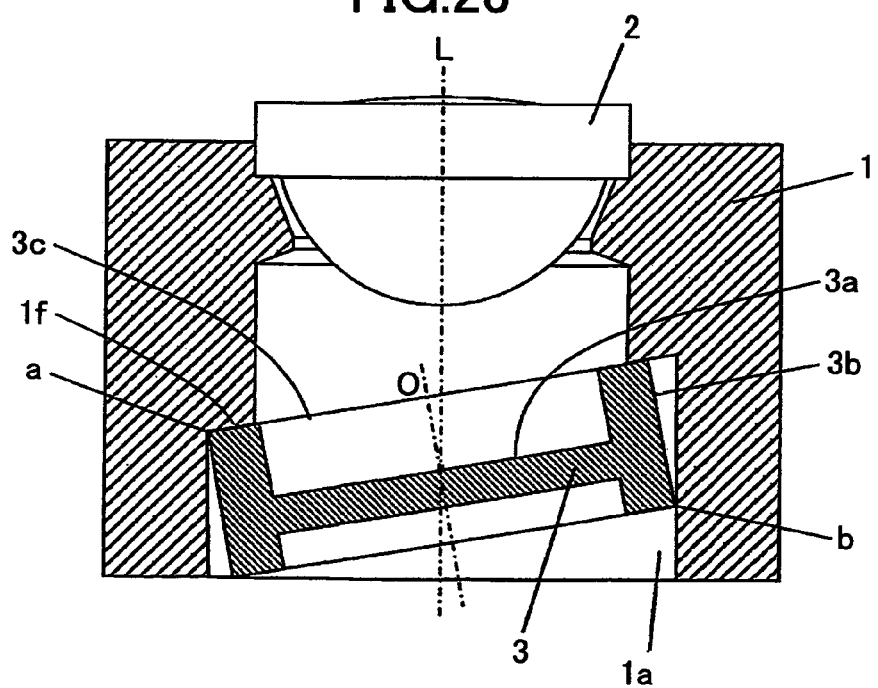
FIG. 23 is a cross-sectional view illustrating a relationship among main elements in a fifteenth embodiment of a lens actuator according to the present invention.

In a fifteenth embodiment shown in FIG. 23, the example of a structure for dealing with the first problem in the tenth embodiment is applied to the thirteenth embodiment. The diffracting plane 3a of the diffractive element 3 facing the objective lens 2 is disposed on the plane surface passing through the middle point between the two points (a-b) defining the maximum projection width. In accordance with this, it is possible to adjust the diffraction pattern center O of the diffractive element 3 facing the objective lens 2 to the optical axis L of the objective lens 2 while obtaining the effects of the tenth embodiment.

In the thirteenth embodiment, the hole shape of the cylindrical hole 1a of the lens holder 1 has a long hole shape. However, as the hole shape of the cylindrical hole 1a, a maximum size projected on the virtual surface perpendicular to the optical axis L of the objective lens 2 in the fitting shaft 3b of the diffractive element 3 may be used as a major axis and the outer shape of the diffractive element 3 may be used as a minor axis so as to have an elliptical hole shape. In this case, a central axis of the elliptical hole shape of the cylindrical hole 1a is set to be coaxial with the optical axis L of the objective lens 2.

When the hole shape of the cylindrical hole 1a of the lens holder 1 is formed to have such an elliptical hole shape as described above, it is possible to deal with the above-mentioned first and second problems by disposing the central axis of the cylindrical hole 1a having an elliptical hole shape is disposed on the lens holder 1 such that the central axis is not coaxial with the optical axis of the objective lens 2 of the lens holder 1 but is shifted in a parallel manner for eccentricity in the same manner as in the fourteenth embodiment or by disposing the diffracting plane 3a of the diffractive element 3 facing the objective lens 2 on the plane surface passing through the middle point between the two points (a-b) defining the maximum projection width in the same manner as in the fifteenth embodiment.

Figure 24:
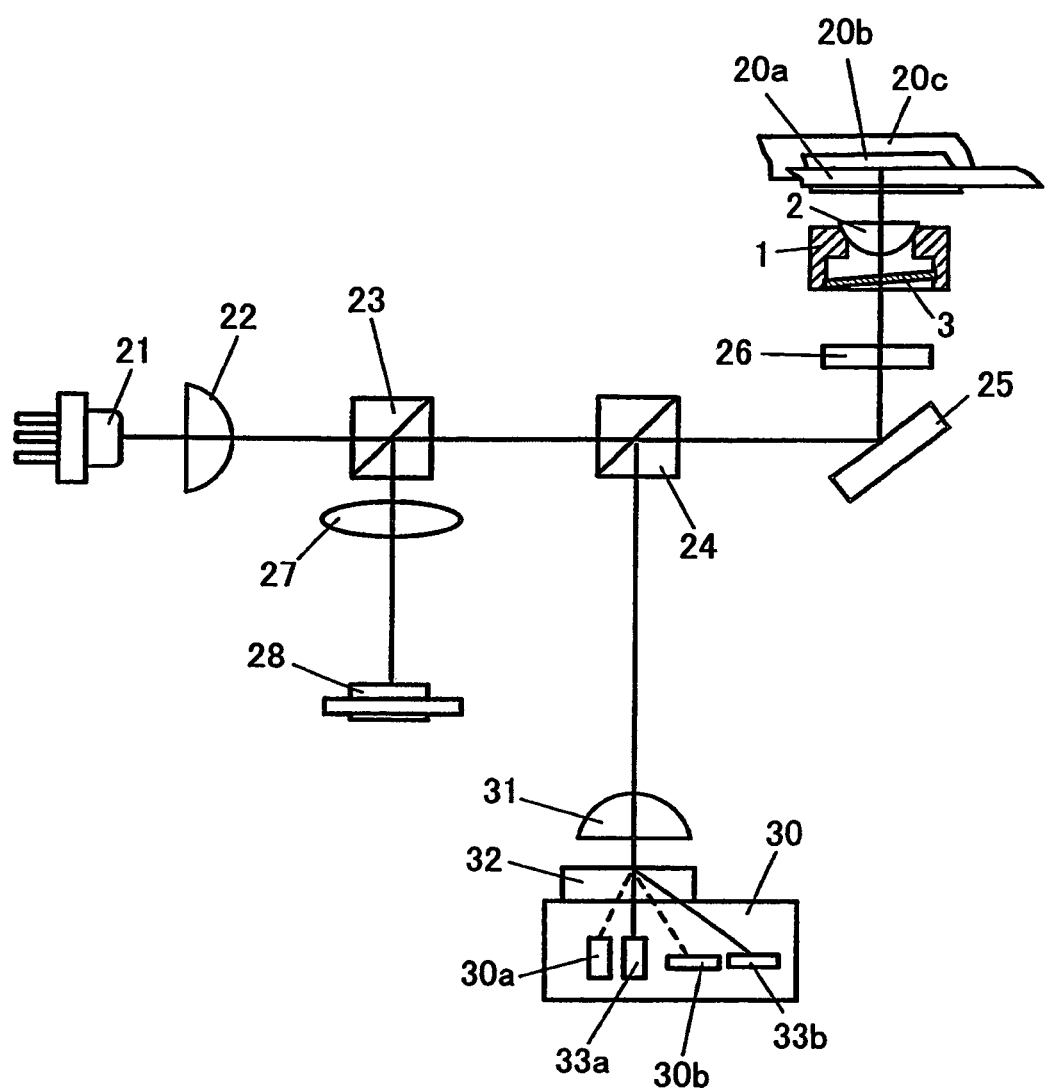
FIG. 24 is a diagram schematically showing an optical pickup device on which an objective lens actuator according to an embodiment of the present invention is installed.

FIG. 24 is a diagram schematically showing an optical pickup device on which the objective lens actuator according to the embodiment of the present invention is installed. The optical pickup device employs a compatible optical pickup in which the single objective lens 2 disposed on the lens holder 1 performs recording or reproducing with different numerical apertures (NA) on three types of optical storage media (BD, DVD, CD) 20a, 20b, and 20c using different wavelengths of light sources.

Substrate thicknesses of the optical storage media 20a, 20b, and 20c of BD, DVD, and CD are 0.1 mm, 0.6 mm, and 1.2 mm, respectively. Further, the numerical apertures (NA) for the optical storage media 20a, 20b, and 20c of BD, DVD, and CD are: NA=0.85, NA=0.65, and NA=0.50, respectively. Wavelengths $\lambda 1$, $\lambda 2$, $\lambda 3$ of first to third light sources are: $\lambda 1$=395 to 415 nm, $\lambda 2$=650 to 670 nm, and $\lambda 3$=770 to 805 nm, respectively.

The optical pickup shown in FIG. 24 includes, for the BD optical storage medium 20a, a semiconductor laser 21, collimator lens 22, polarization beam splitter 23, wavelength-selective beam splitter 24, deflection prism 25, ¼ wave plate 26, aberration correction element (diffractive element) 3, objective lens 2, detection lens 27, and light receiving element 28. A central wavelength of the semiconductor laser 21 used as the first light source is 405 nm and the numerical aperture (NA) thereof is 0.85. The objective lens 2 and the aberration correction element (diffractive element) 3 constituting the objective lens actuator are disposed on the single lens holder 1 as in each embodiment shown in FIGS. 15 to 23. Further, the substrate thickness of the BD optical storage medium 20a is 0.1 mm.

A light emitted from the semiconductor laser 21 is made substantially parallel by the collimator lens 22. The light passing through the collimator lens 22 is projected onto the polarization beam splitter 23 and deflected by the deflection prism 25. Then, the deflected light is converted to a circular polarized light by the ¼ wave plate 26 and condensed on the BD optical storage medium 20a via the objective lens 2, thereby performing recording and reproduction of information. A light reflected from the BD optical storage medium 20a passes through the ¼ wave plate 26 and is subsequently converted to a linearly polarized light orthogonal to a polarization direction of the light upon projection on the optical storage medium 20a. The converted light is separated into reflected and incident lights by the polarization beam splitter 23 and is deflected. The deflected light is introduced on the light receiving element 28 by the detection lens 27, where a reproduction signal, focus error signal, and track error signal are detected and the detected signal become, a driving control signal for the drive coil 4 or 5.

This optical pickup includes a laser unit 30 of two wavelengths emitting a laser beam for the DVD optical storage medium 20b and a laser beam for the CD optical storage medium 20c, so that it is possible to project laser beams having wavelengths different from each other.

A light emitted to the DVD optical storage medium 20b from a DVD semiconductor laser 30a with a central wavelength of 660 nm passes through a collimator lens 31 and the wavelength-selective beam splitter 24, and the light is deflected by the deflection prism 25. The deflected light is condensed on the DVD optical storage medium 20b via the ¼ wave plate 26, aberration correction element 3, and objective lens 2. The substrate thickness of the DVD optical storage medium 20b is 0.6 mm and the numerical aperture (NA) is 0.65. Switching of NA is limited by the aberration correction element 3. A light reflected from the DVD optical storage medium 20b passes through the objective lens 2 and the ¼ wave plate 26 and is subsequently deflected by the wavelength-selective beam splitter 24. The deflected light is separated from the incident light by a hologram element 32 and is introduced on a DVD light receiving element 30b, where a reproduction signal, focus error signal, and track error signal are detected.

Further, a light emitted to the CD optical storage medium 20c from a CD semiconductor laser 33a with a central wavelength of 785 nm passes through the collimator lens 31 and the wavelength-selective beam splitter 24, and the light is deflected by the deflection prism 25. The deflected light is condensed on the CD optical storage medium 20c via the ¼ wave plate 26, aberration correction element 3, and objective lens 2. The substrate thickness of the CD optical storage medium 20c is 1.2 mm and the numerical aperture (NA) of the objective lens 2 is 0.50. Switching of NA is limited by the aberration correction element 3. A light reflected from the CD optical storage medium 20c passes through the objective lens 2 and the ¼ wave plate 26 and is subsequently deflected by the wavelength-selective beam splitter 24. The deflected light is separated from the incident light by the hologram element 32 and is introduced on a CD light receiving element 33b, where the reproduction signal, focus error signal, and track error signal are detected.

FIG. 13 is a block diagram schematically showing an optical recording and reproducing apparatus on which the optical pickup device according to the above-mentioned embodiment of the present invention is installed. The apparatus performs at least one of reproduction, recording, and deletion of information on an optical storage medium.

In the present embodiment, an optical pickup 41 corresponding to the optical pickup shown in FIG. 24 is included. Further, the optical recording and reproducing apparatus according to the present embodiment includes a spindle motor 47 rotating the optical storage medium 20, optical pickup 41 used upon recording or reproducing information signals, sending motor 42 moving the optical pickup 41 in an inner circumference and on a circumference of the optical storage medium 20, modulator-demodulator circuit 44 performing predetermined modulation and demodulation processes, servo control circuit 43 performing servo control on the optical pickup 41, and system controller 46 performing control on the entire optical recording and reproducing apparatus.

The spindle motor 47 is driven by the servo control circuit 43 and is rotated at predetermined rotation numbers. In other words, the optical storage medium 20 used as recording and reproducing subject is chucked on a driving shaft of the spindle motor 47 and is driven by the servo control circuit 43. The optical storage medium 20 is rotated by the spindle motor 47 at the predetermined rotation numbers.

When the optical pickup 41 records and reproduces information signals on the optical storage medium 20, the optical pickup 41 projects a laser beam onto the rotating optical storage medium 20 and detects a light reflected therefrom as mentioned above. The optical pickup 41 is connected to the modulator-demodulator circuit 44. When the optical pickup 41 records the information signals, signals input from an external circuit 45 and subjected to a predetermined modulation process by the modulator-demodulator circuit 44 are supplied to the optical pickup 41. The optical pickup 41 projects a laser beam subjected to optical intensity modulation on the optical storage medium 20. When the optical pickup 41 reproduces the information signals, the optical pickup 41 projects a laser beam with a constant output onto the rotating optical storage medium 20 and reproduction signals are generated from a light returning therefrom and the reproduction signals are supplied to the modulator-demodulator circuit 44.

Further, the optical pickup 41 is connected to the servo control circuit 43. Upon recording and reproducing the information singles, the focus servo signal and tracking servo signal are generated from the light reflected by the rotating optical storage medium 20 and returning therefrom as mentioned above. These servo signals are supplied to the servo control circuit 43.

The modulator-demodulator circuit 44 is connected to the system controller 46 and the external circuit 45. Upon recording the information signals in the optical storage medium 20, the modulator-demodulator circuit 44 receives signals to be recorded in the optical storage medium 20 from the external circuit 45 and performs a predetermined modulation process on the signals under control by the system controller 46.

The signals modulated by the modulator-demodulator circuit 44 are supplied to the optical pickup 41. Further, upon reproducing the information signals from the optical storage medium 20, the modulator-demodulator circuit 44 receives reproduction signals from the optical pickup 41, the reproduction signals being reproduced from the optical storage medium 20, and performs a predetermined demodulation process on the reproduction signals under control by the system controller 46. Then, the signals demodulated by the modulator-demodulator circuit 44 are output from the modulator-demodulator circuit 44 to the external circuit 45.

The sending motor 42 moves the optical pickup 41 to a predetermined position in a radial direction of the optical storage medium 20 upon recording and reproducing the information signals. The sending motor 42 is moved on the basis of a control signal from the servo control circuit 43. In other words, the sending motor 42 is connected to the servo control circuit 43 and is controlled by the servo control circuit 43.

The servo control circuit 43 controls the sending motor 42 such that the optical pickup 41 is moved to the predetermined position facing the optical storage medium 20 under control by the system controller 46. The servo control circuit 43 is connected to the spindle motor 47 and controls operation of the spindle motor 47 under control by the system controller 46. In other words, the servo control circuit 43 controls the spindle motor 47 such that the optical storage medium 20 is rotated at predetermined rotation numbers upon recording and reproducing the information signals relative to the optical storage medium 20.

Figure 25A:
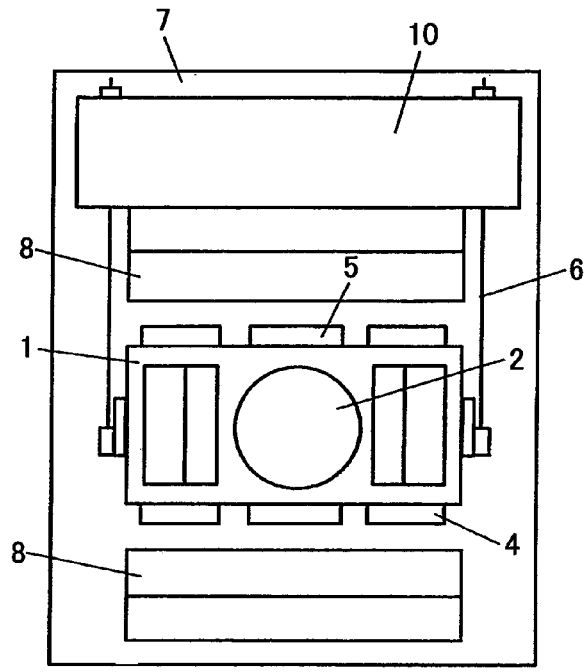
FIG. 25A is a front view showing an embodiment of an optical pickup device on which an objective lens actuator according to the present invention is installed.
Figure 25B:
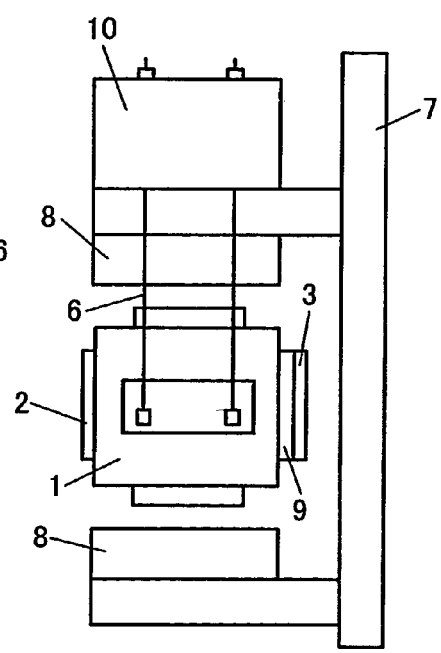
FIG. 25B is a side elevational view showing an embodiment of an optical pickup device on which an objective lens actuator according to the present invention is installed.

FIG. 25A is a front view showing an embodiment of an optical pickup device on which an objective lens actuator according to the present invention is installed. FIG. 25B is a side elevational view showing the embodiment of the optical pickup device on which the objective lens actuator according to the present invention is installed. And, FIG. 25C is a bottom view showing the embodiment of the optical pickup device on which the objective lens actuator according to the present invention is installed.

Figure 25C:
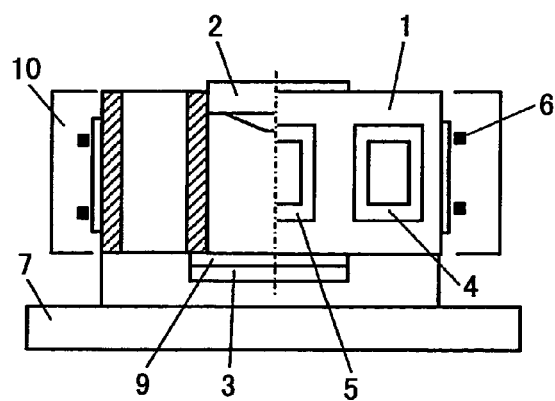
FIG. 25C is a bottom view showing an embodiment of an optical pickup device on which an objective lens actuator according to the present invention is installed.

In FIGS. 25A, 25B, and 25C, a lens holder 1 as a movable unit is a casing holding an objective lens 2 and a diffractive element 3, the objective lens 2 condensing a light beam on an optical disk not shown in the drawings so as to form a beam spot. A drive coil 4 for focusing and a drive coil 5 for tracking are installed on the lens holder 1 and the lens holder 1 is installed on a support block 10 via a support spring 6 functioning as a suspension and a coil feeder line, the support block 10 being disposed on a fixing base 7. A magnet 8 functioning as a back yoke in a magnetic circuit is installed on the fixing base 7. In this magnetic field, the drive coils 4 and 5 of the lens holder 1 are disposed.

In the above-mentioned structure, the objective lens 2 is disposed on an upper portion of the lens holder 1, the diffractive element 3 is disposed on a lower portion of the lens holder 1, and an inertia weight 9 is disposed so as to cancel primary moments of inertia of mainly the objective lens 2 and the diffractive element 3 for an entire portion of the lens holder 1. The diffractive element 3 is disposed on the inertia weight 9.

FIGS. 26 to 34 are cross-sectional views for illustrating embodiments of the lens actuator according to the present invention, showing a relational configuration among the objective lens 2, the lens holder 1, the inertia weight 9, and the diffractive element 3, which are main elements of the lens actuator.

Figure 26:
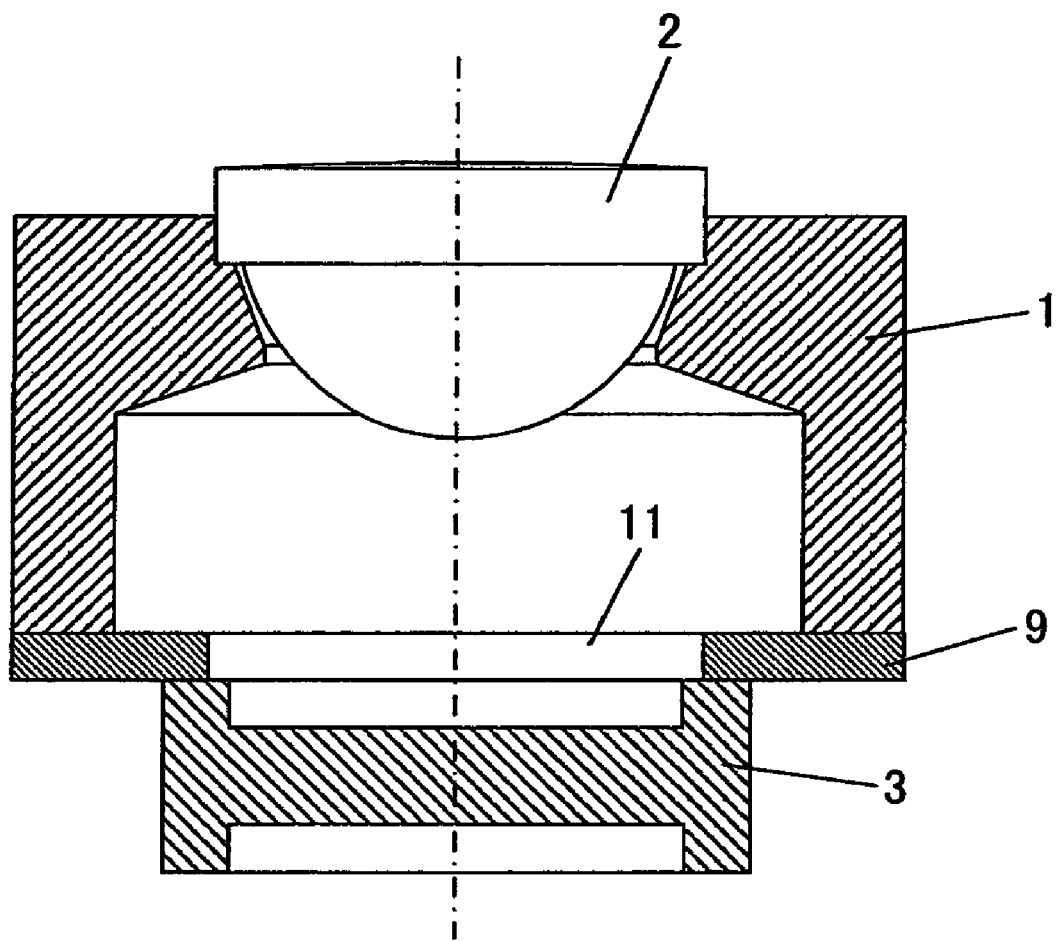
FIG. 26 is a cross-sectional view illustrating a relational configuration among main elements in a sixteenth embodiment of a lens actuator according to the present invention.

In a sixteenth embodiment as shown in FIG. 26, the objective lens 2 is fixed at an upper end of the lens holder 1 using adhesive, for example, and the diffractive element 3 is fixed at a lower end of the lens holder 1 using adhesive via the inertia weight 9 made of a metallic material with a light transmitting portion 11 formed at a center thereof. A method for fixing the objective lens 2, diffractive element 3, and inertia weight 9 may use a material such as ultraviolet curable resin.

In accordance with the above-mentioned structure, the primary moment of inertia of the objective lens 2 made of a glass material with a high NA and having relatively large weight is effectively cancelled through balance adjustment by the disposed inertia weight 9. In accordance with this, it is possible to reduce the weight of the lens holder 1 as a movable unit. Further, since the diffractive element 3 is fixed on the inertia weight 9, it is possible to protect the diffractive element 3 from heat generated upon driving the drive coils 4 and 5 by heat radiation of the metallic inertia weight 9.

Figure 27:
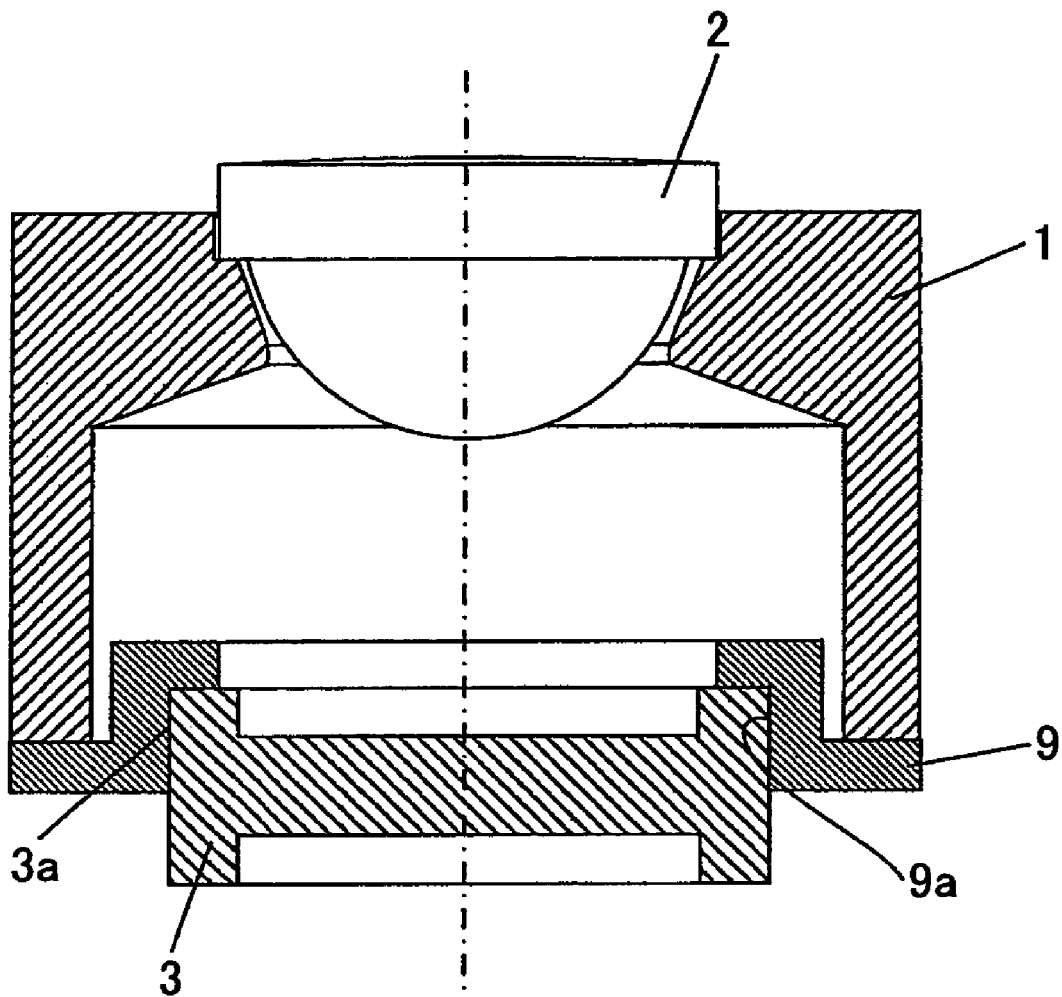
FIG. 27 is a cross-sectional view illustrating a relational configuration among main elements in a seventeenth embodiment of a lens actuator according to the present invention.

In a seventeenth embodiment as shown in FIG. 27, a hole 9a is formed on the inertia weight 9 so as to have an inner cylindrical surface thereof and a shaft 3a is formed on the diffractive element 3 so as to have an outer cylindrical surface thereof. The diffractive element 3 and the inertia weight 9 are positioned and fixed by fitting the shaft 3a in the hole 9a such that central axes of the hole 9a and the shaft 3a having cylindrical surfaces are coaxial with an optical axis of the objective lens 2 upon installation on the lens holder 1, and then the inertia weight 9 is positioned and fixed at the lower end of the lens holder 1. In accordance with this, it is possible to readily and securely perform positioning and fixing of the diffractive element 3 in addition to effects provided by the sixteenth embodiment.

Figure 28:
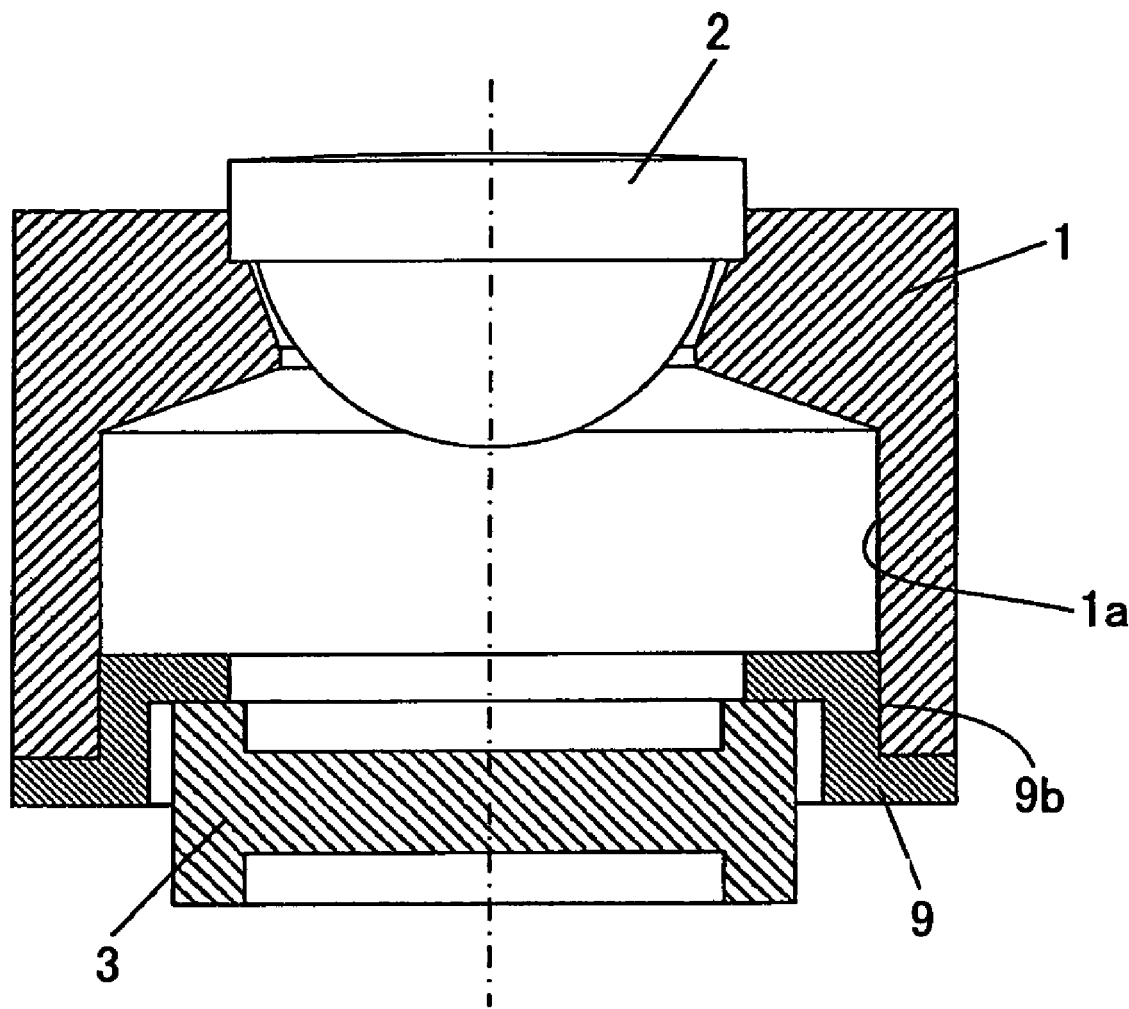
FIG. 28 is a cross-sectional view illustrating a relational configuration among main elements in an eighteenth embodiment of a lens actuator according to the present invention.

In an eighteenth embodiment as shown in FIG. 28, a hole 1a is formed on the lens holder 1 so as to have an inner cylindrical surface thereof and a shaft 9b is formed on the inertia weight 9 so as to have an outer cylindrical surface thereof. The lens holder 1 and the inertia weight 9 are positioned and fixed by fitting the shaft 9b in the hole 1a such that central axes of the hole 1a and the shaft 9b having cylindrical surfaces are coaxial with the optical axis of the objective lens 2 upon installation on the lens holder 1. In accordance with this, it is possible to readily and securely perform final positioning and fixing of the diffractive element 3 in addition to the effects provided by the sixteenth embodiment.

Figure 29:
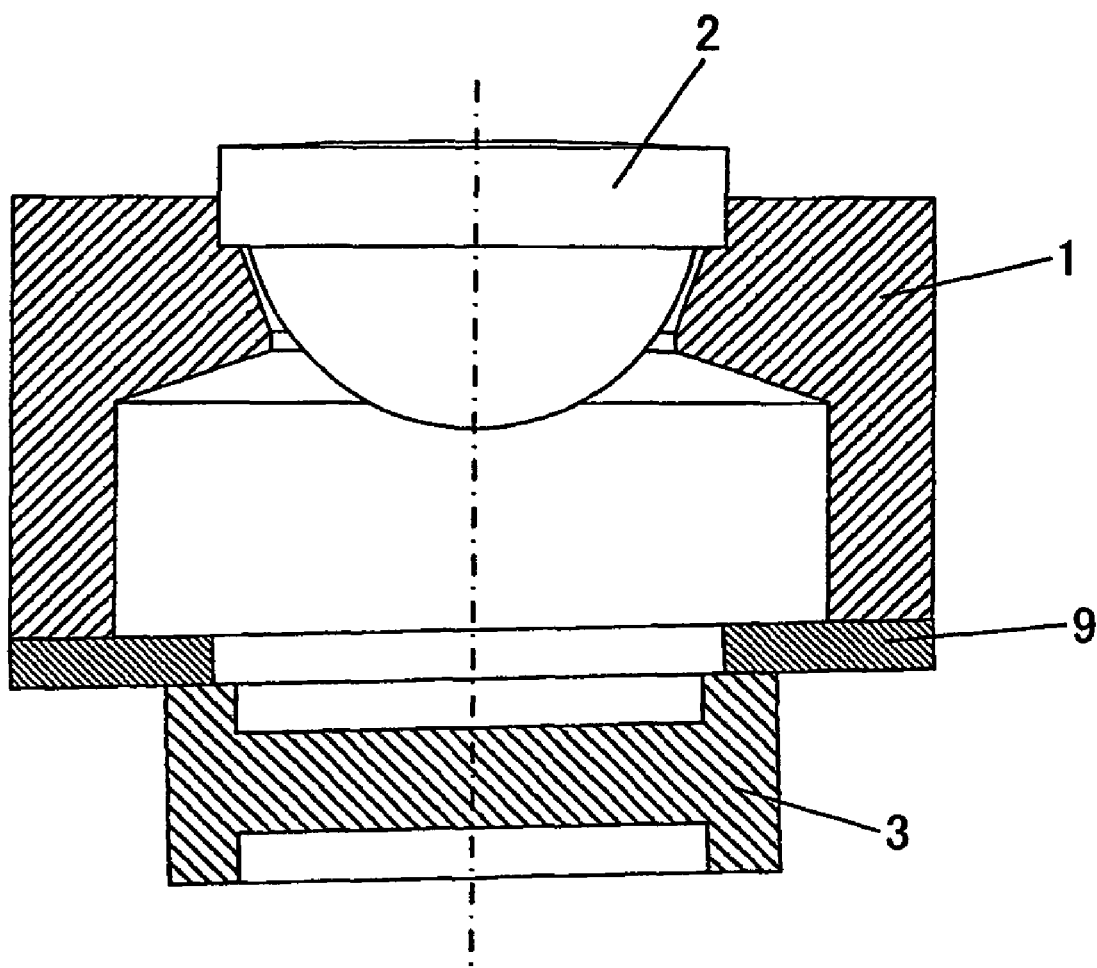
FIG. 29 is a cross-sectional view illustrating a relational configuration among main elements in a nineteenth embodiment of a lens actuator according to the present invention.

In a nineteenth embodiment as shown in FIG. 29, the inertia weight 9 is fixed at the lower end of the lens holder 1 such that while the diffractive element 3 is fixed on the inertia weight 9 and an optical axis center of a diffracting plane in the diffractive element 3 on a side of the objective lens 2 corresponds to a central axis of the lens holder 1, the diffracting plane of the diffractive element 3 is tilted rather than perpendicular relative to the optical axis of the objective lens 2.

In accordance with this, in addition to the effects provided by the sixteenth embodiment, it is possible to obtain good characteristics without an influence of flare resulting from surface reflection of the diffractive element 3. An attachment shape tilted relative to a plane perpendicular to the optical axis of the objective lens 2 may be formed on the lens holder 1 or the inertia weight 9 and positioning other than at the tilt relative to the optical axis of the objective lens 2 may be adjusted where appropriate.

Figure 30:
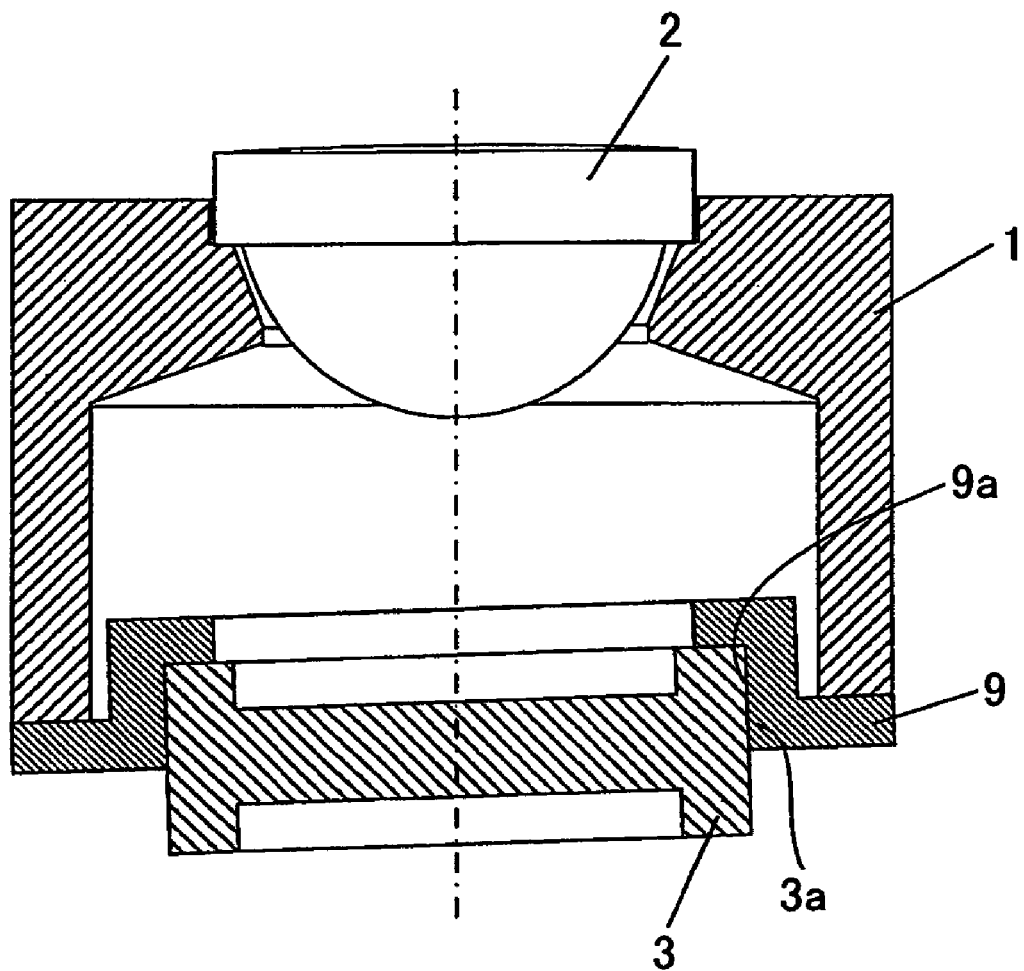
FIG. 30 is a cross-sectional view illustrating a relational configuration among main elements in a twentieth embodiment of a lens actuator according to the present invention.

In a twentieth embodiment as shown in FIG. 30, in the same manner as in the nineteenth embodiment, the inertia weight 9 is fixed at the lower end of the lens holder 1 such that the diffracting plane of the diffractive element 3 is tilted rather than perpendicular relative to the optical axis of the objective lens 2. In addition, the hole 9a is formed on the inertia weight 9 so as to have a cylindrical surface for the inner surface thereof, and the shaft 3a is formed on the diffractive element 3 so as to have a cylindrical surface for the outer surface thereof. The diffractive element 3 and the inertia weight 9 are positioned and fixed by fitting the shaft 3a in the hole 9a, and then the inertia weight 9 is positioned and fixed at the lower end of the lens holder 1. In accordance with this, it is possible to readily and securely perform positioning and fixing of the diffractive element 3 in addition to effects provided by the nineteenth embodiment.

Figure 31:
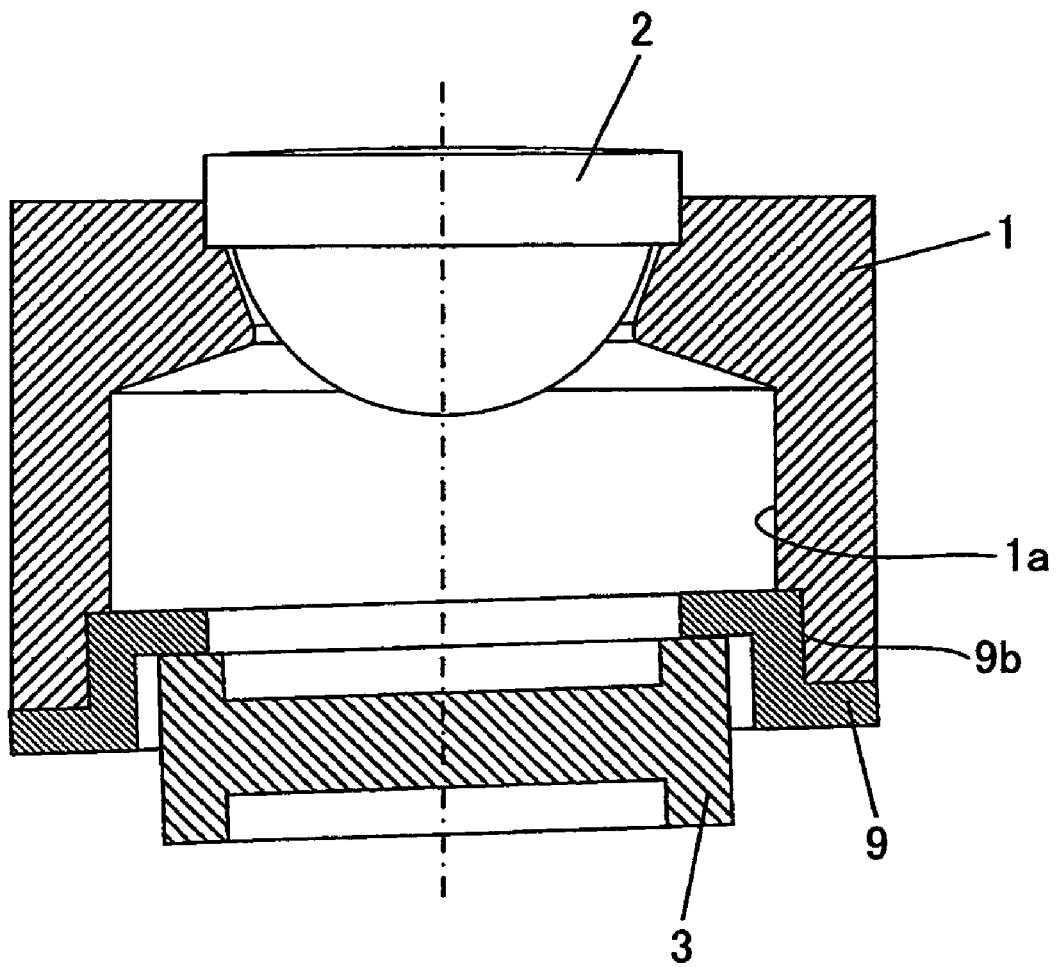
FIG. 31 is a cross-sectional view illustrating a relational configuration among main elements in a twenty-first embodiment of a lens actuator according to the present invention.

In a twenty-first embodiment as shown in FIG. 31, in the same manner as in the nineteenth embodiment, the inertia weight 9 is fixed at the lower end of the lens holder 1 such that the diffracting plane of the diffractive element 3 is tilted rather than perpendicular relative to the optical axis of the objective lens 2. In addition, the hole 1a is formed on the lens holder 1 so as to have a cylindrical surface for the inner surface thereof, and the shaft 9b is formed on the inertia weight 9 so as to have a cylindrical surface for the outer surface thereof. The lens holder 1 and the inertia weight 9 are positioned and fixed by fitting the shaft 9b in the hole 1a. In accordance with this, it is possible to readily and securely perform positioning and fixing of the diffractive element 3 in addition to the effects provided by the nineteenth embodiment.

Figure 32:
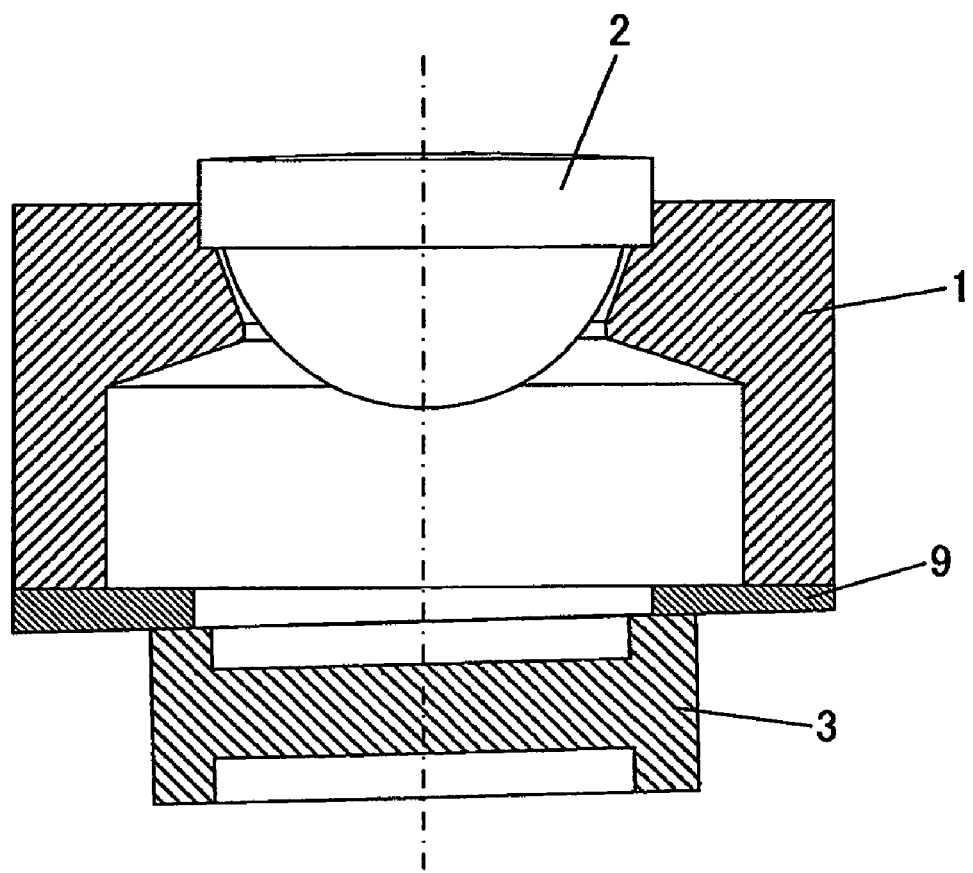
FIG. 32 is a cross-sectional view illustrating a relational configuration among main elements in a twenty-second embodiment of a lens actuator according to the present invention.

In a twenty-second embodiment as shown in FIG. 32, when the diffractive element 3 is fixed on the inertia weight 9 and when the inertia weight 9 is fixed on the lens holder 1, the diffractive element 3 is fixed on the inertia weight 9 in a tilted manner so as to perform installation such that the diffracting plane of the diffractive element 3 is tilted rather than perpendicular relative to the optical axis of the objective lens 2.

In accordance with this, in addition to the effects provided by the sixteenth embodiment, it is possible to obtain good characteristics without an influence of flare resulting from surface reflection of the diffractive element 3. An attachment shape tilted relative to a plane perpendicular to the optical axis of the objective lens 2 may be formed on the diffractive element 3 or the inertia weight 9 and positioning other than at the tilt relative to the optical axis of the objective lens 2 may be adjusted where appropriate.

Figure 33:
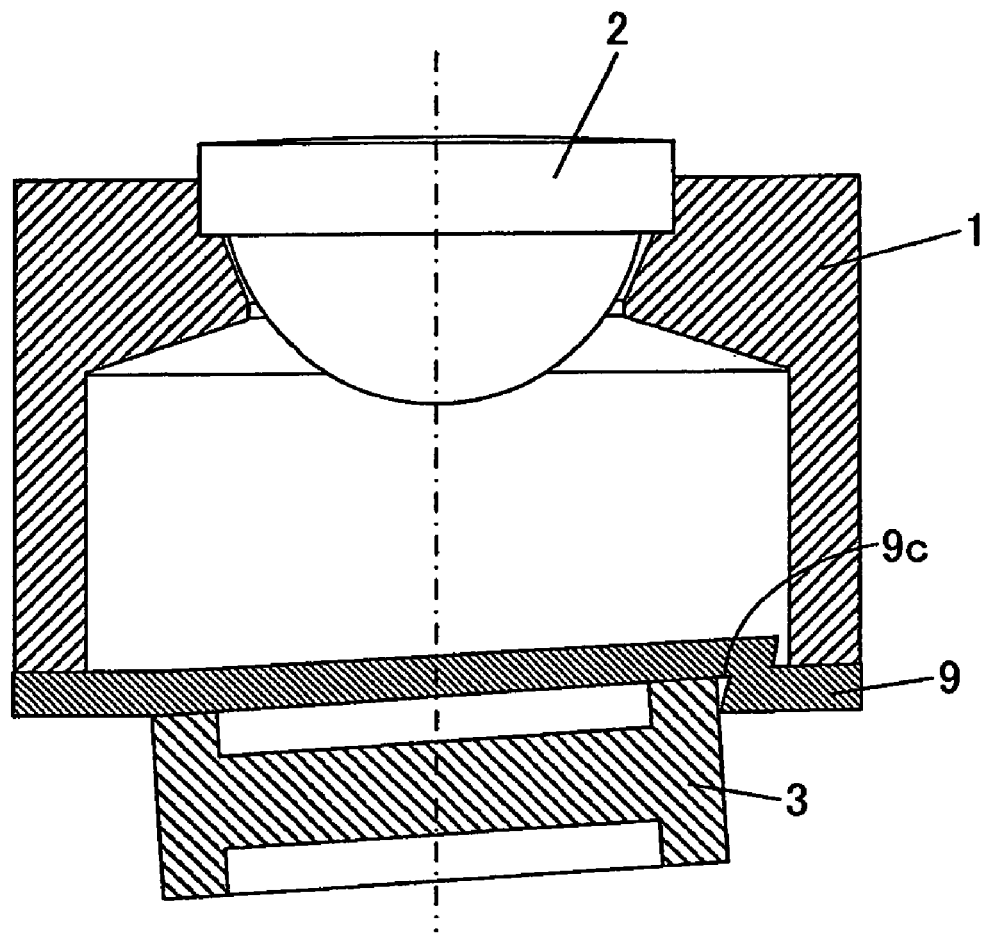
FIG. 33 is a cross-sectional view illustrating a relational configuration among main elements in a variation of the twenty-second embodiment of a lens actuator according to the present invention.

FIG. 33 shows a variation of the twenty-second embodiment. While the inertia weight 9 shown in FIG. 32 has a tapered plane on one side thereof and the diffractive element 3 is fixed in a tilted manner, in the variation shown in FIG. 33, a reception groove 9c with an inclined plane is formed on the inertia weight 9 by bending, for example. The diffractive element 3 is fixed on the reception groove 9c.

Figure 34:
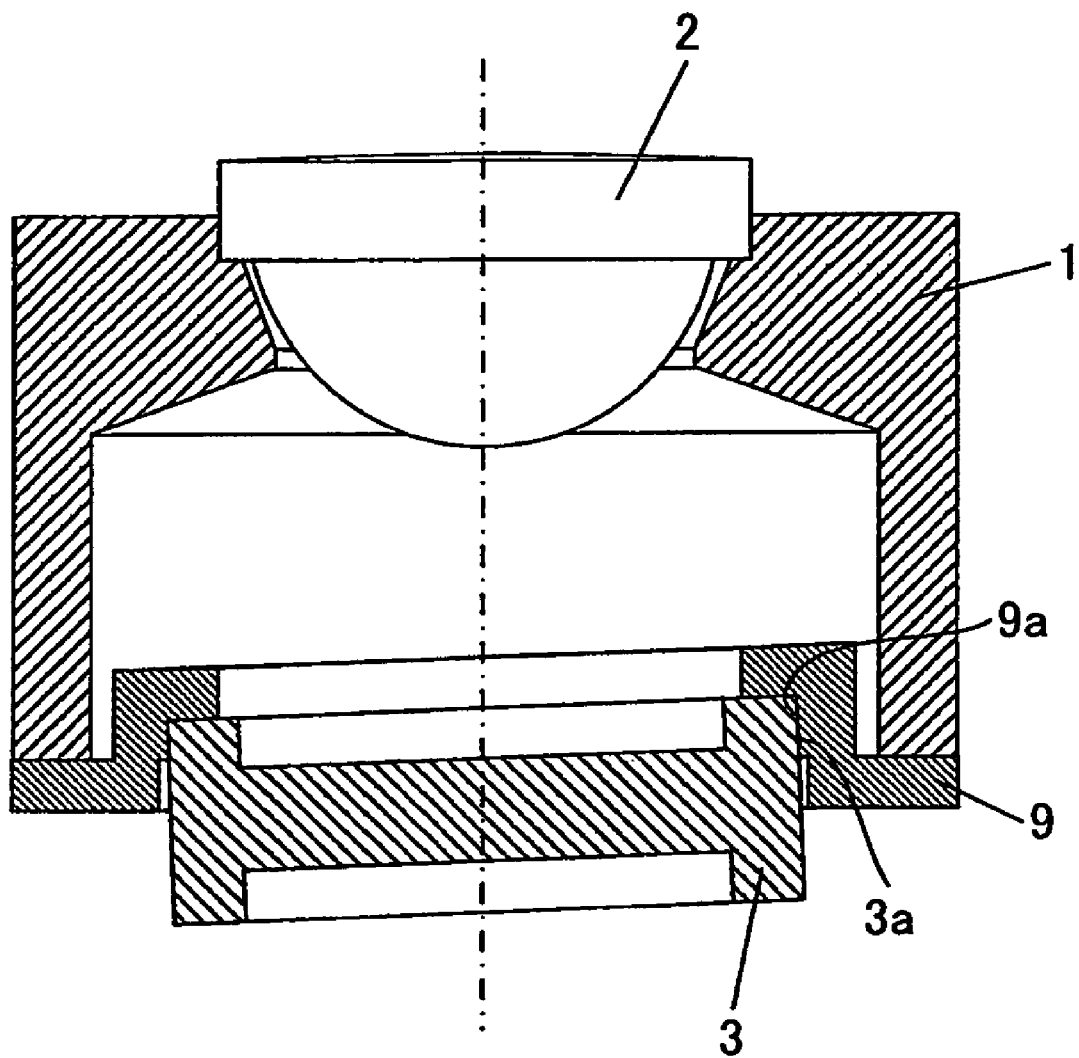
FIG. 34 is a cross-sectional view illustrating a relational configuration among main elements in a twenty-third embodiment of a lens actuator according to the present invention.

In a twenty-third embodiment as shown in FIG. 34, in the same manner as in the twenty-second embodiment, the diffractive element 3 is fixed on the inertia weight 9 in a tilted manner to perform installation such that the diffracting plane of the diffractive element 3 is tilted rather than perpendicular relative to the optical axis of the objective lens 2. In addition, the hole 9a is formed on the inertia weight 9 so as to have a cylindrical surface for the inner surface thereof, and the shaft 3a is formed on the diffractive element 3 so as to have a cylindrical surface for the outer surface thereof. The diffractive element 3 and the inertia weight 9 are positioned and fixed by fitting the shaft 3a in the hole 9a, and then the inertia weight 9 is positioned and fixed at the lower end of the lens holder 1. In accordance with this, it is possible to readily and securely perform positioning and fixing of the diffractive element 3 in addition to effects provided by the twenty-second embodiment.

Figure 35:
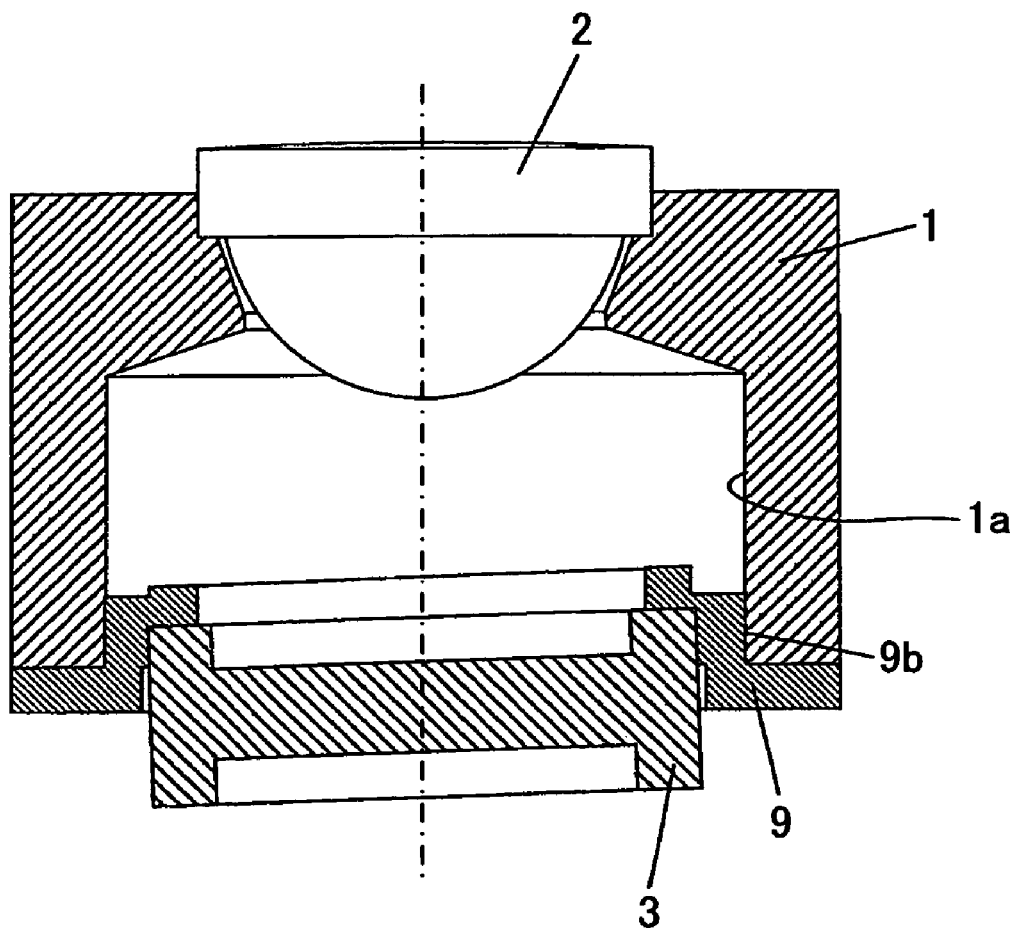
FIG. 35 is a cross-sectional view illustrating a relational configuration among main elements in a twenty-fourth embodiment of a lens actuator according to the present invention.

In a twenty-fourth embodiment as shown in FIG. 35, in the same manner as in the twenty-second embodiment, the diffractive element 3 is fixed on the inertia weight 9 in a tilted manner to perform installation such that the diffracting plane of the diffractive element 3 is tilted rather than perpendicular relative to the optical axis of the objective lens 2. In addition, the hole 1a is formed on the lens holder 1 so as to have a cylindrical surface for the inner surface thereof, and the shaft 9b is formed on the inertia weight 9 so as to have a cylindrical surface for the outer surface thereof. The lens holder 1 and the inertia weight 9 are positioned and fixed by fitting the shaft 9b in the hole 1a. In accordance with this, it is possible to readily and securely perform positioning and fixing of the diffractive element 3 in addition to the effects provided by the twenty-second embodiment.

Figure 36:
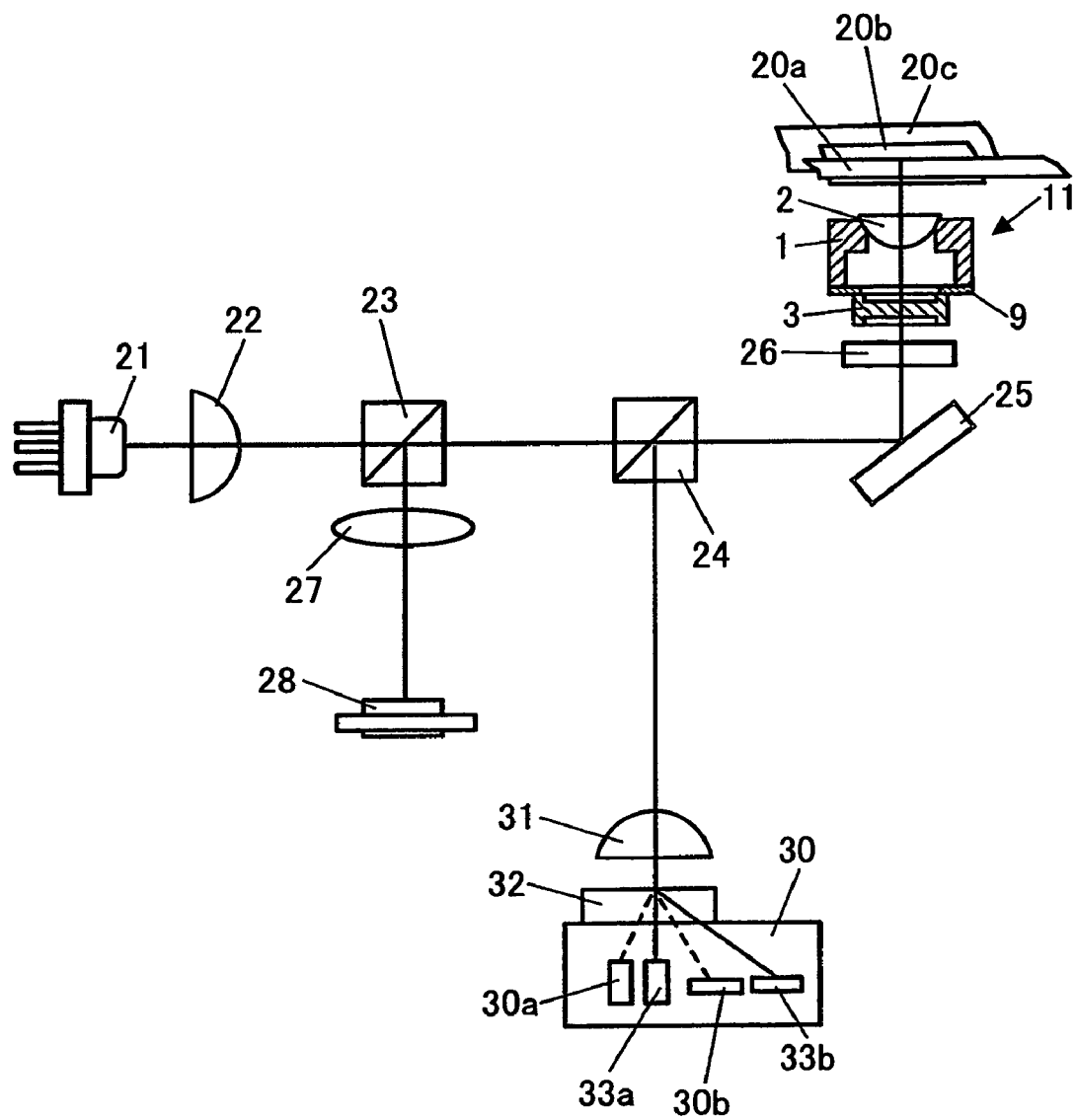
FIG. 36 is a diagram schematically showing an optical pickup device on which an objective lens actuator according to an embodiment of the present invention is installed.

FIG. 36 is a diagram schematically showing an optical pickup device on which the objective lens actuator according to the embodiment of the present invention is installed. The optical pickup device employs a compatible optical pickup in which the single objective lens 2 performs recording or reproducing with different numerical apertures (NA) on three types of optical storage media (BD, DVD, CD) 20a, 20b, and 20c using different wavelengths of light sources.

Substrate thicknesses of the optical storage media 20a, 20b, and 20c of BD, DVD, and CD are 0.1 mm, 0.6 mm, and 1.2 mm, respectively. Further, the numerical apertures (NA) for the optical storage media 20a, 20b, and 20c of BD, DVD, and CD are: NA=0.85, NA=0.65, and NA=0.50, respectively.

Wavelengths $\lambda 1$, $\lambda 2$, $\lambda 3$ of first to third light sources are: $\lambda 1$=395 to 415 nm, $\lambda 2$=650 to 670 nm, and $\lambda 3$=770 to 805 nm, respectively.

The optical pickup shown in FIG. 36 includes, for the BD optical storage medium 20a, a semiconductor laser 21, a collimator lens 22, a polarization beam splitter 23, a wavelength-selective beam splitter 24, a deflection prism 25, a ¼ wave plate 26, an aberration correction element (diffractive element) 3, an objective lens 2, a detection lens 27, and a light receiving element 28. A central wavelength of the semiconductor laser 21 used as the first light source is 405 nm and the numerical aperture (NA) of the objective lens 2 is 0.85. The objective lens 2, the aberration correction element (diffractive element) 3, and the inertia weight 9 constituting the objective lens actuator 11 are disposed on the single lens holder 1 as the embodiments shown in FIGS. 26 to 35. Further, the substrate thickness of the BD optical storage medium 20a is 0.1 mm.

A light emitted from the semiconductor laser 21 is made substantially parallel by the collimator lens 22. The light passing through the collimator lens 22 is projected onto the polarization beam splitter 23 and deflected by the deflection prism 25. Then, the deflected light is converted to a circular polarized light by the ¼ wave plate 26 and condensed on the BD optical storage medium 20a via the objective lens 2, thereby performing recording and reproduction of information. A light reflected from the BD optical storage medium 20a passes through the ¼ wave plate 26 and is subsequently converted to a linearly polarized light orthogonal to a polarization direction of the light upon projection on the optical storage medium 20a. The converted light is separated into reflected and incident lights by the polarization beam splitter 23 and is deflected. The deflected light is introduced on the light receiving element 28 by the detection lens 27, where a reproduction signal, focus error signal, and track error signal are detected.

This optical pickup includes a laser unit 30 of two wavelengths emitting a laser beam for the DVD optical storage medium 20b and a laser beam for the CD optical storage medium 20c, so that it is possible to project laser beams having wavelengths different from each other.

A light emitted to the DVD optical storage medium 20b from a DVD semiconductor laser 30a with a central wavelength of 660 nm passes through a collimator lens 31 and the wavelength-selective beam splitter 24, and the light is deflected by the deflection prism 25. The deflected light is condensed on the DVD optical storage medium 20b via the ¼ wave plate 26, aberration correction element 3, and objective lens 2. The substrate thickness of the DVD optical storage medium 20b is 0.6 mm and the numerical aperture (NA) is 0.65. Switching of NA is limited by the aberration correction element 3. A light reflected from the DVD optical storage medium 20b passes through the objective lens 2 and the ¼ wave plate 26 and is subsequently deflected by the wavelength-selective beam splitter 24. The deflected light is separated from the incident light by a hologram element 32 and is introduced on a DVD light receiving element 30b, where a reproduction signal, a focus error signal, and a track error signal are detected.

Further, a light emitted to the CD optical storage medium 20c from a CD semiconductor laser 33a with a central wavelength of 785 nm passes through the collimator lens 31 and the wavelength-selective beam splitter 24, and the light is deflected by the deflection prism 25. The deflected light is condensed on the CD optical storage medium 20c via the ¼ wave plate 26, the aberration correction element 3, and the objective lens 2. The substrate thickness of the CD optical storage medium 20c is 1.2 mm and the numerical aperture (NA) of the objective lens 2 is 0.50. Switching of NA is limited by the aberration correction element 3. A light reflected from the CD optical storage medium 20c passes through the objective lens 2 and the ¼ wave plate 26 and is subsequently deflected by the wavelength-selective beam splitter 24. The deflected light is separated from the incident light by the hologram element 32 and is introduced on a CD light receiving element 33b, where the reproduction signal, a focus error signal, and a track error signal are detected.

FIG. 13 is a block diagram schematically showing an optical recording and reproducing apparatus on which the optical pickup device according to the above-mentioned embodiment of the present invention is installed. The apparatus performs at least one of reproduction, recording, and deletion of information on an optical storage medium.

In the present embodiment, an optical pickup 41 corresponding to the optical pickup shown in FIG. 36 is included. Further, the optical recording and reproducing apparatus according to the present embodiment includes a spindle motor 47 rotating the optical storage medium 20, an optical pickup 41 used upon recording or reproducing information signals, a sending motor 42 moving the optical pickup 41 between an inner circumference and an outer circumference of the optical storage medium 20, a modulator-demodulator circuit 44 performing predetermined modulation and demodulation processes, a servo control circuit 43 performing servo control on the optical pickup 41, and a system controller 46 performing control on the entire optical recording and reproducing apparatus.

The spindle motor 47 is driven by the servo control circuit 43 and is rotated at a predetermined rotational speed. In other words, the optical storage medium 20 used for recording and reproducing subject is chucked on a driving shaft of the spindle motor 47 and is driven by the servo control circuit 43. The optical storage medium 20 is rotated by the spindle motor 47 at the predetermined rotational speed.

When the optical pickup 41 records and reproduces information signals on the optical storage medium 20, the optical pickup 41 projects a laser beam onto the rotating optical storage medium 20 and detects a light reflected therefrom as mentioned above. The optical pickup 41 is connected to the modulator-demodulator circuit 44. When the optical pickup 41 records the information signals, signals input from an external circuit 45 and subjected to a predetermined modulation process by the modulator-demodulator circuit 44 are supplied to the optical pickup 41. The optical pickup 41 projects a laser beam subjected to optical intensity modulation on the optical storage medium 20. When the optical pickup 41 reproduces the information signals, the optical pickup 41 projects a laser beam with a constant output onto the rotating optical storage medium 20 and reproduction signals are generated from a light returning therefrom and the reproduction signals are supplied to the modulator-demodulator circuit 44.

Further, the optical pickup 41 is connected to the servo control circuit 43. Upon recording and reproducing the information signals, the focus servo signal and the tracking servo signal are generated from the light reflected by the rotating optical storage medium 20 and returning therefrom as mentioned above. These servo signals are supplied to the servo control circuit 43.

The modulator-demodulator circuit 44 is connected to the system controller 46 and the external circuit 45. Upon recording the information signals in the optical storage medium 20, the modulator-demodulator circuit 44 receives signals to be recorded in the optical storage medium 20 from the external circuit 45 and performs a predetermined modulation process on the signals under control by the system controller 46.

The signals modulated by the modulator-demodulator circuit 44 are supplied to the optical pickup 41. Further, upon reproducing the information signals from the optical storage medium 20, the modulator-demodulator circuit 44 receives reproduction signals from the optical pickup 41, the reproduction signals being reproduced from the optical storage medium 20, and performs a predetermined demodulation process on the reproduction signals under control by the system controller 46. Then, the signals demodulated by the modulator-demodulator circuit 44 are output from the modulator-demodulator circuit 44 to the external circuit 45.

The sending motor 42 moves the optical pickup 41 to a predetermined position in a radial direction of the optical storage medium 20 upon recording and reproducing the information signals. The sending motor 42 is moved on the basis of a control signal from the servo control circuit 43. In other words, the sending motor 42 is connected to the servo control circuit 43 and is controlled by the servo control circuit 43.

The servo control circuit 43 controls the sending motor 42 such that the optical pickup 41 is moved to the predetermined position facing the optical storage medium 20 under control by the system controller 46. The servo control circuit 43 is connected to the spindle motor 47 and controls operations of the spindle motor 47 under control by the system controller 46. In other words, the servo control circuit 43 controls the spindle motor 47 such that the optical storage medium 20 is rotated at a predetermined rotational speed upon recording and reproducing the information signals relative to the optical storage medium 20.

Further, a method for judging types of optical storage media may use a tracking servo signal or a focus servo signal.

By employing the optical pickup device according to the present invention in an optical recording and reproducing apparatus performing recording and reproducing processes on plural types of optical storage media, it is possible to improve quality of information recording and reproducing on optical storage media having different substrate thicknesses.

It is possible to apply the present invention to a lens actuator driving an objective lens condensing a light beam on various types of optical storage media such as CDs, DVDs, and the like, various types of optical pickup devices and optical recording and reproducing apparatuses on which the lens actuator is installed.

The present invention is not limited to the specifically disclosed embodiment, and variations and modifications may be made without departing from the scope of the present invention.

What is claimed is:

1. A lens actuator comprising:
an objective lens condensing a light beam on an optical storage medium;
a diffractive element providing compatibility with optical storage media of plural types of standards relative to light sources of plural different wavelengths; and
a lens holder including the objective lens and the diffractive element in an opposing manner, the objective lens being driven together with the lens holder in at least a focusing direction and a tracking direction relative to the optical storage medium, wherein
the diffractive element is disposed on the lens holder such that a diffracting plane of the diffractive element is tilted relative to an optical axis of the objective lens and a diffraction pattern center of the diffracting plane in the diffractive element facing the objective lens corresponds to the optical axis of the objective lens.

2. The lens actuator according to claim 1, wherein
the diffractive element has a discoid shape including a circumferential surface used as a fitting shaft and a plane surface on a top surface thereof,
in the lens holder, an internal surface is extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element are formed,
a maximum width of a shape of the diffractive element projected on the virtual surface perpendicular to the optical axis of the objective lens at the fitting shaft of the diffractive element is set to be equal to a diameter of the cylindrical hole of the lens holder, and
the fitting shaft of the diffractive element is fitted into the cylindrical hole of the lens holder.

3. The lens actuator according to claim 2, wherein
a center of the cylindrical hole of the lens holder is shifted relative to the optical axis of the objective lens such that the diffraction pattern center of the diffracting plane in the diffractive element facing the objective lens corresponds to the optical axis of the objective lens, the diffractive element being installed on the lens holder in a tilted manner.

4. The lens actuator according to claim 1, wherein
the diffractive element has a discoid shape including a circumferential surface used as a fitting shaft and a plane surface on a top surface thereof,
in the lens holder, an internal surface is extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element are formed,
the cylindrical hole is set to have a long hole shape defined by elongating a maximum circle projected on the virtual surface perpendicular to the optical axis of the objective lens at the fitting shaft of the diffractive element and to have a central axis coaxial with the optical axis of the objective lens, and
the fitting shaft of the diffractive element is fitted into the cylindrical hole of the lens holder.

5. The lens actuator according to claim 4, wherein
a center of the cylindrical hole having the long hole shape in the lens holder is shifted relative to the optical axis of the objective lens such that the diffraction pattern center of the diffracting plane in the diffractive element facing the objective lens corresponds to the optical axis of the objective lens, the diffractive element being installed on the lens holder in a tilted manner.

6. The lens actuator according to claim 1, wherein
the diffractive element has a discoid shape including a circumferential surface used as a fitting shaft and a plane surface on a top surface thereof,
in the lens holder, an internal surface is extended in parallel with the optical axis of the objective lens, and a cylindrical hole into which the fitting shaft of the diffractive element is fitted and a tilted plane surface tilted relative to a virtual surface perpendicular to the optical axis of the objective lens inside the cylindrical hole and in contact with the plane surface of the diffractive element are formed, the cylindrical hole is set to have an elliptical hole shape defined by a major axis obtained from a maximum size projected on the virtual surface perpendicular to the optical axis of the objective lens at the fitting shaft of the diffractive element and by a minor axis obtained from an outside diameter of the diffractive element and to have a central axis coaxial with the optical axis of the objective lens, and the fitting shaft of the diffractive element is fitted into the cylindrical hole of the lens holder.

7. The lens actuator according to claim 6, wherein a center of the cylindrical hole having the elliptical hole shape in the lens holder is shifted relative to the optical axis of the objective lens such that the diffraction pattern center of the diffracting plane in the diffractive element facing the objective lens corresponds to the optical axis of the objective lens, the diffractive element being installed on the lens holder in a tilted manner.

8. The lens actuator according to claim 2, wherein a position of the diffracting plane in the diffractive element facing the objective lens is set to be substantially a center of the cylindrical hole of the lens holder such that the diffraction pattern center of the diffracting plane in the diffractive element facing the objective lens corresponds to the optical axis of the objective lens, the diffractive element being installed on the lens holder in a tilted manner.

9. An optical recording and reproducing apparatus optically recording and reproducing information on an optical storage medium, comprising:

an optical pickup device including:

a unit obtaining optical information from a light beam reflected from an optical storage medium; and a lens actuator having:

an objective lens condensing a light beam on an optical storage medium;

a diffractive element providing compatibility with optical storage media of plural types of standards relative to light sources of plural different wavelengths; and a lens holder including the objective lens and the diffractive element in an opposing manner, the objective lens being driven together with the lens holder in at least a focusing direction and a tracking direction relative to the optical storage medium, wherein the diffractive element is disposed on the lens holder such that a diffracting plane of the diffractive element is tilted relative to an optical axis of the objective lens and a diffraction pattern center of the diffracting plane in the diffractive element facing the objective lens corresponds to the optical axis of the objective lens.

10. A lens actuator comprising:

an objective lens disposed on a lens holder, the objective lens condensing a light beam on an optical storage medium; and a drive coil disposed on the lens holder, the drive coil driving the objective lens together with the lens holder in a focusing direction and a radial direction relative to the optical storage medium, wherein a diffractive element is disposed on the lens holder via an inertia weight including a metallic material and disposed so as to face the objective lens, the diffractive element providing compatibility with the optical storage media of plural types of standards relative to light sources of plural different wavelengths.

11. The lens actuator according to claim 10, wherein a hole is formed on the inertia weight so as to have an inner cylindrical surface thereof, a shaft is formed on the diffractive element so as to have an outer cylindrical surface thereof, and the inertia weight and the diffractive element are positioned by fitting between the hole and the shaft.

12. The lens actuator according to claim 10, wherein a hole is formed on the lens holder so as to have an inner cylindrical surface thereof, a shaft is formed on the inertia weight so as to have an outer cylindrical surface thereof, and the lens holder and the inertia weight are positioned by fitting between the hole and the shaft.

13. The lens actuator according to claim 10, wherein the inertia weight is installed in a tilted manner relative to the lens holder, and an optical axis of the objective lens and a diffracting plane of the diffractive element are tilted relative to perpendicularity therebetween.

14. The lens actuator according to claim 10, wherein the diffractive element is installed in a tilted manner relative to the inertia weight, and an optical axis of the objective lens and a diffracting plane of the diffractive element are tilted relative to perpendicularity therebetween.

15. An optical pickup device comprising:

an objective lens condensing a light beam on an optical storage medium;

a lens actuator driving the objective lens in a focusing direction and a tracking direction relative to the optical storage medium; and means for obtaining optical information from a light beam reflected from the optical storage medium, wherein the lens actuator according to claim 10 is installed as the lens actuator.

16. An optical recording and reproducing apparatus optically recording and reproducing information on an optical storage medium, comprising:

an optical pickup, wherein the optical pickup device according to claim 15 is installed as the optical pickup.

* * * * *